United States Patent
Choi et al.

(10) Patent No.: US 11,937,664 B2
(45) Date of Patent: *Mar. 26, 2024

(54) SOLE STRUCTURE OF AN ARTICLE OF FOOTWEAR AND RELATED METHODS

(71) Applicant: NIKE, Inc., Beaverton, OR (US)

(72) Inventors: Yoon Jeong Choi, Portland, OR (US); Tory M. Cross, Portland, OR (US); Christian Alexander Steinbeck, Portland, OR (US); James Zormeir, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 231 days.

This patent is subject to a terminal disclaimer.

(21) Appl. No.: 16/642,991

(22) PCT Filed: Aug. 29, 2018

(86) PCT No.: PCT/US2018/048562
§ 371 (c)(1),
(2) Date: Feb. 28, 2020

(87) PCT Pub. No.: WO2019/046438
PCT Pub. Date: Mar. 7, 2019

(65) Prior Publication Data
US 2020/0253326 A1 Aug. 13, 2020

Related U.S. Application Data

(60) Provisional application No. 62/552,905, filed on Aug. 31, 2017.

(51) Int. Cl.
*A43B 13/14* (2006.01)
*A43B 13/12* (2006.01)
*A43D 29/00* (2006.01)

(52) U.S. Cl.
CPC ............ *A43B 13/14* (2013.01); *A43B 13/127* (2013.01); *A43D 29/00* (2013.01)

(58) Field of Classification Search
CPC ..... A43B 13/14; A43B 13/127; A43B 13/338; A43B 13/383; A43B 13/386; A43B 13/40; A43B 13/12; A43B 13/125; A43B 23/042
See application file for complete search history.

(56) References Cited

U.S. PATENT DOCUMENTS

| 1,659,339 A | 2/1928 | Vetterling |
| 1,701,611 A | 2/1929 | Glidden |

(Continued)

FOREIGN PATENT DOCUMENTS

| DE | 1881914 U | 10/1963 |
| DE | 8305716 U1 | 6/1983 |

(Continued)

OTHER PUBLICATIONS

European Patent Office, Communication Pursuant to Article 94(3) EPC dated Oct. 20, 2021 for application No. 18811089.4.

(Continued)

*Primary Examiner* — Khoa D Huynh
*Assistant Examiner* — Haley A Smith
(74) *Attorney, Agent, or Firm* — Honigman LLP; Matthew H. Szalach; Jonathan P. O'Brien

(57) ABSTRACT

A sole structure for an article of footwear is provided. The sole structure includes a first midsole portion, a second midsole portion, and a sheet. The first midsole portion includes a first sidewall. The second midsole portion includes a second sidewall. The sheet is disposed between the first midsole portion and the second midsole portion and extends from the first sidewall and the second sidewall. The sheet extends at least partially over the second sidewall.

18 Claims, 56 Drawing Sheets

(56) References Cited

U.S. PATENT DOCUMENTS

| | | | |
|---|---|---|---|
| 1,704,187 A | 3/1929 | Glidden | |
| 2,333,303 A | 11/1943 | Enos | |
| 2,669,036 A | 2/1954 | Israel | |
| 3,345,664 A | 10/1967 | Ludwig | |
| 3,812,604 A | 5/1974 | Sato | |
| 3,878,626 A * | 4/1975 | Isman | A43B 3/24 36/15 |
| 3,925,914 A | 12/1975 | Marcoux | |
| 4,005,532 A * | 2/1977 | Giese | A43B 13/38 36/44 |
| 4,073,072 A | 2/1978 | Gross | |
| 4,241,523 A | 12/1980 | Daswick | |
| 4,561,195 A * | 12/1985 | Onoda | A43B 5/00 36/31 |
| 4,608,768 A | 9/1986 | Cavanagh | |
| 4,653,206 A | 3/1987 | Tanel | |
| 4,798,010 A | 1/1989 | Sugiyama | |
| 4,896,440 A | 1/1990 | Salaverria | |
| 5,022,168 A | 6/1991 | Jeppson, III | |
| 5,025,573 A | 6/1991 | Giese et al. | |
| 5,075,984 A | 12/1991 | Shiew | |
| 5,561,920 A | 10/1996 | Graham | |
| 5,572,805 A | 11/1996 | Glese | |
| 5,575,089 A * | 11/1996 | Giese | A43B 13/181 36/31 |
| 5,664,343 A * | 9/1997 | Byrne | A43B 23/07 36/12 |
| 5,720,118 A | 2/1998 | Mayer | |
| 5,926,974 A | 7/1999 | Friton | |
| 5,930,916 A | 8/1999 | Connor | |
| 6,021,585 A | 2/2000 | Cole | |
| 6,154,983 A * | 12/2000 | Austin | A43B 13/28 36/31 |
| 6,167,639 B1 | 1/2001 | Ventura | |
| 6,205,683 B1 * | 3/2001 | Clark | A43B 13/12 36/31 |
| 6,389,713 B1 | 5/2002 | Kita | |
| 6,401,366 B2 | 6/2002 | Foxen | |
| 7,197,840 B2 * | 4/2007 | Nakano | A43B 13/12 36/19 R |
| 7,401,421 B2 | 7/2008 | Brennan | |
| 7,627,963 B2 * | 12/2009 | Kilgore | A43B 3/26 36/43 |
| 7,814,686 B2 | 10/2010 | Becker | |
| 9,894,958 B2 * | 2/2018 | Cheney | A43B 9/00 |
| 10,342,292 B2 | 7/2019 | Del Biondi | |
| 10,448,703 B2 * | 10/2019 | Schiller | A43B 5/185 |
| 10,674,791 B2 * | 6/2020 | Bruce | A43D 11/006 |
| 2001/0007177 A1 | 7/2001 | Brown | |
| 2002/0162246 A1 | 11/2002 | Mayer et al. | |
| 2003/0093920 A1 * | 5/2003 | Greene | A43B 13/141 36/144 |
| 2005/0229431 A1 | 10/2005 | Gerlin | |
| 2007/0186446 A1 * | 8/2007 | Lafortune | A43B 7/142 36/43 |
| 2007/0240331 A1 | 10/2007 | Borel | |
| 2008/0098616 A1 | 5/2008 | Leedy | |
| 2009/0172971 A1 | 7/2009 | Peikert | |
| 2010/0287795 A1 | 11/2010 | Van Niekerk | |
| 2011/0016748 A1 | 1/2011 | Soler | |
| 2011/0146104 A1 | 6/2011 | Lafortune | |
| 2011/0225852 A1 | 9/2011 | Mahoney | |
| 2012/0030972 A1 * | 2/2012 | Arnone | B29D 35/0054 525/453 |
| 2013/0167402 A1 | 7/2013 | Christensen et al. | |
| 2014/0013617 A1 | 1/2014 | Montross et al. | |
| 2014/0283412 A1 | 9/2014 | Elder et al. | |
| 2015/0068063 A1 * | 3/2015 | Farris | A43B 13/223 36/103 |
| 2015/0164175 A1 * | 6/2015 | Katsuya | A41D 19/0055 36/87 |
| 2015/0250259 A1 | 9/2015 | Attey | |
| 2015/0289591 A1 * | 10/2015 | Jones | A43B 3/0047 36/25 R |
| 2016/0095384 A1 | 4/2016 | Kraft | |
| 2016/0166007 A1 * | 6/2016 | Bruce | A43B 23/042 36/31 |
| 2016/0219973 A1 * | 8/2016 | Cheney | A43B 13/38 |
| 2016/0353834 A1 | 12/2016 | Luedecke | |
| 2017/0042265 A1 * | 2/2017 | Goussev | A41D 20/00 |
| 2017/0119094 A1 | 5/2017 | Vontorcik, Jr. et al. | |
| 2017/0238652 A1 | 8/2017 | Langvin | |
| 2017/0267850 A1 | 9/2017 | Baghdadi | |
| 2017/0340037 A1 * | 11/2017 | Bailey | A41D 13/002 |
| 2018/0116336 A1 | 5/2018 | Dallas | |
| 2018/0213884 A1 | 8/2018 | Kim | |
| 2018/0352895 A1 * | 12/2018 | Chang | A43B 5/10 |
| 2019/0125028 A1 | 5/2019 | Bartel et al. | |
| 2020/0046068 A1 | 2/2020 | Choi | |
| 2020/0253326 A1 | 8/2020 | Choi et al. | |

FOREIGN PATENT DOCUMENTS

| | | |
|---|---|---|
| DE | 102010046278 A1 | 2/2011 |
| DE | 102012110573 A1 | 5/2014 |
| EP | 0130816 A2 | 1/1985 |
| EP | 0922400 A1 | 6/1999 |
| EP | 2975962 A2 | 1/2016 |
| EP | 3001924 A1 | 4/2016 |
| EP | 2975962 B1 | 5/2018 |
| GB | 1433481 A | 4/1976 |
| KR | 20070093375 A | 9/2007 |
| KR | 101638304 B1 | 7/2016 |
| WO | WO-2016165734 A1 | 10/2016 |
| WO | WO-2017058419 A1 | 4/2017 |
| WO | WO-2018175734 A1 | 9/2018 |
| WO | WO-2019046438 A1 | 3/2019 |

OTHER PUBLICATIONS

European Office Action, Application No. 18 811 090.2, dated Jun. 7, 2021.

European Patent Office as ISA, International Search Report and Written Opinion for PCT Application No. PCT/US2018/048562, dated Feb. 13, 2019.

European Patent Office as IPEA, Written Opinion of the International Preliminary Examining Authority for PCT Application No. PCT/US2018/048562, dated Jul. 18, 2019.

International Search Report and Written Opinion for Application No. PCT/US2021/024544 dated Jul. 13, 2021.

USPTO, Non-Final Office Action for U.S. Appl. No. 17/214,887, dated Aug. 23, 2022.

European Patent Office as ISA, International Search Report and Written Opinion for PCT Application No. PCT/US2020/025594, dated Jun. 23, 2020.

USPTO, Final Office Action for U.S. Appl. No. 16/833,617, dated Sep. 26, 2022.

USPTO, Final Office Action for U.S. Appl. No. 17/214,887, dated Jan. 18, 2023.

USPTO, Non-Final Office Action for U.S. Appl. No. 16/833,617, dated Feb. 8, 2022.

USPTO, Non-Final Office Action for U.S. Appl. No. 16/833,617, dated Dec. 21, 2022.

European Patent Office as IPEA, International Preliminary Report of Patentability for PCT Application No. PCT/US2018/048553, dated Jul. 23, 2019.

European Patent Office as ISA, International Search Report and Written Opinion for PCT Application No. PCT/US2018/048553, dated Feb. 13, 2019.

European Patent Office, Communication pursuant to Article 94(3) EPC for App. No. 18 811 089.4, dated Jun. 7, 2021.

International Search Report for PCT/US2019/045757 dated Nov. 19, 2019.

\* cited by examiner

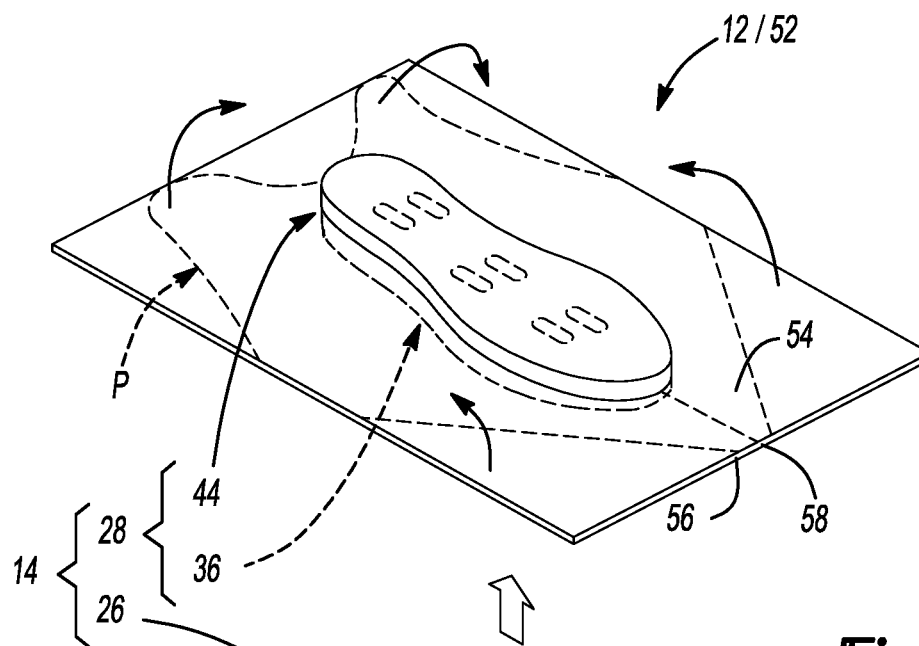
_Fig-10_
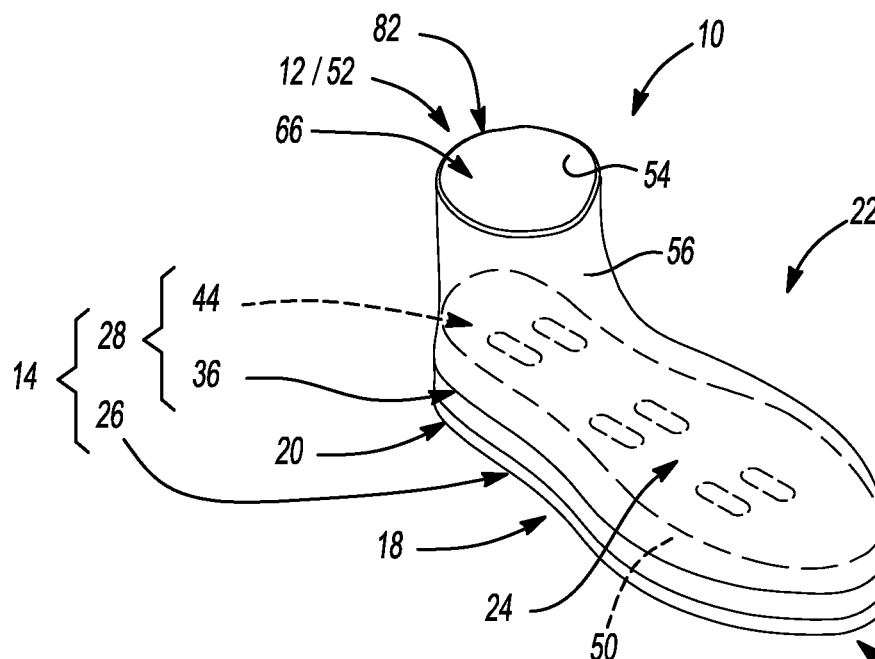
_Fig-11_

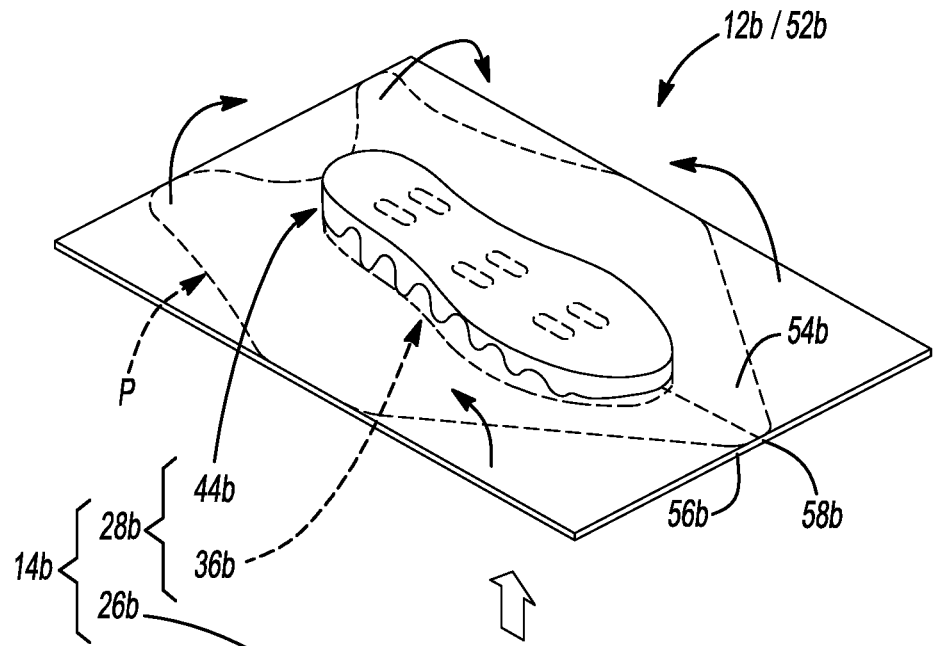
_Fig-32_
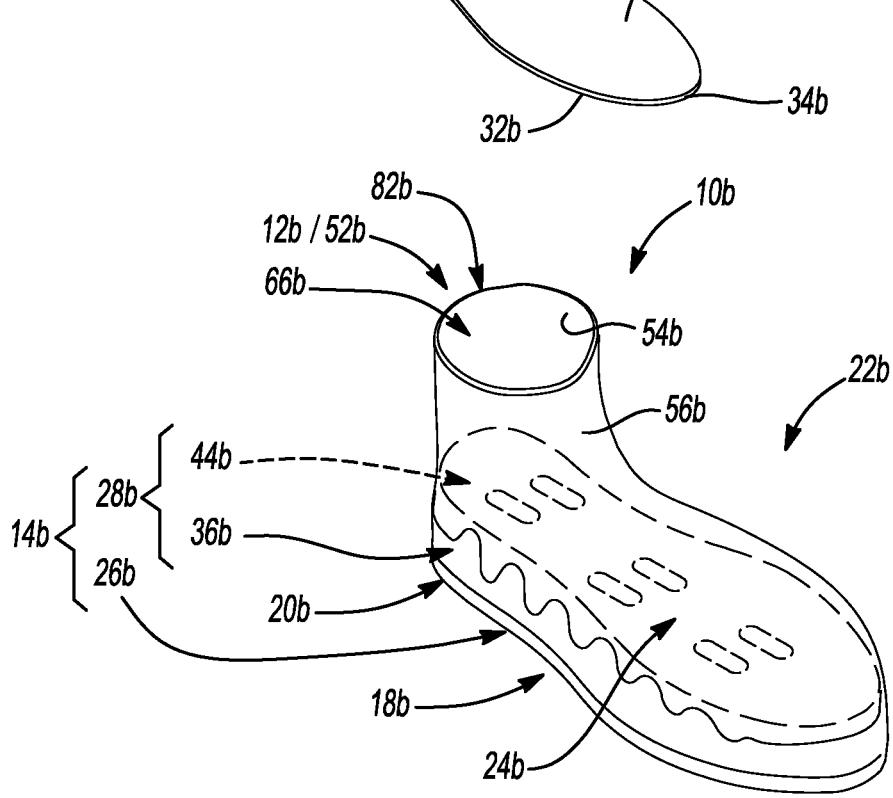
_Fig-33_

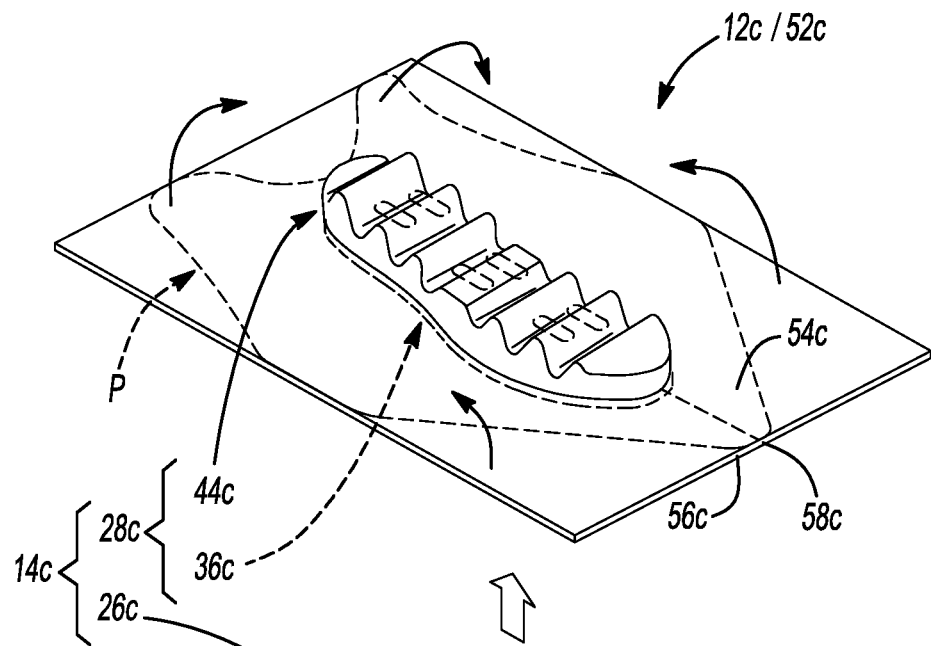
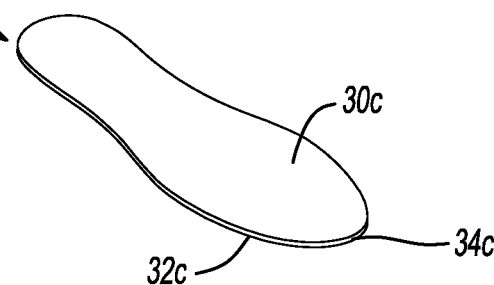
*Fig-43*
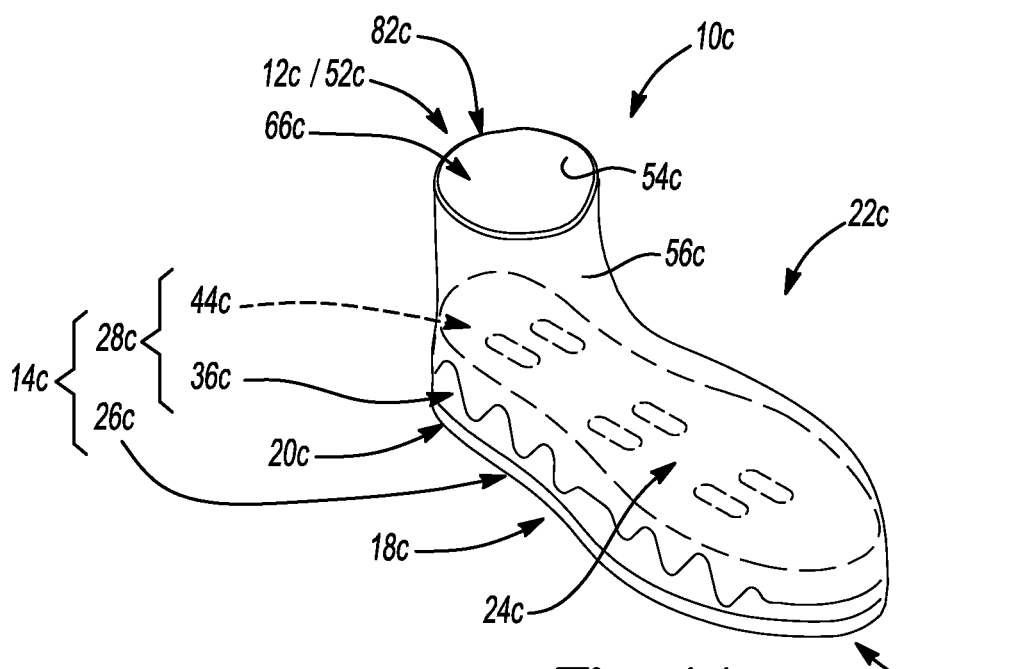
*Fig-44*

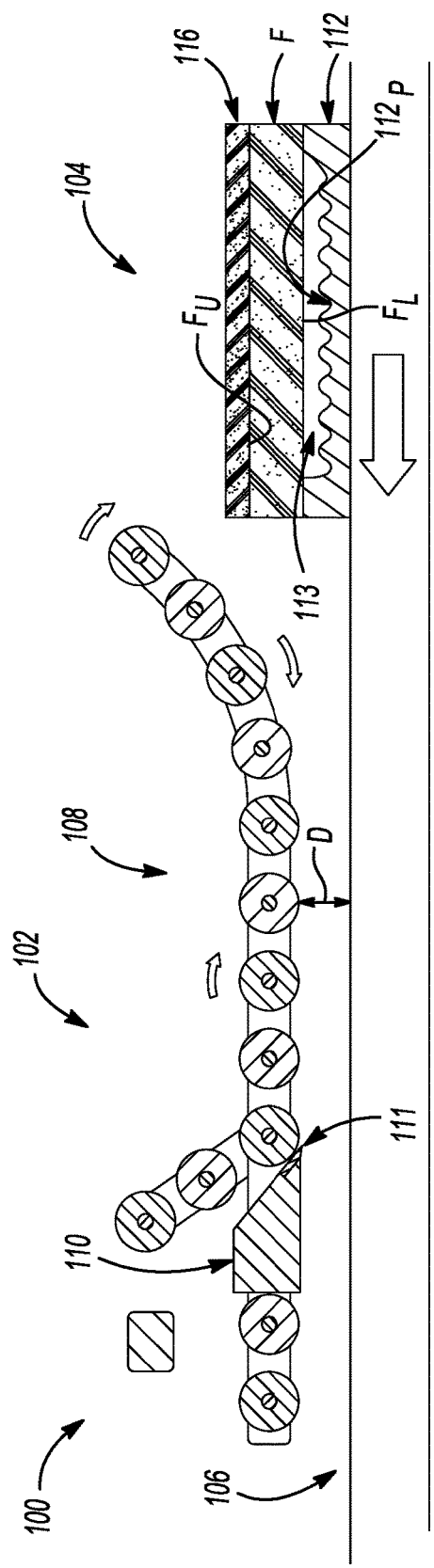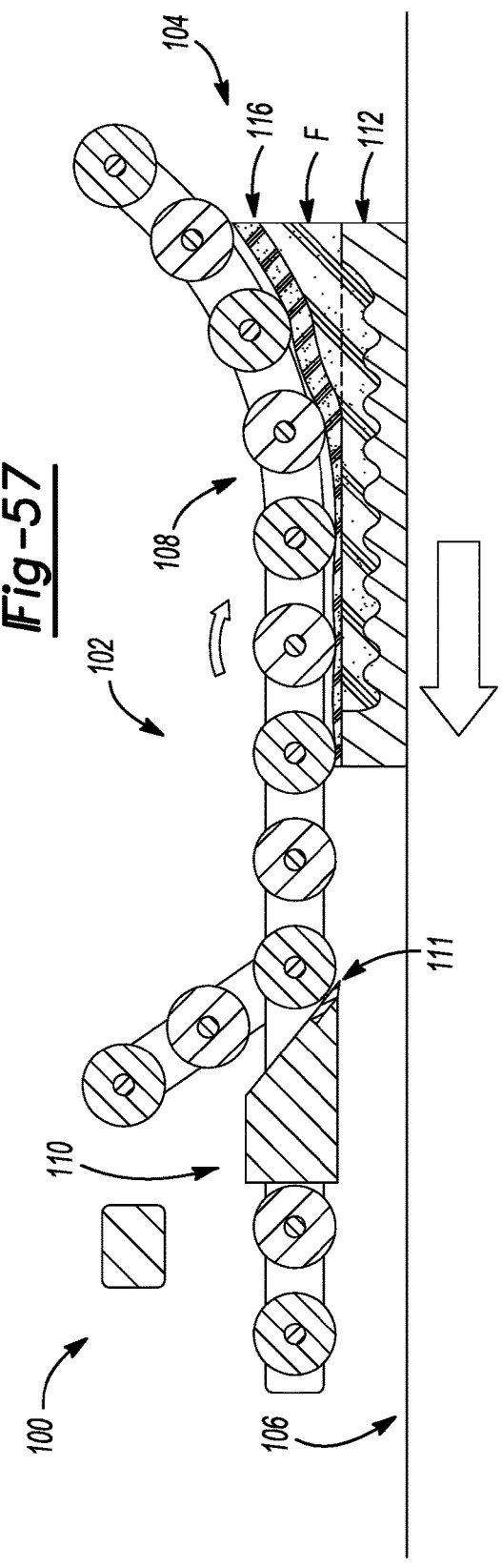

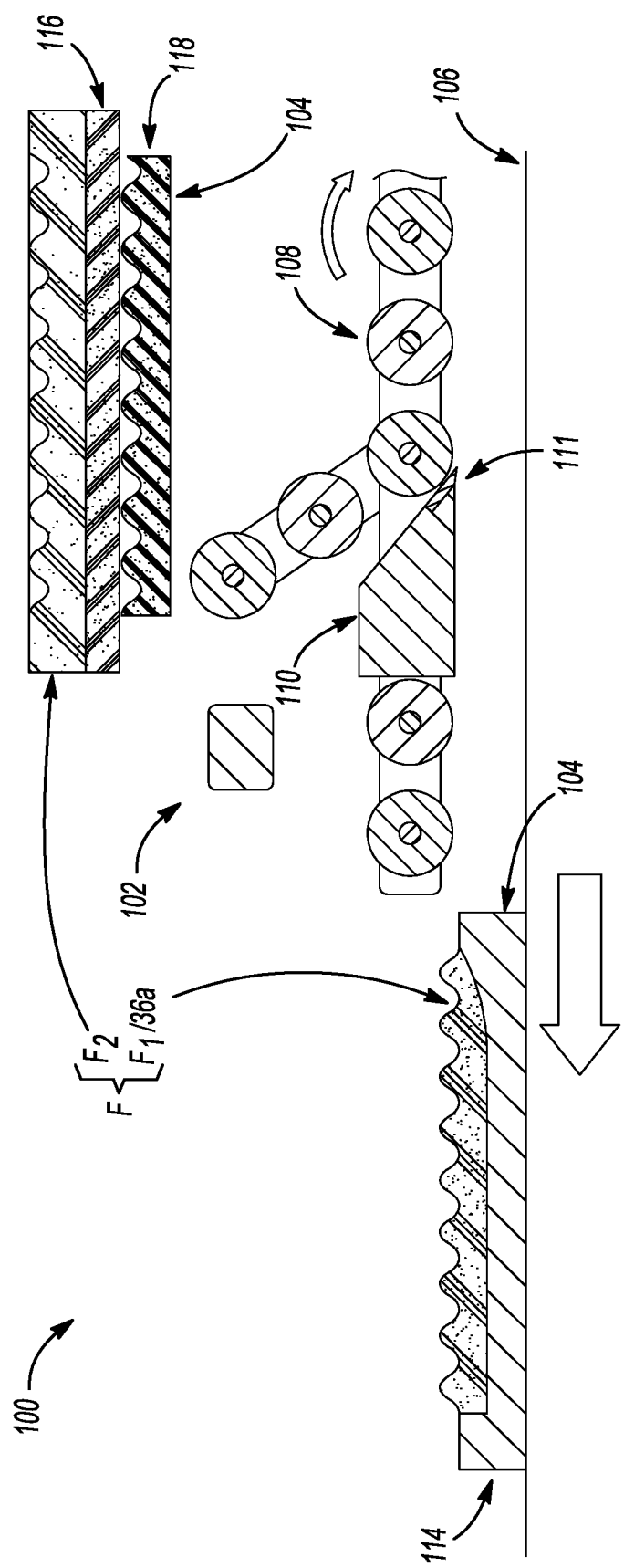

SOLE STRUCTURE OF AN ARTICLE OF FOOTWEAR AND RELATED METHODS

CROSS-REFERENCE TO RELATED APPLICATIONS

This application is the national phase of International Application No. PCT/US2018/048562, filed Aug. 29, 2018, which claims priority to U.S. Provisional Application No. 62/552,905, filed on Aug. 31, 2017, the disclosures of which are hereby incorporated by reference in their entirety.

FIELD

The present disclosure relates generally to an article of footwear and more particularly to a sole structure for an article of footwear.

BACKGROUND

This section provides background information related to the present disclosure and is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a stacked arrangement of a midsole and an outsole extending between a ground surface and the upper. The outsole provides abrasion-resistance and traction with the ground surface and may be formed from rubber or other materials that impart durability and wear-resistance, as well as enhancing traction with the ground surface. The midsole is disposed between the outsole and the upper. While existing sole structures perform adequately for their intended purpose, improvements to sole structures are continuously being sought in order to advance the arts.

DESCRIPTION OF THE DRAWINGS

The drawings described herein are for illustrative purposes only of selected embodiments and not all possible implementations, and are not intended to limit the scope of the present disclosure.

FIG. 10 is an exploded perspective view of the portion of the article of footwear of FIG. 7 and an outsole;

FIG. 11 is an assembled view of the article of footwear of FIG. 10;

FIG. 32 is an exploded perspective view of the portion of the article of footwear of FIG. 29 and an outsole;

FIG. 33 is an assembled view of the article of footwear of FIG. 32;

FIG. 43 is an exploded perspective view of the portion of the article of footwear of FIG. 40 and an outsole;

FIG. 44 is an assembled view of the article of footwear of FIG. 43;

FIG. 57 is a side view of the foam cutting system and the foam workpiece portion of FIG. 56;

FIG. 58 is a further side view of the foam cutting system and the foam workpiece portion of FIG. 57;

FIG. 63 is a further side view of the foam cutting system and the foam workpiece portion of FIG. 62 illustrating the foam workpiece portion separated for defining the midsole component portion and the scrap piece portion.

Corresponding reference numerals indicate corresponding parts throughout the several views of the drawings.

DETAILED DESCRIPTION

Figure 1:
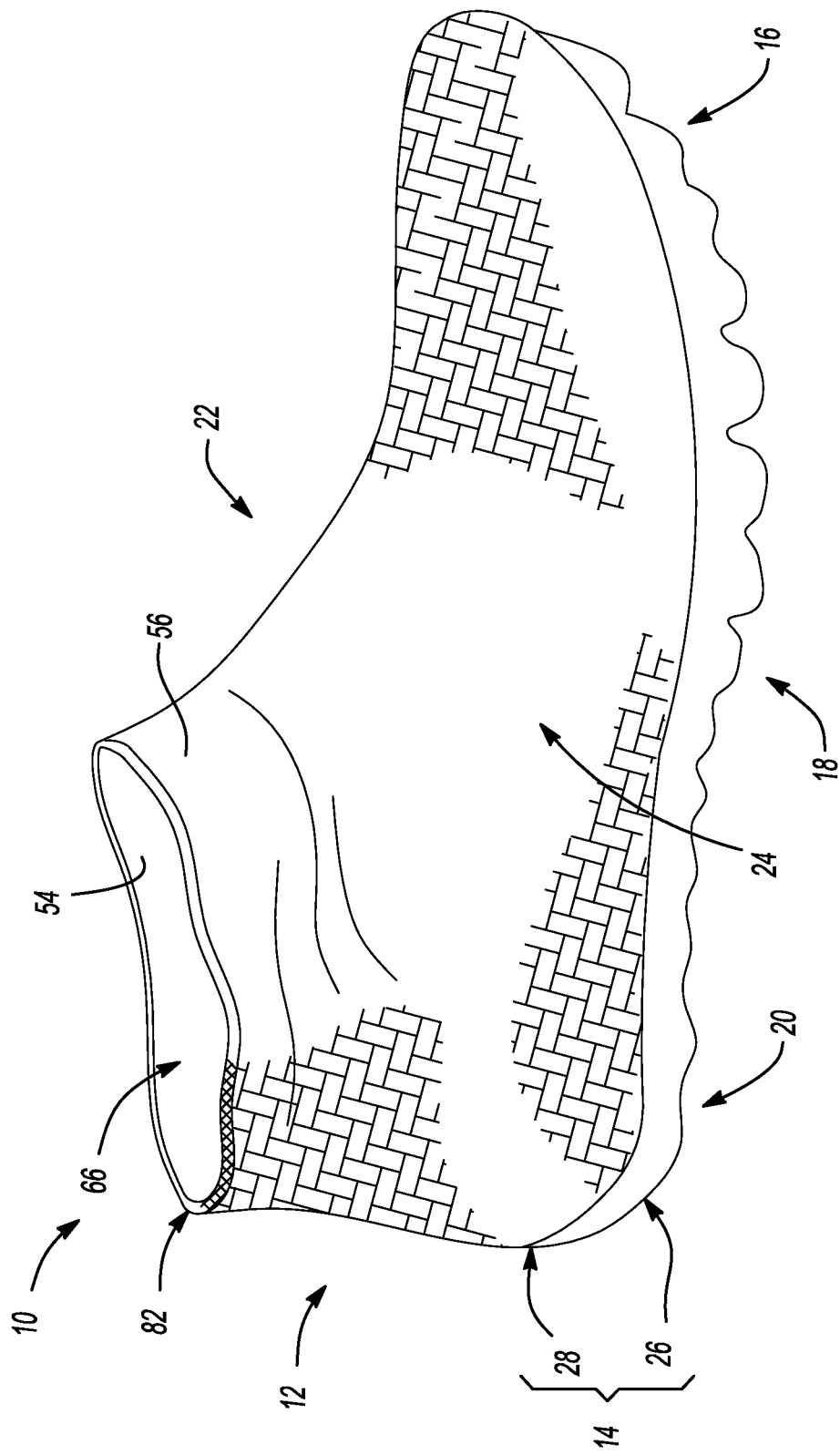
FIG. 1 is a perspective view of an article of footwear incorporating a sole structure in accordance with the principles of the present disclosure.
Figure 2:
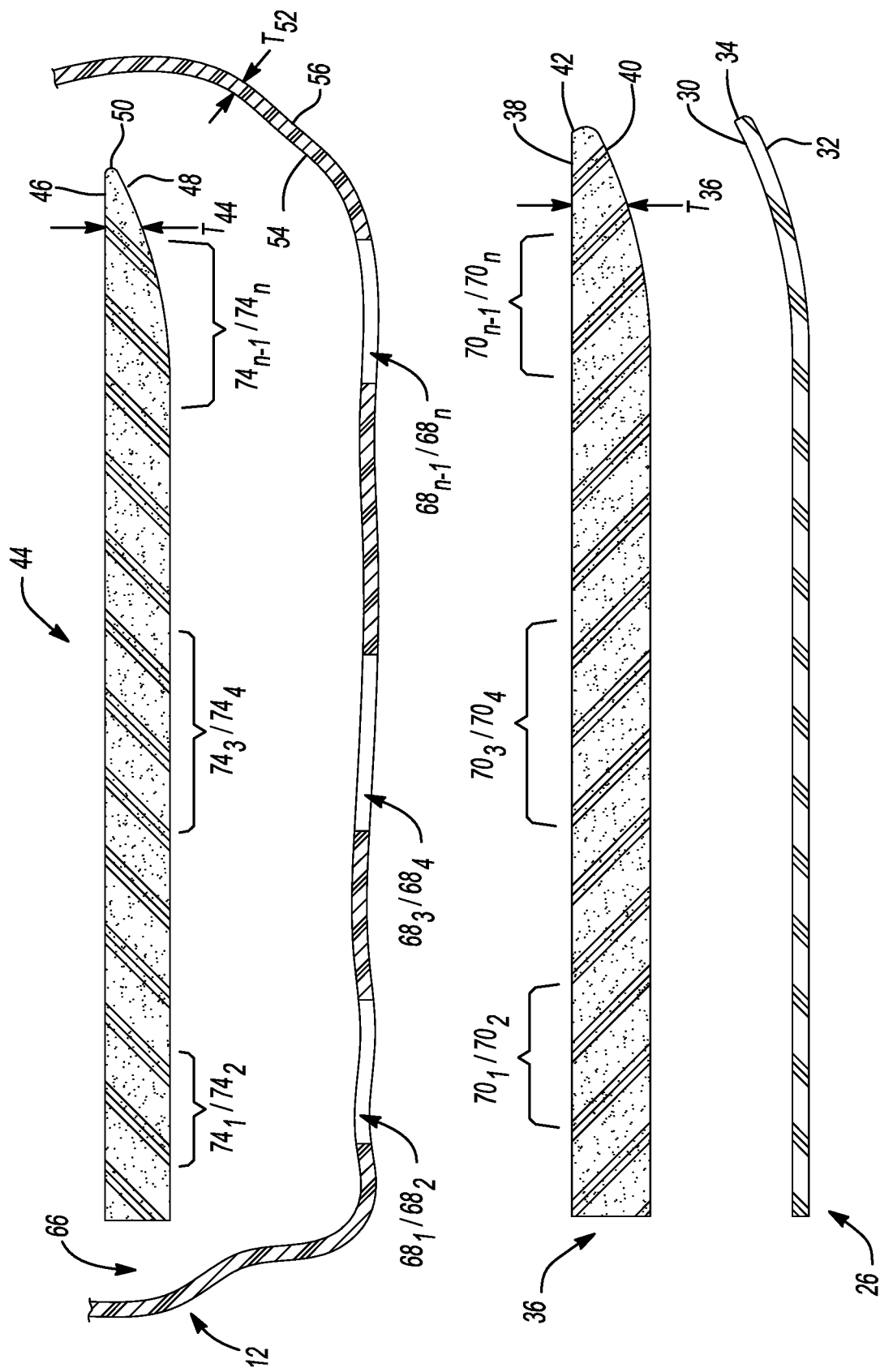
FIG. 2 is an exploded cross-sectional view of the article of footwear of FIG. 1.
Figure 3:
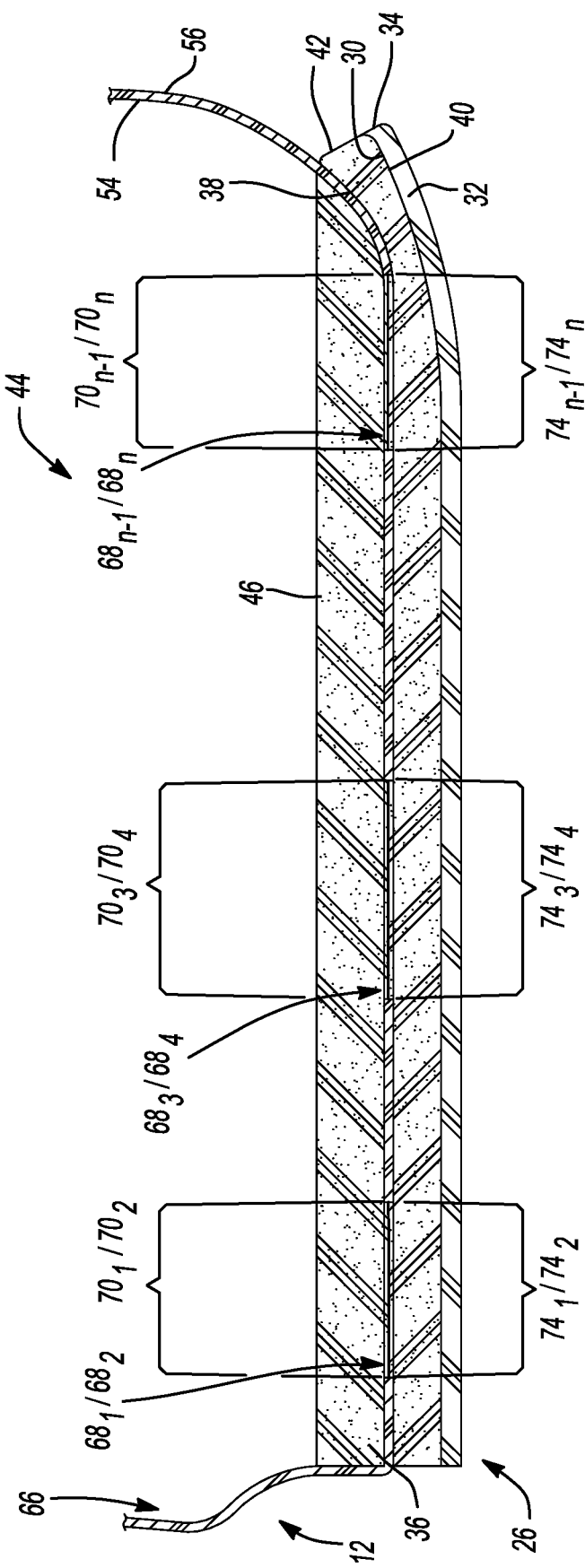
FIG. 3 is an assembled cross-sectional view of the article of footwear of FIG. 1.

The present disclosure is related to a sole structure for an article of footwear. The sole structure includes one or more midsole portions (see, e.g., first midsole portions 36, 36a, 36b, 36c, 36d and second midsole portions 44, 44a, 44b, 44c, 44d) and a sheet of material (see, e.g., sheet of material 52, 52a, 52b, 52c, 52d). In an example, the one or more midsole portions may be molded around, molded through or molded around-and-through the sheet of material. One or more of the sheet of material and the one or more midsole portions may be preformed to define a pattern (e.g., a sinusoidal pattern, a saw tooth pattern or the like). One or a combination of the sheet of material and the pattern contributes to a desired characteristic (e.g., shear strength, shear stability, shear loading) in one or more regions (e.g., a forefoot region, a midfoot region and a heel region) of the sole structure of the article of footwear. Accordingly, the sole structure may provide improved stability in one or a combination of a parallel loading direction and a perpendicular loading direction when a load is imparted to the sole structure by a user's foot.

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of moded features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or sheet is referred to as being "on," "engaged to," "connected to," or "coupled to" another element or sheet, it may be directly on, engaged, connected or coupled to the other element or sheet, or intervening elements or sheets may be present. In contrast, when an element is referred to as being "directly on," "directly engaged to," "directly connected to," or "directly coupled to" another element or sheet, there may be no intervening elements or sheets present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, sheets and/or sections, these elements, components, regions, sheets and/or sections should not be limited by these terms. These terms may be only used to distinguish one element, component, region, sheet or section from another region, sheet or section. Terms such as "first," "second," and other numerical terms when used herein do not imply a sequence or order unless clearly indicated by the context. Thus, a first element, component, region, sheet or section discussed below could be termed a second element, component, region, sheet or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

One aspect of the disclosure provides a sole structure of an article of footwear and related methods. The sole structure includes a first midsole portion including a first sidewall and a second midsole portion including a second sidewall. The sole structure also includes a sheet disposed between the first midsole portion and the second midsole portion that extends from the first sidewall and the second sidewall, and extends at least partially over the second sidewall.

Implementations of the disclosure may include one or more of the following optional features. In some implementations, the sheet extends from the first sidewall and the second sidewall at one of a medial side and a lateral side of the sole structure. Optionally, the sheet may extend from the first sidewall and the second sidewall at both a medial side and a lateral side of the sole structure. The sheet may also extend from the first sidewall and the second sidewall around an entire perimeter of the sole structure. In some examples, the sheet extends from the first sidewall and the second sidewall and at least partially covers an outer surface of an upper of the article of footwear. Additionally or alternatively, the sheet may extend from the first sidewall and the second sidewall and may form at least a portion of an upper of the article of footwear or may form an ankle collar that defines an opening of the upper.

In some configurations, the sheet includes a top surface, a bottom surface, and a sidewall surface extending between the top surface and the bottom surface. The sidewall surface may define a thickness of the sheet and may form a sinusoidal pattern extending between a forefoot region and a heel region of the sole structure. The sheet may include a series of peaks and valleys extending between a forefoot region and a heel region of the sole structure. When the sheet includes a series of peaks and valleys extending between a forefoot region and a heel region of the sole structure, a height of the peaks, a depth of the valleys, or both progressively may decrease in a direction extending from the heel region to the forefoot region.

In some examples, the sheet extends from the first midsole portion and from the second midsole portion at both a medial side and a lateral side of the sole structure. The sheet may also include at least one aperture. When the sheet includes at least one aperture, each aperture of the at least one aperture may be at least 3.0 mm in length in a largest dimension, may be at least 1 mm in length in a smallest dimension, and/or may be a post-processed aperture defined by material removed from the sheet. When the sheet includes at least one aperture, the sheet may be woven, knit, or braided for integrally defining each aperture of the at least one aperture. In some implementations, the sole structure includes an outsole including a ground-contacting surface. The first midsole portion may be disposed between the outsole and the sheet.

In some examples, the at least one aperture is formed through the sheet in an area of the sheet located between the first midsole portion and the second midsole portion. The first midsole portion may define at least one first contact region and the second midsole portion may define at least one second contact region. The at least one first contact region may be in contact with the at least one second contact region at the at least one aperture. The first midsole portion and the second midsole portion may be bonded to one another at the at least one aperture. When the first midsole portion and the second midsole portion are bonded to one another at the at least one aperture, a material of the first midsole portion and a material of the second midsole portion may be melded at the at least one aperture. The sole structure may also include an adhesive disposed between the at least one first contact region and the at least one second contact region at the at least one aperture.

In some configurations, the first midsole portion includes a first surface in contact with the sheet and the second midsole portion includes a second surface in contact with the sheet. The first surface and the second surface may each include a plurality of surface features. Here, each of the plurality of surface features may have a minimum height or depth of at least 2 mm or may have a minimum height or depth of at least 5 mm. Additionally or alternatively, each of the plurality of surface features may have a maximum height or depth of less than 22 mm or may have a maximum height or depth of less than 17 mm. The height or depth of each of the plurality of surface features may range from about 2 mm to about 15 mm.

In some examples, the first midsole portion includes a first series of peaks and a first series of valleys and the second midsole portion includes a second series of peaks and a second series of valleys. In this example, the first series of peaks may oppose the second series of valleys and the second series of peaks may oppose the first series of valleys. The sheet may conform to the shape of the first series of peaks and the first series of valleys and may conform to the shape the second series of peaks and the second series of valleys. Further, the first series of peaks, the first series of valleys, the second series of peaks, and the second series of valleys may cooperate to provide the sheet with a side surface having a sinusoidal or saw-tooth configuration In some implementations, the sole structure includes a plurality of sheets disposed between the first midsole portion and the second midsole portion. The plurality of sheets may include two or more sheets positioned between a medial side of the sole structure and a lateral side of the sole structure. A width of each of the two or more sheets may be at least 0.5 cm. At least a portion of the plurality of sheets disposed between the first midsole portion and the second midsole portion may overlap each other in a region between the first midsole portion and the second midsole portion. Optionally, none of the plurality of sheets disposed between the first midsole portion and the second midsole portion may overlap each other in a region between the first midsole portion and the second midsole portion.

In some configurations, the sole structure includes an adhesive disposed between the first midsole portion and the second midsole portion. The adhesive may be applied to at least one of the first midsole portion, the second midsole portion, an upper surface of the sheet, and a lower surface of the sheet. The sheet may include a mesh textile including at least one aperture in a structure of the mesh or including a plurality of apertures in a structure of the mesh. A region of the mesh textile disposed between the first midsole portion and the second midsole portion may include at least 50 apertures in the structure of the mesh. The sheet may further include a mesh textile including a plurality of apertures each being at least 0.5 mm in length in a largest dimension or at least 1.0 mm in length in a largest dimension. The sheet may also include a mesh textile including a plurality of apertures each being less than 10 mm in length in a largest dimension, each being less than 5.0 mm in length in a largest dimension, or each being less than 3.0 mm in length in a largest dimension. Additionally or alternatively, the sheet may include a mesh textile including a plurality of apertures each having a length in a largest dimension from about 0.5 mm to about 3.0 mm.

In some implementations, the sheet is a textile configured to stretch in in only one dimension. Optionally, the sheet may be a textile configured to stretch in two dimensions. The sheet may be an embroidered textile. The sheet may include embroidered regions disposed at discrete locations of the sheet. The sheet may also include first embroidered regions and second embroidered regions. The first embroidered regions may have a different concentration of fibers than the second embroidered regions.

In some configurations, at least one of the first midsole portion and the second midsole portion are formed from a polymeric material having a foam structure. The polymeric material having a foam structure may be an injection-molded foam or may be a compression-molded foam.

Another aspect of the disclosure provides a method of making a sole structure for an article of footwear. The method includes providing a first midsole portion including a first sidewall and providing a second midsole portion including a second sidewall. The method also includes positioning a sheet between the first midsole portion and the second midsole portion, the sheet extending from the first sidewall and the second sidewall. The first midsole portion is connected to the second midsole portion while securing the sheet between the first midsole portion and the second midsole portion. The method also includes extending the sheet at least partially over the second sidewall.

Implementations of the disclosure may include one or more of the following optional features. In some examples, the method further includes extending the sheet from the first sidewall and the second sidewall at one of a medial side and a lateral side of the sole structure. Optionally, the method may include extending the sheet from the first sidewall and the second sidewall at both a medial side and a lateral side of the sole structure or around an entire perimeter of the sole structure. Additionally or alternatively, the method may include extending the sheet from the first sidewall and the second sidewall and at least partially covering an outer surface of an upper of the article of footwear with the sheet. The method may also include extending the sheet from the first sidewall and the second sidewall to form an upper of the article of footwear with the sheet or to form an ankle collar that defines an opening of an upper of the article of footwear.

In some configurations, the method includes positioning the sheet into a sinusoidal pattern that extends between a forefoot region and a heel region of the sole structure. The method may also include providing the sheet with a series of peaks and valleys that extend between a forefoot region and a heel region of the sole structure. When providing the sheet with a series of peaks, the method may include providing a series of peaks having a height that progressively decreases in a direction extending from the heel region to the forefoot region. When providing the sheet with a series of valleys, the method may also include providing a series of valleys having a depth that progressively decreases in a direction extending from the heel region to the forefoot region. The method may further include extending the sheet from the first midsole portion and from the second midsole portion at both a medial side and a lateral side of the sole structure.

In some implementations, the method includes providing the sheet with at least one aperture that extends through the sheet. Here, the method may include forming the at least one aperture through the sheet in an area between the first midsole portion and the second midsole portion. The method may also include contacting the first midsole portion with the second midsole portion at the at least one aperture or bonding the first midsole portion to the second midsole portion at the at least one aperture. When bonding the first midsole portion to the second midsole portion, the method may further include melding a material of the first midsole portion and a material of the second midsole portion. Optionally, when bonding the first midsole portion to the second midsole portion, the method may include applying an adhesive to at least one of the first midsole portion and the second midsole portion.

In some examples, the method includes providing the first midsole portion with a first series of peaks and a first series of valleys and providing the second midsole portion with a second series of peaks and a second series of valleys. In this example, the method may include opposing the first series of peaks with the second series of valleys and opposing the second series of peaks with the first series of valleys. The method may further include conforming the sheet to the shape of the first series of peaks and the first series of valleys and conforming the sheet to the shape of the second series of peaks and the second series of valleys. Here, the method may include forming the sheet from a flexible material that conforms to the shape of the first series of peaks and the first series of valleys and conforms to the shape of the second series of peaks and the second series of valleys. Additionally or alternatively, the method may include preforming the sheet into a shape that matingly receives the first series of peaks and the second series of peaks.

In some implementations, the method includes comprising forming the sheet from a fabric material or forming the sheet from at least one of a woven and a knitted textile. The method may also include providing an adhesive between the first midsole portion and the second midsole portion. The method may further include bonding the first midsole portion, the second midsole portion, and the sheet together via the adhesive. Optionally, the method may include forming at least one of the first midsole portion and the second midsole portion from a foamed material.

In some configurations, the method includes injection molding a polymeric material to form at least one of the first midsole portion and the second midsole portion. In this configuration, the method may include injection molding the polymeric material to form an injection-molded, foamed polymeric material. The step of injection molding may also include injecting the molten polymeric material around or through apertures in the sheet, thereby forming an injection molded part including the sheet affixed to both the first midsole portion and the second midsole portion. Additionally or alternatively, the step of injection molding may include providing an injection mold, inserting the sheet into the injection mold, injecting molten polymeric material into the mold containing the sheet, cooling the mold to at least partially solidify the molten polymeric material to form an injection molded part including the sheet affixed to the at least one of the first midsole portion and the second midsole portion, and removing the injection molded part from the mold.

In some examples, the method includes forming the first midsole portion and the second midsole portion from the same material or from different materials. The method may also include forming the first midsole portion from a first material and forming the second midsole portion from a second material. Optionally, the method may include forming the first material from a different material than the second material.

The method of manufacturing an article of footwear may include providing the sole structure made according to the method described above, providing an upper for an article of footwear, and affixing the sole structure and the upper to each other to form the article of footwear.

With reference to FIGS. 1-5, an exemplary article of footwear 10 is provided and includes an upper 12 and a sole structure 14 attached to the upper 12. The article of footwear 10 may be divided into one or more regions. The regions may include a forefoot region 16, a midfoot region 18, and a heel region 20. The forefoot region 16 may correspond with toes and joints connecting metatarsal bones with phalanx bones of a foot. The midfoot region 18 may correspond with an arch area of the foot while the heel region 18 may correspond with rear portions of the foot, including a calcaneus bone. The article of footwear 10 may additionally include a medial side 22 and a lateral side 24 that correspond with opposite sides of the article of footwear 10 and extend through the regions 16, 18, 20.

The sole structure 14 includes a midsole 28 and optionally includes an outsole 26. A cushioning arrangement (not shown) may optionally be disposed generally between the outsole 26 and the midsole 28.

Figure 4:
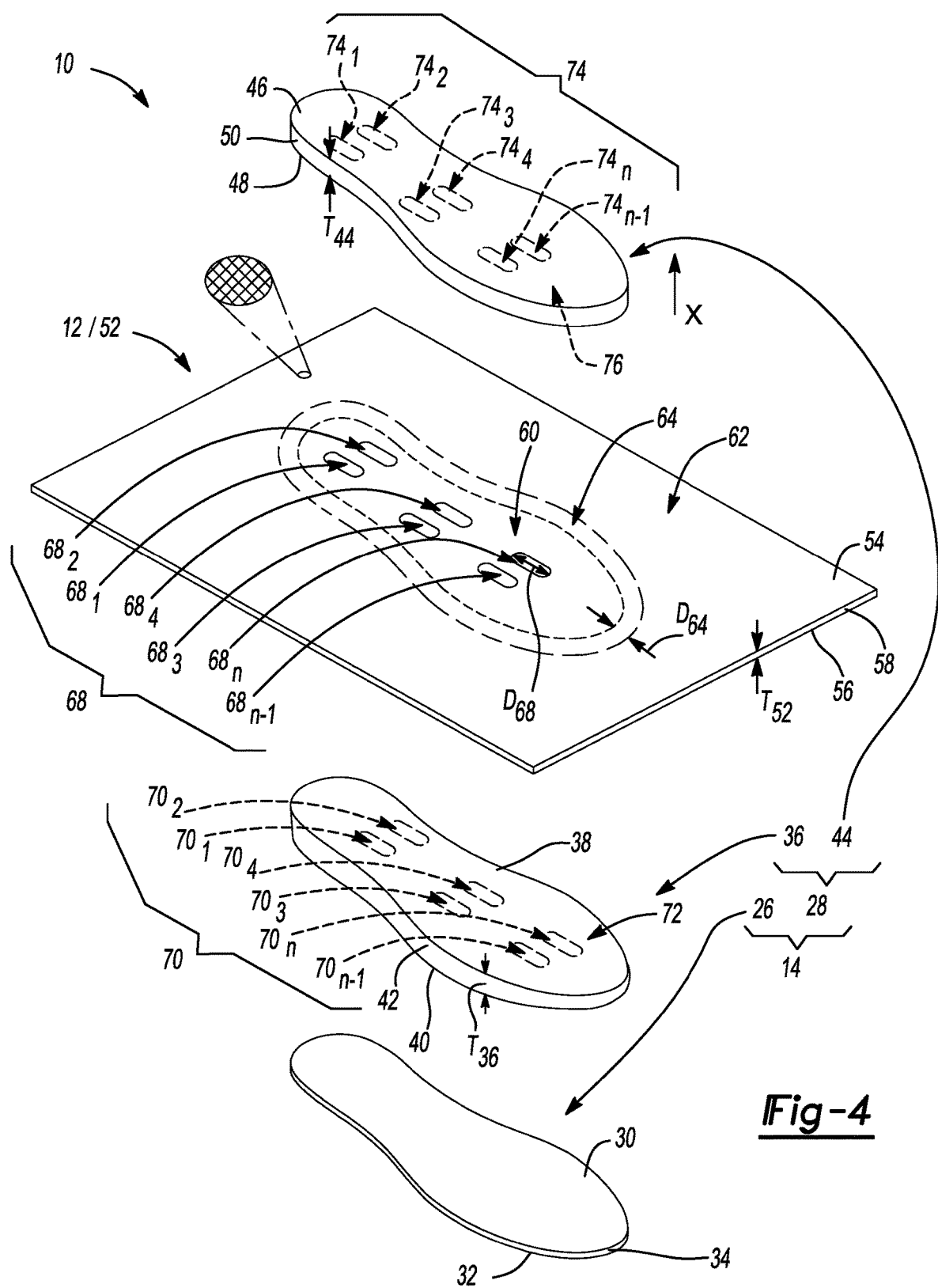
FIG. 4 is an exploded perspective view of the article of footwear of FIG. 1 illustrating a component of the article of footwear that contributes to formation of an upper arranged in a substantially flat orientation.

Referring to FIG. 4, the outsole 26 includes a midsole-contacting surface 30 and a ground-contacting surface 32. The outsole 26 further includes a sidewall surface 34 extending between the midsole-contacting surface 30 and the ground-contacting surface 32.

As also shown in, for example, FIG. 4, the midsole 28 includes a first midsole portion 36 and a second midsole portion 44. The first midsole portion 36 includes a top surface 38, a bottom surface 40 and a sidewall surface 42 extending between the top surface 38 and the bottom surface 40. The sidewall surface 42 may define a thickness ($T_{36}$) of the first midsole portion 36 extending between the top surface 38 and the bottom surface 40.

The top surface 38 and the bottom surface 40 of the first midsole portion 36 may generally define an outer surface profile of the first midsole portion 36. In an example, each of the top surface 38 and the bottom surface 40 of the first midsole portion 36 may be substantially flat (e.g., planar). In this regard, each of the top surface 38 and the bottom surface 40 may not be interrupted with one or more recesses, trenches, valleys, or other similar features. Furthermore, in an example, the top surface 38 of the first midsole portion 36 may be substantially parallel to the bottom surface 40 of the first midsole portion 36 such that the thickness ($T_{36}$) of the first midsole portion 36 is substantially the same across a length ($L_{14}$) of the sole structure 14.

With continued reference to FIG. 4, the second midsole portion 44 includes a top surface 46, a bottom surface 48 and a sidewall surface 50 extending between the top surface 46 and the bottom surface 48. The sidewall surface 50 may define a thickness ($T_{44}$) of the second midsole portion 44 extending between the top surface 46 and the bottom surface 48.

The top surface 46 and the bottom surface 48 of the second midsole portion 44 may generally define an outer surface profile of the second midsole portion 44. In an example, each of the top surface 46 and the bottom surface 48 of the second midsole portion 44 may be substantially flat (e.g., planar). In this regard, each of the top surface 46 and the bottom surface 48 may not be interrupted with one or more recesses, trenches, valleys, or other similar features. Furthermore, in an example, the top surface 46 of the second midsole portion 44 may be substantially parallel to the bottom surface 48 of the second midsole portion 44 such that the thickness ($T_{44}$) of the second midsole portion 44 is substantially the same across the length ($L_{14}$) of the sole structure 14.

In some examples, at least one of the first midsole portion 36 and the second midsole portion 44 are formed from a foamed material. In some instances, one or both of the first midsole portion 36 and the second midsole portion 44 are formed from a polymeric material. In some examples, the first midsole portion 36 and the second midsole portion 44 are formed from the same material. In another example, the first midsole portion 36 and the second midsole portion 44 are formed from different materials. The first midsole portion 36 may be formed from a first material and the second midsole portion 44 may be formed from a second material. The first material forming the first midsole portion 36 may have substantially the same stiffness as the second material forming the second midsole portion 44. In some instances, the first material forming the first midsole portion 36 has a different stiffness than the second material forming the second midsole portion 44. In other examples, the first material forming the first midsole portion 36 is the same as the second material forming the second midsole portion 44. In yet another example, the first material forming the first midsole portion 36 is different than the second material forming the second midsole portion 44.

As shown in FIG. 4, the article of footwear 10 further includes a sheet of material 52 defining at least a portion of the upper 12. The sheet of material 52 includes a top surface 54, a bottom surface 56 and a sidewall surface 58 extending between the top surface 54 and the bottom surface 56. The sidewall surface 58 may define a thickness ($T_{52}$) of the sheet of material 52 extending between the top surface 54 and the bottom surface 56.

In an example, the sheet of material 52 is formed from a flexible material. The sheet of material 52 may include a fabric material, a woven textile (see, e.g., enlarged view of the sheet of material 52 in FIG. 4), or a knitted textile (see, e.g., enlarged view of the sheet of material 52 in FIG. 4). In some instances, the sheet of material 52 is porous. The sheet of material 52 may be formed from a polymeric material such as, for example, a thermoplastic polymeric material. An exemplary thermoplastic polymeric material may include, for example, a thermoset polymeric material or the like. In some examples, the sheet of material 52 may be a thermoformable material. In some examples, if the sheet of material 52 is a woven or knit structure (as seen in, e.g., the enlarged view of FIG. 4), the woven or knit structure may be formed from a polyester yarn. Furthermore, in other examples, if the sheet of material 52 is a woven or knit structure (as seen in, e.g., the enlarged view of FIG. 4), each passage or aperture formed by overlapping members defining the woven or knit structure of the sheet of material 52 may be at least 0.5 mm in length in a largest dimension or at least 1.0 mm in length in a largest dimension. Furthermore, each passage or aperture formed by overlapping members defining the woven or knit structure of the sheet of material 52 may permit one or both of the first midsole portion 36 and the second midsole portion 44 to directly contact one another. In other implementations, one or both of the first midsole portion 36 and the second midsole portion 44 may be injection molded around or through each passage or aperture formed by overlapping members defining the woven or knit structure of the sheet of material 52.

In some instances, the sheet of material 52 is an embroidered textile and has one or more first regions including embroidery and one or more second regions without embroidery or with a lower percentage of embroidered surface area as comparted to the one or more first regions. The embroidery can provide reduced stretch or a "lock down" feature to areas of the sheet of material 52. Such areas of the sheet of material 52 providing a reduced stretch quality may be located, for example, at a region of the sheet of material 52 that is arranged between the first midsole portion 36 and the second midsole portion 44, or, alternatively at a region that extends beyond the sidewall surface 58 of the sheet of material 52.

The sheet of material 52 may define a plurality of regions 60, 62, 64. Each of the top surface 54 and the bottom surface 56 may extend across the plurality of regions 60, 62, 64. The plurality of regions 60, 62, 64 may be defined by a central region 60, an outer region 62 and an intermediate region 64 extending between the central region 60 and the outer region 62. The intermediate region 64 may separate the central region 60 from the outer region 62 by a distance ($D_{64}$).

The central region 60 of the sheet of material 52 may be defined by a shape or size that generally corresponds to a shape or size defining the top surface 46 or the bottom surface 48 of the second midsole portion 44. The distance ($D_{64}$) that separates the central region 60 from the outer region 62 may be approximately equal to the thickness ($T_{44}$) of the second midsole portion 44.

With reference to FIG. 4, the first midsole portion 36 is disposed between the outsole 26 and the upper 12. With reference to FIG. 11, the second midsole portion 44 is disposed between the first midsole portion 36 and the upper 12. As shown in FIGS. 4 and 11, the sheet of material 52 is disposed between the first midsole portion 36 and the second midsole portion 44. The bottom surface 56 of the sheet of material 52 extends across the top surface 38 of the first midsole portion 36 and beyond the sidewall surface 42 of the first midsole portion 36. The top surface 54 of the sheet of material 52 extends across the bottom surface 48 of the second midsole portion 44 and beyond the sidewall surface 50 of the second midsole portion 44. With reference to FIGS. 4 and 11, when forming the article of footwear 10, the top surface 54 of the sheet of material 52 extends at least partially over the sidewall surface 50 of the second midsole portion 44 in a direction (X), as shown in FIG. 4, toward the top surface 46 of the second midsole portion 44.

Figure 5:
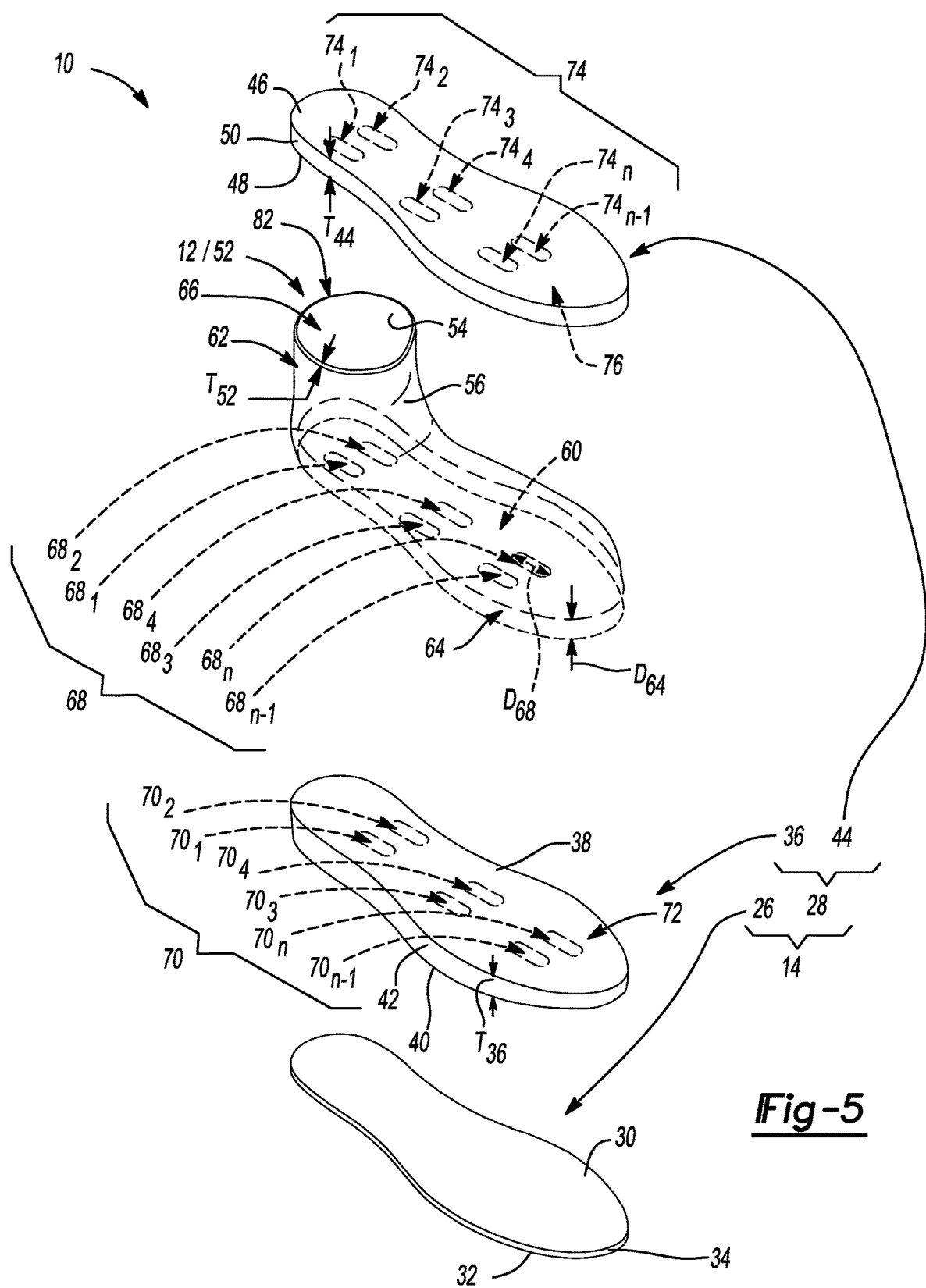
FIG. 5 is an exploded perspective view of the article of footwear of FIG. 1 illustrating a component of the article of footwear that contributes to formation of an upper arranged in a non-flat orientation defining at least a portion of a foot-receiving cavity.

With reference to FIGS. 4 and 5, at least the outer region 62 of the sheet of material 52 is sized for defining the upper 12 of the article of footwear 10. As shown in FIG. 5, upon the outer region 62 of the sheet of material 52 forming the upper 12, the top surface 46 of the second midsole portion 44 and the top surface 54 of the sheet of material 52 defined by the outer region 62 of the sheet of material 52 generally form a cavity 66 that is sized for receiving a foot (not shown) of a user.

Because the sheet of material 52 is disposed between the first midsole portion 36 and the second midsole portion 44 and extends across: (1) the top surface 38 of the first midsole portion 36 and beyond the sidewall surface 42 of the first midsole portion 36 and (2) the bottom surface 48 of the second midsole portion 44 and beyond the sidewall surface 50 of the second midsole portion 44, the sheet of material 52 may be defined as extending across substantially most or all of the length ($L_{14}$) of the sole structure 14 including, for example, the forefoot region 16, the midfoot region 18, and the heel region 20. In another example, the sheet of material 52 may extend across some or all of the heel region 20 of the sole structure 14 but not the forefoot region 16 or the midfoot region 18 of the sole structure 14. In yet another example, the sheet of material 52 may extend across some or all of the forefoot region 16 of the sole structure 14 but not the midfoot region 18 or the heel region 20 of the sole structure 14. In an implementation, the sheet of material 52 may be divided into a first portion extending across some or all of the forefoot region 16, and a second portion extending across some or all of the heel region 20 of the sole structure 14, but not the midfoot region 18 of the sole structure 14. In other examples, the sheet of material 52 may extend across substantially all of a width ($W_{14}$) of the sole structure 14 or one or more portions of the width ($W_{14}$) of the sole structure 14. The width ($W_{14}$) of the sole structure 14 may extend between the medial side 22 and the lateral side 24.

With reference o FIG. 4, at least the central region 60 of the sheet of material 52 may further define at least one passage or aperture 68 or absence of the sheet of material 52. The at least one passage 68 extends through the thickness ($T_{52}$) of the sheet of material 52 between the top surface 54 and the bottom surface 56. In an example, the at least one passage 68 is formed in the central region 60 of the sheet of material 52 and not the outer region 62 or the intermediate region 64 of the sheet of material 52. Although an implementation of the sheet of material 52 may include the at least one passage 68 exclusively formed in the central region 60 of the sheet of material 52, other implementations of the sheet of material 52 may include the at least one passage 68 formed in two or more of the central region 60, the outer region 62 or the intermediate region 64 of the sheet of material 52. If a polymeric material defines one or both of the first midsole portion 36 and the second midsole portion 44, the polymeric material may be molded around any surface defining the sheet of material 52 and/or through at least one passage 68 that extends through the thickness ($T_{52}$) of the sheet of material 52.

The at least one passage 68 may include a plurality of passages or apertures $68_1$-$68_n$. For example, the at least one passage 68 may include a first passage $68_1$, a last passage $68_n$ and one or more intermediate passages $68_2$-$68_{n-1}$. In an example, as shown in FIG. 4, the plurality of passages $68_1$-$68_n$ may be arranged in any desirable pattern (e.g., in: (1) a row-and-column grid, (2) staggered rows and columns, or (3) a random pattern) extending across the central region 60 of the sheet of material 52 between the forefoot region 16 and the heel region 20 of the sole structure 14 (i.e., across substantially most or all of the length ($L_{14}$) of the sole structure 14) and between the medial side 22 and the lateral side 24 of the article of footwear 10 (i.e., across the width ($W_{14}$) of the sole structure 14). In other implementations, the plurality of passages $68_1$-$68_n$ may be arranged in a pattern (e.g., in: (1) a row-and-column grid, (2) staggered rows and columns, or (3) a random pattern) that does not extend across the central region 60 of the sheet of material 52 between the forefoot region 16 and the heel region 20 of the sole structure 14 or between the medial side 22 and the lateral side 24 of the article of footwear 10. Although the plurality of passages $68_1$-$68_n$ may extend across substantially most or all of the length ($L_{14}$) of the sole structure 14 as described above, the plurality of passages $68_1$-$68_n$ may be arranged in a pattern (e.g., in: (1) a row-and-column grid, (2) staggered rows and columns, or (3) a random pattern) extending across: (1) some or all of the heel region 20 of the sole structure 14 but not the forefoot region 16 or the midfoot region 18 of the sole structure 14, (2) some or all of the forefoot region 16 of the sole structure 14 but not the midfoot region 18 or the heel region 20 of the sole structure 14 or (3) some or all of the forefoot region 16 and the heel region 20 of the sole structure 14 but not the midfoot region 18 of the sole structure 14.

With continued reference to FIG. 4, each passage of the plurality of passages $68_1$-$68_n$ is shown being defined by a substantially circular or oval shape having any dimension or diameter ($D_{68}$). In some examples, the dimension or diameter ($D_{68}$) may be approximately equal to about 0.5 mm or about 3.0 mm. In other examples, the dimension or diameter ($D_{68}$) may be between approximately 0.5 mm and approximately 3.0 mm. Furthermore, each passage of the plurality of passages $68_1$-$68_n$ define a substantially similar dimension or diameter ($D_{68}$). Although each passage of the plurality of passages $68_1$-$68_n$ may define a substantially similar sized or shaped dimension or diameter ($D_{68}$), implementations of the sheet of material 52 may include at least one passage of the plurality of passages $68_1$-$68_n$ having a different sized or shaped dimension or diameter ($D_{68}$). For example, at least one passage of the plurality of passages $68_1$-$68_n$ may have a different sized or shaped dimension or diameter ($D_{68}$) than another passage of the plurality of passages $68_1$-$68_n$ in the heel region 20 of the sole structure 14, the forefoot region 16 of the sole structure 14, or the forefoot region 16 and the heel region 20 of the sole structure 14.

The top surface 38 of the first midsole portion 36 may further define at least one second midsole contacting region 70 and at least one sheet of material contacting region 72. The bottom surface 48 of the second midsole portion 44 may further define at least one first midsole contacting region 74 and at least one sheet of material contacting region 76.

Each of the at least one second midsole contacting region 70 of the first midsole portion 36 and the at least one first midsole contacting region 74 of the second midsole portion 44 may define a size or shape that generally corresponds to a size or shape of the at least one passage 68 formed in the central region 60 of the sheet of material 52. If the at least one passage 68 formed by the central region 60 of the sheet of material 52 defines a plurality of passages $68_1$-$68_n$, each of the at least one second midsole contacting region 70 of the first midsole portion 36 and the at least one first midsole contacting region 74 of the second midsole portion 44 may define a corresponding plurality of second midsole contacting regions $70_1$-$70n$ and a plurality of first midsole contacting regions $74_1$-$74n$. Furthermore, as shown in FIG. 4, each passage and contacting region of the plurality of passages $68_1$-$68_n$ may be respectively axially aligned with one of the plurality of second midsole contacting regions $70_1$-$70n$ and one of the plurality of first midsole contacting regions $74_1$-$74_n$.

In an example, when the article of footwear 10 is formed, surfaces of the outsole 26, the first midsole portion 36, the second midsole portion 44 and the sheet of material 52 may be arranged near, proximate, spaced-apart-from or adjacent one another. For example, the at least one sheet of material contacting region 72 of the top surface 38 of the first midsole portion 36 may be disposed adjacent the bottom surface 56 of the sheet of material 52, and the at least one sheet of material contacting region 76 of the bottom surface 48 of the second midsole portion 44 may be disposed adjacent the top surface 54 of the sheet of material 52 defined by the central region 60 of the sheet of material 52.

Once the sheet of material 52 is arranged relative to the first midsole portion 36 and the second midsole portion 44, as described above, the sheet of material 52 may be said to be arranged between the first midsole portion 36 and the second midsole portion 44. Even though the sheet of material 52 may be disposed between the first midsole portion 36 and the second midsole portion 44, one or more portions of the first midsole portion 36 may be in direct contact with one or more portions of the second midsole portion 44 as a result of the formation of the at least one passage 68 of the sheet of material 52 such that at least one second midsole contacting region 70 of the top surface 38 of the first midsole portion 36 may be disposed adjacent the at least one first midsole contacting region 74 of the bottom surface 48 of the second midsole portion 44. After arranging the at least one second midsole contacting region 70 of the top surface 38 of the first midsole portion 36 adjacent the at least one first midsole contacting region 74 of the bottom surface 48 of the second midsole portion 44, the sheet of material 52 and the midsole 28 defined by the first midsole portion 36 and the second midsole portion 44 may be arranged in a mold tool 92 (see, e.g., FIGS. 6-9) for directly bonding the first midsole portion 36 to the second midsole portion 44 at the at least one second midsole contacting region 70 and the at least one first midsole contacting region 74.

The mold tool 92 includes an upper mold half $92_U$ and a lower mold half $92_L$. Each of the upper mold half $92_U$ and the lower mold half $92_L$ may define a mold surface that corresponds to the shape of the central region 60 of the sheet of material 52 for bonding the first midsole portion 36 to the second midsole portion 44 under heat and pressure.

Figure 6:
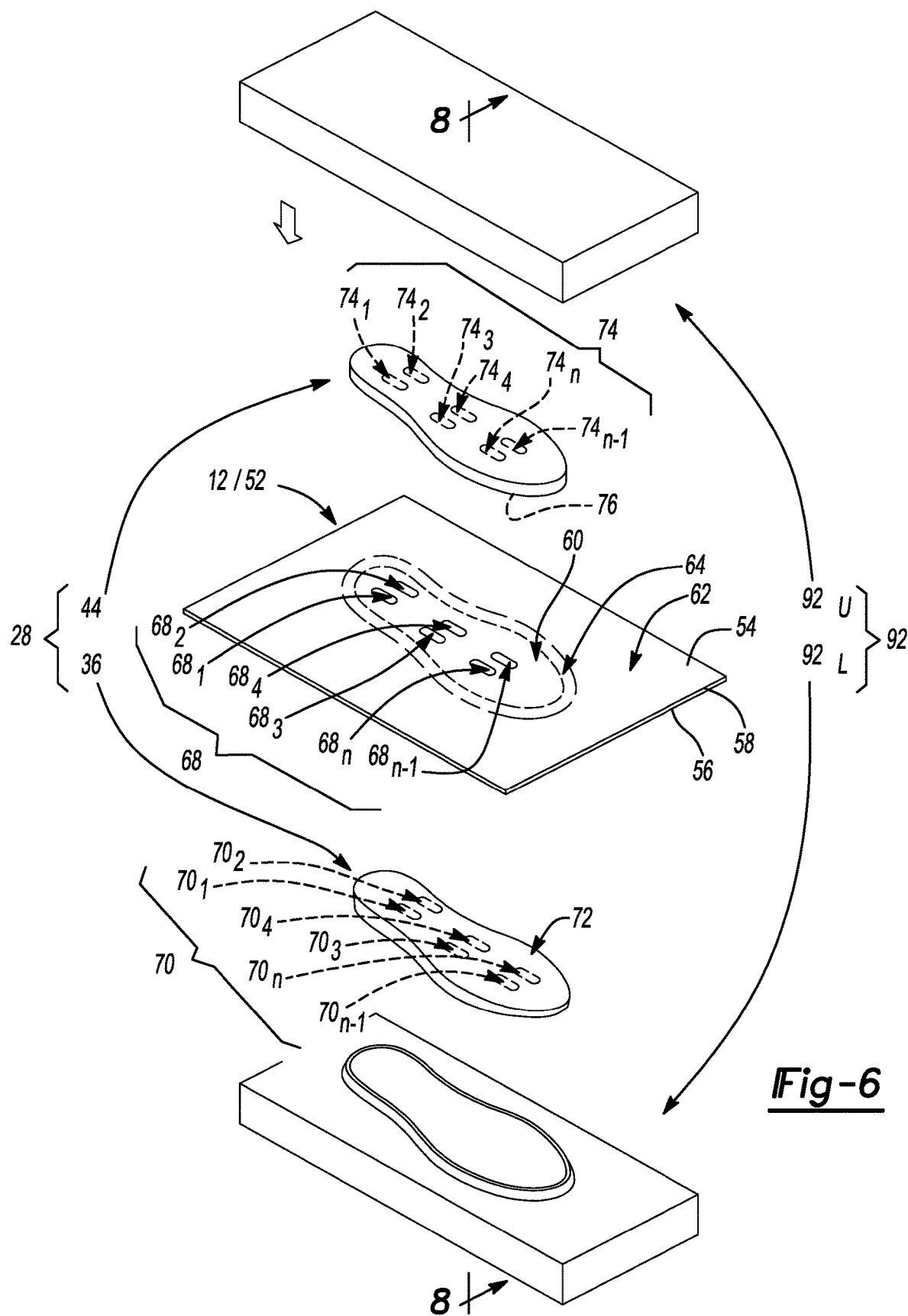
FIG. 6 is a perspective view of an exemplary mold tool and a portion of the article of footwear corresponding to FIG. 4.
Figure 7:
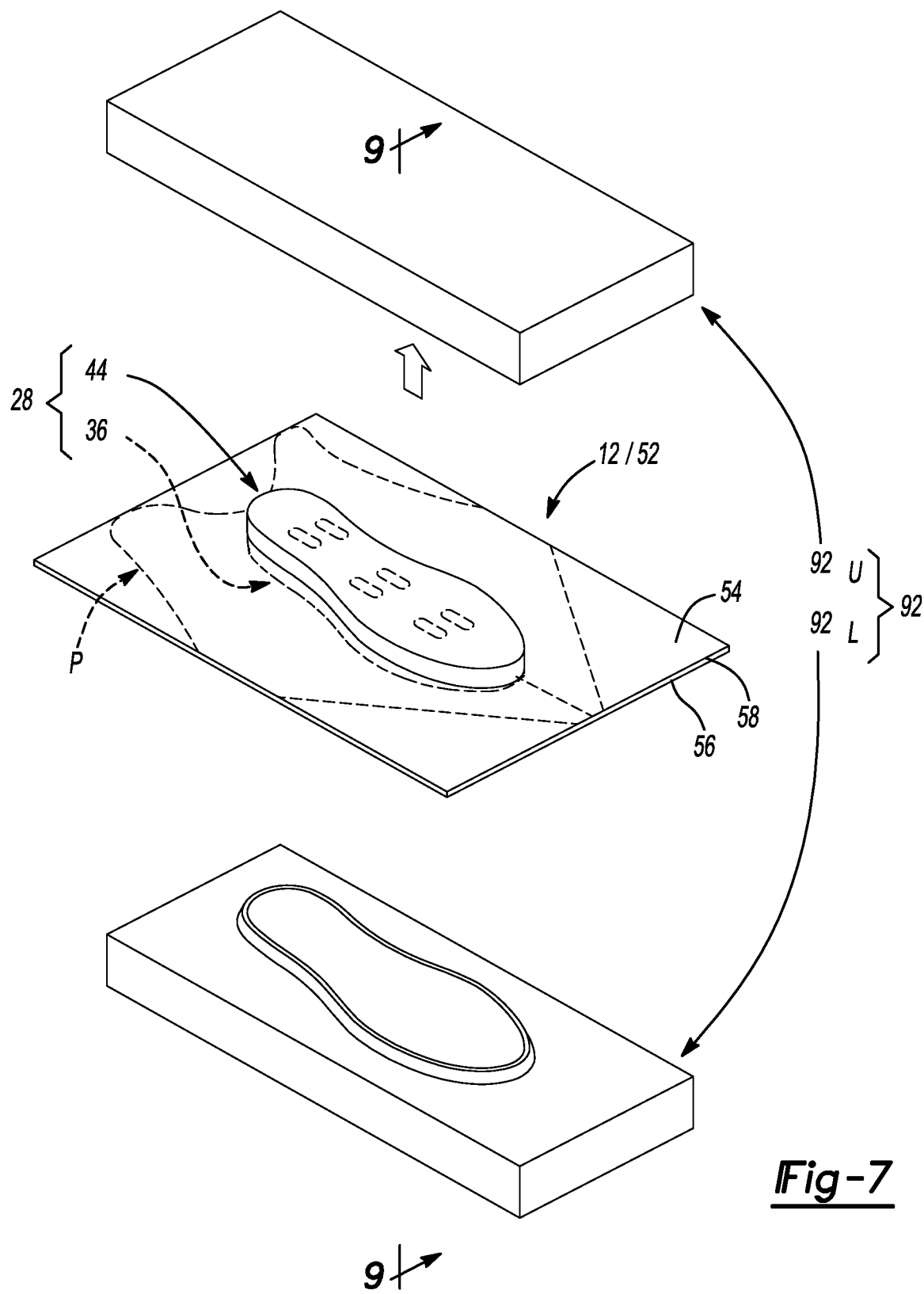
FIG. 7 is a further perspective view of the mold tool and the portion of the article of footwear of FIG. 6 arranged in a further partially assembled state.
Figure 8:
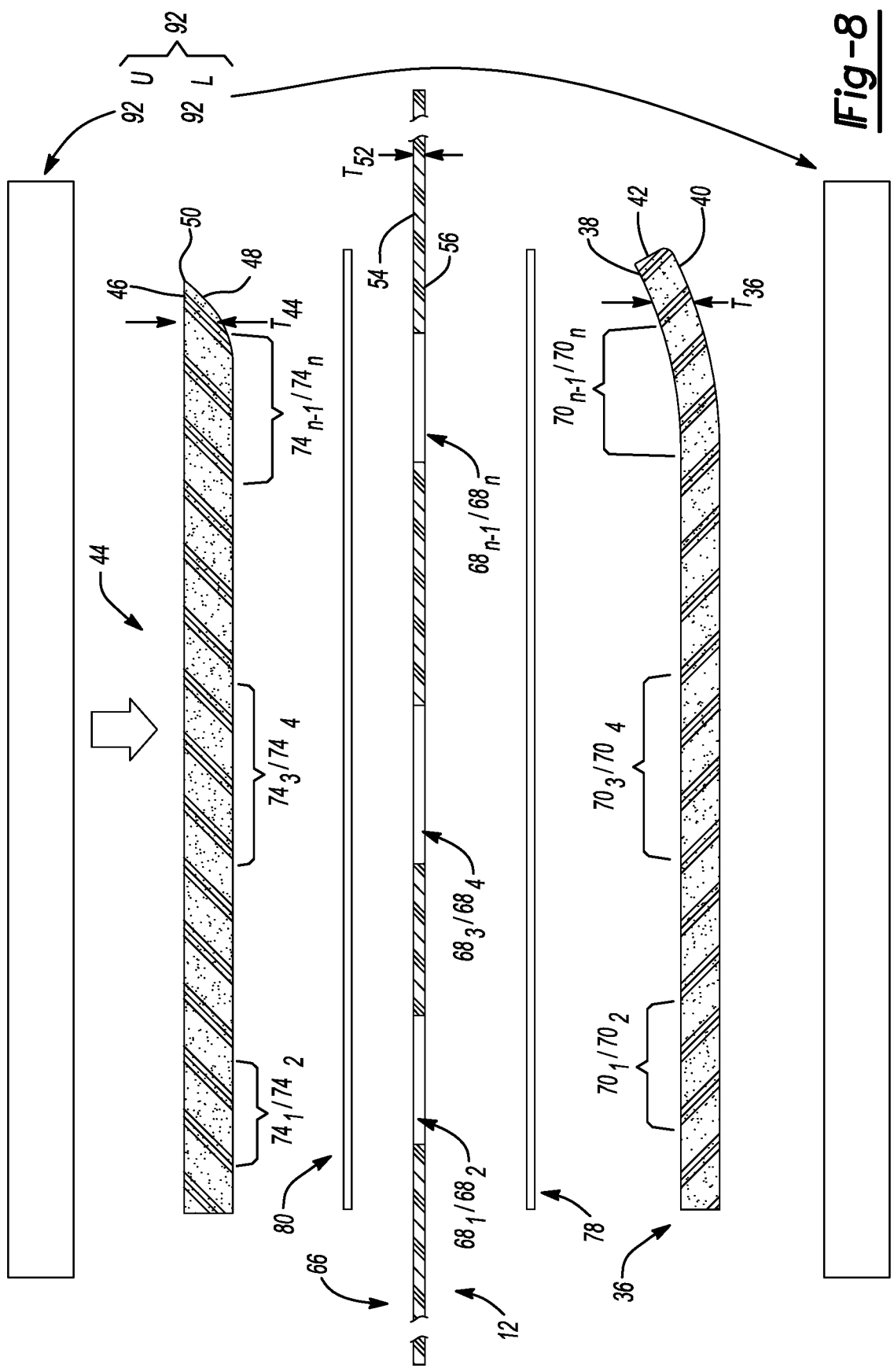
FIG. 8 is a cross-sectional view of the mold tool and the portion of the article of footwear taken along Line 8-8 of FIG. 6.
Figure 9:
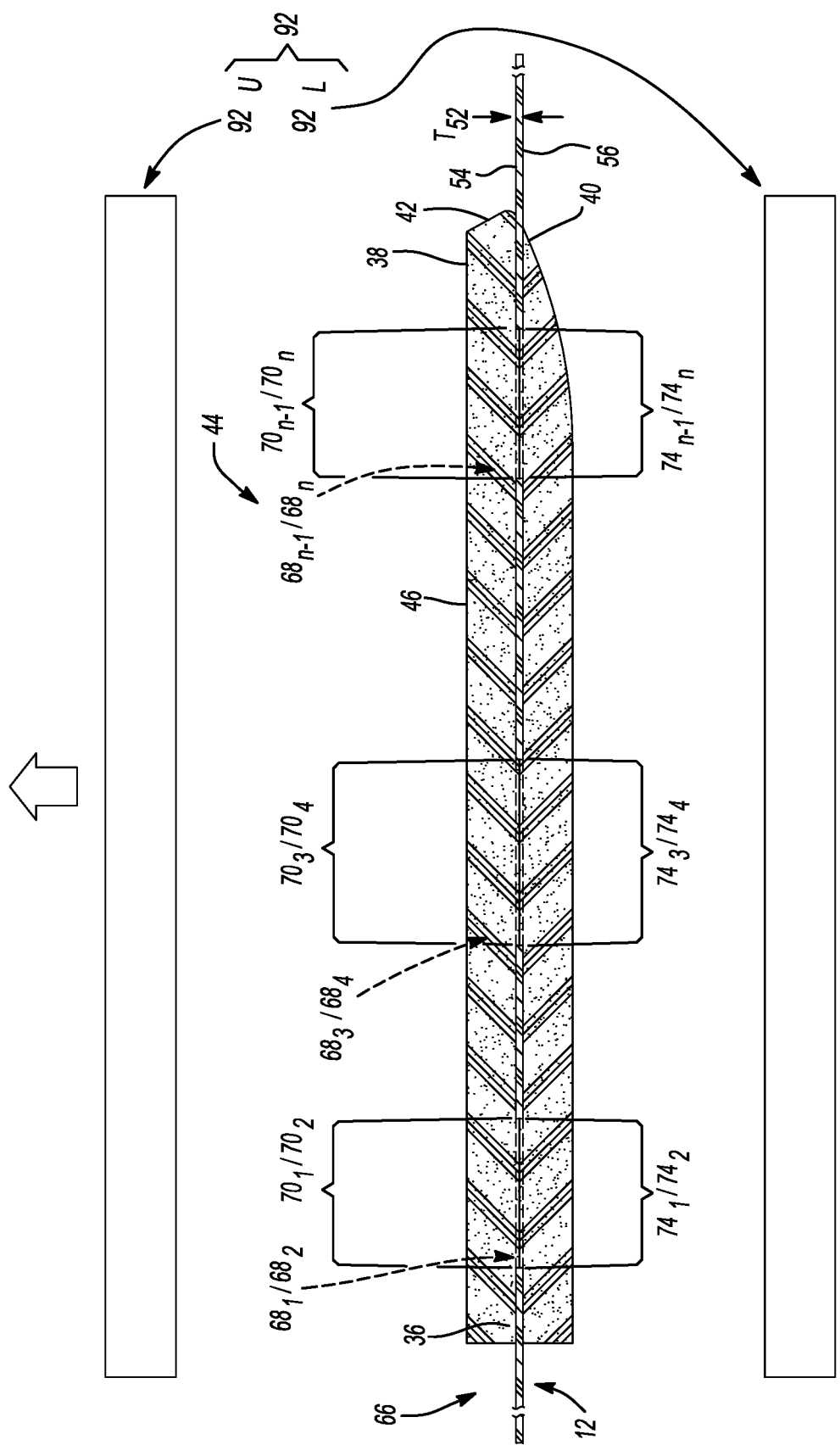
FIG. 9 is a cross-sectional view of the mold tool and the portion of the article of footwear taken along Line 9-9 of FIG. 7.
Figure 12:
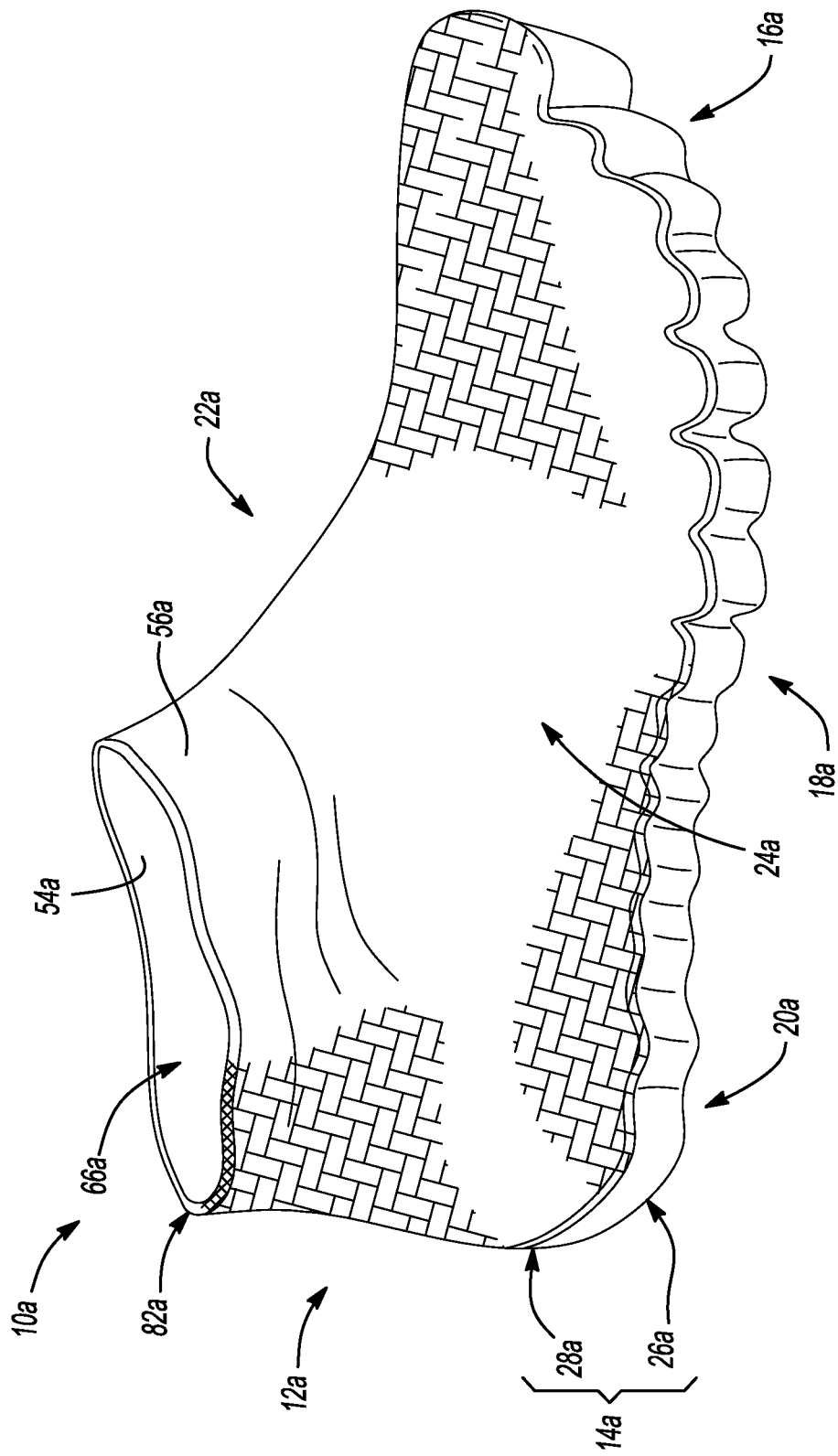
FIG. 12 is a perspective view of an article of footwear incorporating a sole structure in accordance with the principles of the present disclosure.
Figure 13:
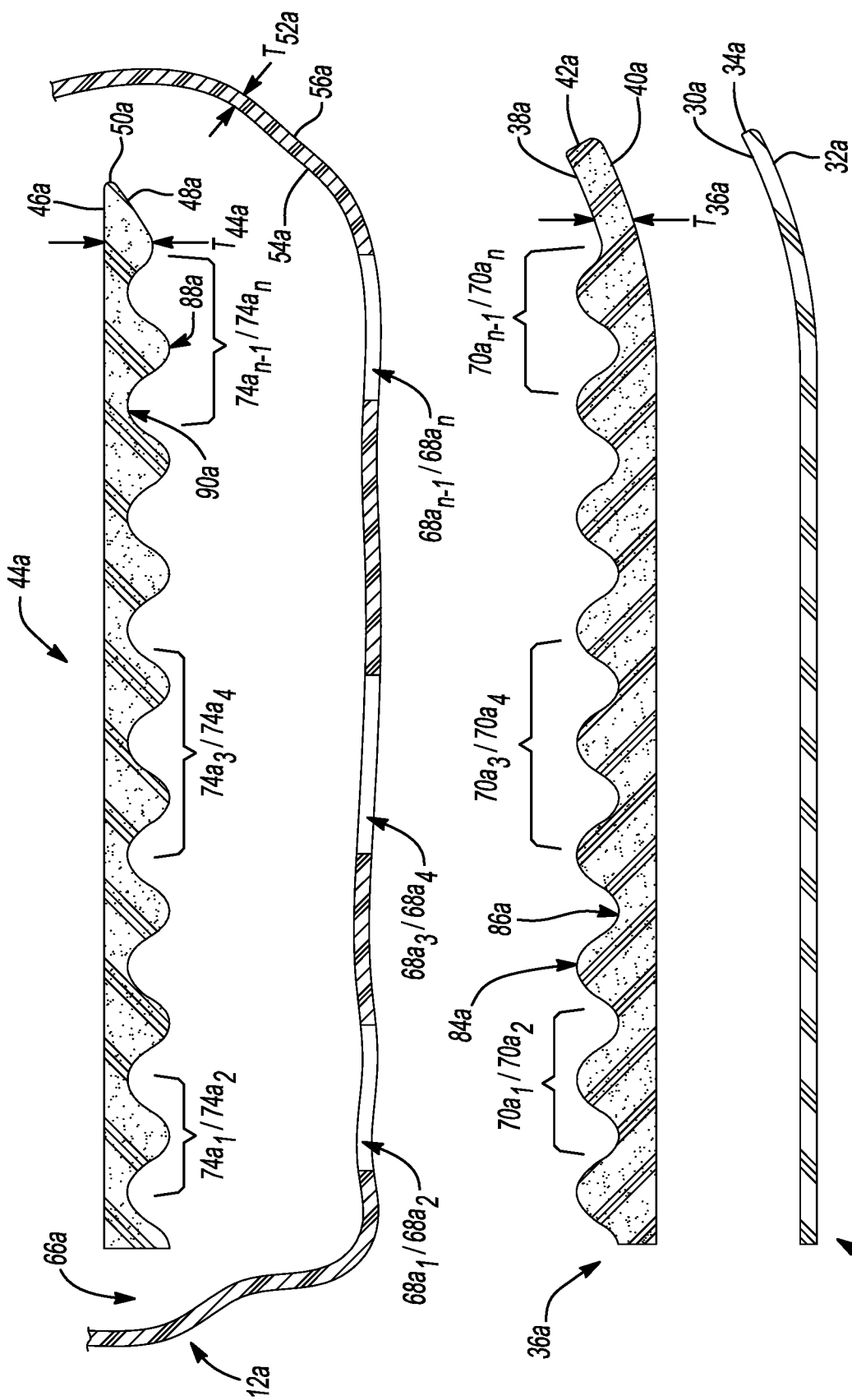
FIG. 13 is an exploded cross-sectional view of the article of footwear of FIG. 12.
Figure 14:
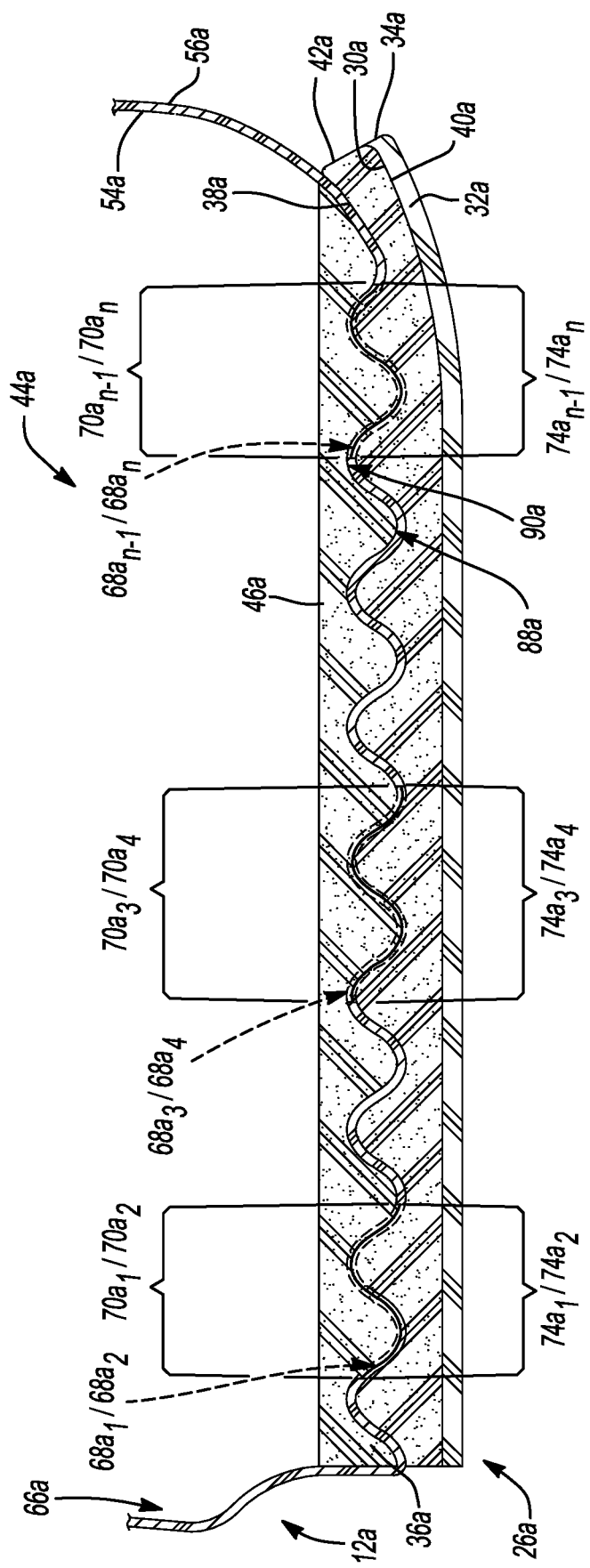
FIG. 14 is an assembled cross-sectional view of the article of footwear of FIG. 12.

As shown in FIGS. 6 and 8, the mold tool 92 is arranged in an open configuration by spacing apart the upper mold half $92_U$ and the lower mold half $92_L$ such that the first midsole portion 36, the second midsole portion 44 and the sheet of material 52 are arranged therebetween. Then, as shown in FIGS. 7 and 9, after arranging the mold tool 92 in a closed configuration for a period of time, the mold tool 92 may be returned to the open configuration with the first midsole portion 36 bonded to the second midsole portion 44 and the sheet of material 52 secured therebetween.

Thereafter, as shown in FIG. 10, the midsole-contacting surface 30 of the outsole 26 may be disposed adjacent the bottom surface 40 of the first midsole portion 36 for joining the outsole 26 to the first midsole portion 36. In an example, the outsole 26 may be joined to the first midsole portion 36 with an adhesive or by way of a molding tool in a substantially similar manner as described above.

With continued reference to FIGS. 10-11, the outer region 62 and the intermediate region 64 of the sheet of material 52 is folded upwardly such that the intermediate region 64 defined by the top surface 54 of the sheet of material 52 is disposed adjacent the sidewall surface 50 of the second midsole portion 44. After the intermediate region 64 defined by the top surface 54 of the sheet of material 52 is disposed adjacent the sidewall surface 50 of the second midsole portion 44, the outer region 62 of the sheet of material 52 forms the upper 12. In an example, one or more of the outer region 62 and the intermediate region 64 of the sheet of material 12 may be stamped, slit, perforated, cut or otherwise formed to define a pattern P that defines the upper 12.

Although the mold tool 92 may be utilized for joining the first midsole portion 36 to the second midsole portion 44 under heat and pressure by way of the at least one passage 68 of the sheet of material 52, as shown in FIG. 8, in some configurations, optional adhesive 78, 80 may also or alternatively be utilized for adhering the first midsole portion 36 to the second midsole portion 44. Although FIG. 8 illustrates the optional adhesive 78, 80 in the form of a sheet having a shape that substantially corresponds to the shape of the central region 60 of the sheet of material 52, the optional adhesive 78, 80 may conform to any desirable shape, pattern or configuration, such as, for example, the shape, pattern or configuration of the of the at least one passage 68 of the sheet of material 52.

In an example, a first optional adhesive 78 may be arranged between the first midsole portion 36 and the second midsole portion 44; furthermore, the first optional adhesive 78 may be arranged between the top surface 38 of the first midsole portion 36 and the bottom surface 56 of the sheet of material 52 such that the first optional adhesive 78 is axially aligned with and radially extends across at least a portion of the shape, pattern or configuration of the of the at least one passage 68 of the sheet of material 52. The first optional adhesive 78 adhesively bonds the first midsole portion 36, the second midsole portion 44 and the sheet of material 52 together.

In another example, a second optional adhesive 80 may be arranged between the first midsole portion 36 and the second midsole portion 44; furthermore, the second optional adhesive 80 may be arranged between the top surface 54 of the sheet of material 52 and the bottom surface 48 of the second midsole portion 44 such that the second optional adhesive 80 is axially aligned with and radially extends across at least a portion of the shape, pattern or configuration of the of the at least one passage 68 of the sheet of material 52. The second optional adhesive 80 adhesively bonds the first midsole portion 36, the second midsole portion 44 and the sheet of material 52 together.

In yet another example, the first optional adhesive 78 and the second optional adhesive 80 may be arranged between the first midsole portion 36 and the second midsole portion 44. The first optional adhesive 78 may be arranged between the top surface 38 of the first midsole portion 36 and the bottom surface 56 of the sheet of material 52 such that the first optional adhesive 78 is axially aligned with and radially extends across at least a portion of the shape, pattern or configuration of the of the at least one passage 68 of the sheet of material 52. The second optional adhesive 80 may be arranged between the top surface 54 of the sheet of material 52 and the bottom surface 48 of the second midsole portion 44 such that the second optional adhesive 80 is axially aligned with and radially extends across at least a portion of the shape, pattern or configuration of the of the at least one passage 68 of the sheet of material 52. The first optional adhesive 78 and the second optional adhesive 80 adhesively bonds the first midsole portion 36, the second midsole portion 44 and the sheet of material 52 together.

In other configurations, when the article of footwear 10 is formed, the following surfaces of the outsole 26, the first midsole portion 36, the second midsole portion 44 and the sheet of material 52 may be arranged near, proximate, spaced-apart-from or adjacent one another. In an example, the sheet of material 52 may extend from the sidewall surface 50 of the second midsole portion 44 at one of the medial side 22 and the lateral side 24 of the sole structure 14. In another example, the sheet of material 52 may extend from the sidewall surface 50 of the second midsole portion 44 at both the medial side 22 and the lateral side 24 of the sole structure 14. In yet another example, the sheet of material 52 extends from the sidewall surface 50 of the second midsole portion 44 around an entire perimeter of the sole structure 14.

With reference to FIGS. 4-5, although an exemplary implementation of the article of footwear 10 includes the outer region 62 of the sheet of material 52 forming the upper 12, in other examples, the outer region 62 of the sheet of material 52 may form a first upper portion of the upper 12, and, as such, at least a second upper portion may also contribute to forming the upper 12. Accordingly, in another implementation, the outer region 62 of the sheet of material 52 may define a first upper portion and extend from the sidewall surface 50 of the second midsole portion 44 and at least partially cover a second upper portion (not shown) that further contributes to forming the upper 12.

As described above, the intermediate region 64 of the sheet of material 52 may separate the central region 60 of the sheet of material 52 from the outer region 62 of the sheet of material 52 by the distance ($D_{64}$). Furthermore, in an example, the outer region 62 of the sheet of material 52 may extend from top surface 46 of the second midsole portion 44 at a sufficient distance ($D_{62}$) for forming at a foot covering portion of the upper 12 that terminates to define at least a portion of an ankle opening 82 (see, e.g., FIGS. 1, 5, 11) of the upper 12. In one configuration, the central region 60 of the sheet of material 52 that is secured between the first midsole portion 36 and the second midsole portion 44 may be considered to be a portion of the midsole 28. In other configurations, the central region 60 of the sheet of material 52 that is secured between the first midsole portion 36 and the second midsole portion 44 may be considered to be a portion of the sheet of material 52 that contributes to the formation of the midsole 28, and the intermediate region 64 of the sheet of material 52 that: (1) extends beyond the sidewall surface 42 of the first midsole portion 36 and the sidewall surface 50 of the second midsole portion 44 and (2) is disposed adjacent the sidewall surface 50 of the second midsole portion 44 may both be considered to be another portion of the sheet of material 52 that contributes to the formation of the midsole 28. However, in another configuration, the intermediate region 64 of the sheet of material 52 that: (1) extends beyond the sidewall surface 42 of the first midsole portion 36 and the sidewall surface 50 of the second midsole portion 44 and (2) is disposed adjacent the sidewall surface 50 of the second midsole portion 44 may be considered to be a first portion of the upper 12, and, the outer region 62 of the sheet of material 52 that extends from top surface 46 of the second midsole portion 44 at the distance ($D_{62}$) may define a second portion of the upper 12. Therefore, the intermediate region 64 of the sheet of material 52 may contribute to the formation of one or both of the upper and the midsole 28.

With reference to FIGS. 12-16, an exemplary article of footwear 10a is provided and includes an upper 12a and a sole structure 14a attached to the upper 12a. The article of footwear 10a may be divided into one or more regions. The regions may include a forefoot region 16a, a midfoot region 18a, and a heel region 20a. The forefoot region 16a may correspond with toes and joints connecting metatarsal bones with phalanx bones of a foot. The midfoot region 18a may correspond with an arch area of the foot while the heel region 18a may correspond with rear portions of the foot, including a calcaneus bone. The article of footwear 10a may additionally include a medial side 22a and a lateral side 24a that correspond with opposite sides of the article of footwear 10a and extend through the regions 16a, 18a, 20a.

The sole structure 14a includes a midsole 28a and optionally includes an outsole 26a. A cushioning arrangement (not shown) may optionally be disposed generally between the outsole 26a and the midsole 28a.

Figure 15:
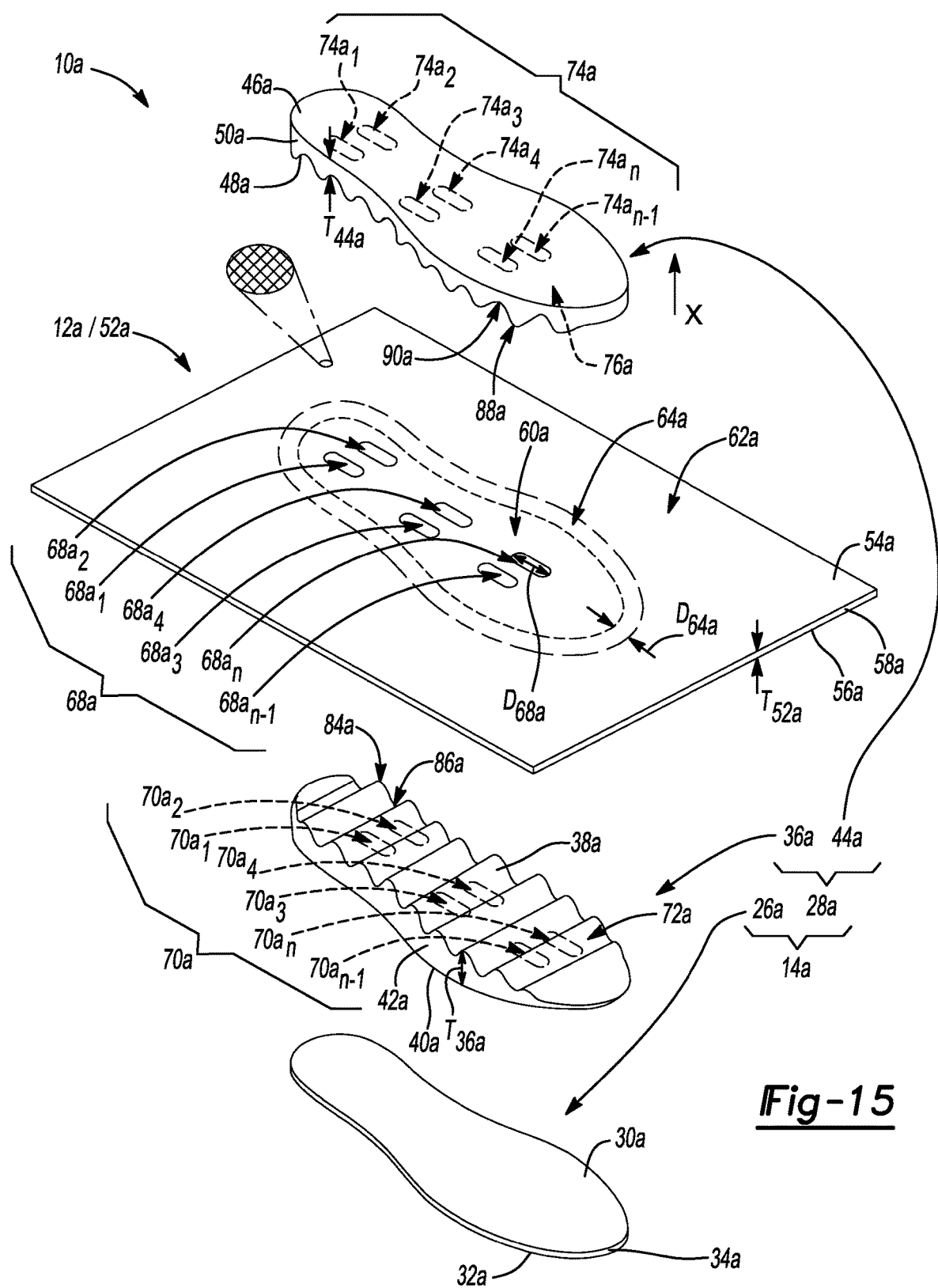
FIG. 15 is an exploded perspective view of the article of footwear of FIG. 12 illustrating a component of the article of footwear that contributes to formation of an upper arranged in a substantially flat orientation.

Referring to FIG. 15, the outsole 26a includes a midsole-contacting surface 30a and a ground-contacting surface 32a. The outsole 26a further includes a sidewall surface 34a extending between the midsole-contacting surface 30a and the ground-contacting surface 32a.

The midsole 28a includes a first midsole portion 36a and a second midsole portion 44a. The first midsole portion 36a includes a top surface 38a, a bottom surface 40a and a sidewall surface 42a extending between the top surface 38a and the bottom surface 40a. The sidewall surface 42a may define a thickness ($T_{36a}$) of the first midsole portion 36a extending between the top surface 38a and the bottom surface 40a.

The top surface 38a and the bottom surface 40a of the first midsole portion 36a may generally define an outer surface profile of the first midsole portion 36a. In an example, the top surface 38a of the first midsole portion 36a is not flat and may be defined by one or more peaks 84a and recesses, trenches or valleys 86a such that the top surface 38a of the first midsole portion 36a defines a substantially sinusoidal pattern extending between the forefoot region 16a and the heel region 20a of the sole structure 14a. Furthermore, in an example, the sinusoidal pattern of the first midsole portion 36a may be defined by a substantially constant amplitude A (see, e.g., FIG. 19) bound by each peak 84a and each valley 86a that is substantially the same across a length ($L_{14a}$) of the sole structure 14a. Further, the amplitude A defined by each peak 84a remains substantially the same as each peak 84a extends between the medial side 22a and the lateral side 24a of the sole structure 14a. Yet even further, in an example, the sinusoidal pattern of the first midsole portion 36a may be defined by a substantially constant frequency as the sinusoidal pattern extends between the forefoot region 16a and the heel region 20a of the sole structure 14a.

With continued reference to FIG. 15, the second midsole portion 44a includes a top surface 46a, a bottom surface 48a and a sidewall surface 50a extending between the top surface 46a and the bottom surface 48a. The sidewall surface 50a may define a thickness ($T_{44a}$) of the second midsole portion 44a extending between the top surface 46a and the bottom surface 48a.

The top surface 46a and the bottom surface 48a of the second midsole portion 44a may generally define an outer surface profile of the second midsole portion 44a. In an example, the bottom surface 48a of the second midsole portion 44a is not flat and may be defined by one or more peaks 88a and recesses, trenches or valleys 90a such that the bottom surface 48a of the second midsole portion 44a defines a substantially sinusoidal pattern extending between the forefoot region 16a and the heel region 20a of the sole structure 14a. Furthermore, in an example, the sinusoidal pattern of the second midsole portion 44a may be defined by a substantially constant amplitude A (see, e.g., FIG. 19) bound by each peak 88a and each valley 90a that is substantially the same across a length ($L_{14a}$) of the sole structure 14a. Further, the amplitude A defined by each peak 88a remains substantially the same as each peak 88a extends between the medial side 22a and the lateral side 24a of the sole structure 14a. Yet even further, in an example, the sinusoidal pattern of the second midsole portion 44a may be defined by a substantially constant frequency as the sinusoidal pattern extends between the forefoot region 16a and the heel region 20a of the sole structure 14a.

In some examples, at least one of the first midsole portion 36a and the second midsole portion 44a are formed from a foamed material. In some instances, one or both of the first midsole portion 36a and the second midsole portion 44a are formed from a polymeric material. In another example, the first midsole portion 36a and the second midsole portion 44a are formed from the same material. In yet another example, the first midsole portion 36a and the second midsole portion 44a are formed from different materials. In a further example, the first midsole portion 36a is formed from a first material and the second midsole portion 44a is formed from a second material. In yet a further example, the first material forming the first midsole portion 36a has substantially the same stiffness as the second material forming the second midsole portion 44a. In some instances, the first material forming the first midsole portion 36a has a different stiffness than the second material forming the second midsole portion 44a. In other examples, the first material forming the first midsole portion 36a is the same as the second material forming the second midsole portion 44a. In yet another examples, the first material forming the first midsole portion 36a is different than the second material forming the second midsole portion 44a.

As shown in FIG. 15, the article of footwear 10a further includes a sheet of material 52a. The sheet of material 52a includes a top surface 54a, a bottom surface 56a and a sidewall surface 58a extending between the top surface 54a and the bottom surface 56a. The sidewall surface 58a may define a thickness ($T_{52a}$) of the sheet of material 52a extending between the top surface 54a and the bottom surface 56a.

In an example, the sheet of material 52a is formed from a flexible material. The sheet of material 52a may include a fabric material, a woven textile (see, e.g., enlarged view of the sheet of material 52a in FIG. 15), or a knitted textile (see, e.g., enlarged view of the sheet of material 52a in FIG. 15). In some instances, the sheet of material 52a is porous. The sheet of material 52a may be formed from a polymeric material such as, for example, a thermoplastic polymeric material. An exemplary thermoplastic polymeric material may include, for example, a thermoset polymeric material or the like. In some examples, the sheet of material 52a may be a thermoformable material. In some examples, if the sheet of material 52a is a woven or knit structure (as seen in, e.g., the enlarged view of FIG. 15), the woven or knit structure may be formed from a polyester yarn. Furthermore, in other examples, if the sheet of material 52a is a woven or knit structure (as seen in, e.g., the enlarged view of FIG. 15), each passage or aperture formed by overlapping members defining the woven or knit structure of the sheet of material 52a may be at least 0.5 mm in length in a largest dimension or at least 1.0 mm in length in a largest dimension. Furthermore, each passage or aperture formed by overlapping members defining the woven or knit structure of the sheet of material 52a may permit one or both of the first midsole portion 36a and the second midsole portion 44a to directly contact one another. In other implementations, one or both of the first midsole portion 36a and the second midsole portion 44a may be injection molded around or through each passage or aperture formed by overlapping members defining the woven or knit structure of the sheet of material 52a.

In some instances, the sheet of material 52a is an embroidered textile. In some examples, the sheet of material 52a has one or more first regions including embroidery and one or more second regions without embroidery or with a lower percentage of embroidered surface area as comparted to the one or more first regions. The embroidery can provide reduced stretch or a "lock down" feature to areas of the sheet of material 52a. Such areas of the sheet of material 52a providing a reduced stretch quality may be located, for example, at a region of the sheet of material 52a that is arranged between the first midsole portion 36a and the second midsole portion 44a, or, alternatively at a region that extends beyond the sidewall surface 58a of the sheet of material 52a.

The sheet of material 52a may be further defined by a plurality of regions 60a, 62a, 64a. Each of the top surface 54a and the bottom surface 56a extends across the plurality of regions 60a, 62a, 64a. The plurality of regions 60a, 62a, 64a may be defined by a central region 60a, an outer region 62a and an intermediate region 64a extending between the central region 60a and the outer region 62a. The intermediate region 64a may separate the central region 60a from the outer region 62a by a distance ($D_{64a}$).

The central region 60a of the sheet of material 52a may be defined by a shape that generally corresponds to a shape defining the top surface 46a of the second midsole portion 44a. The distance ($D_{64a}$) that separates the central region 60a from the outer region 62a may be approximately equal to the thickness ($T_{44a}$) of the second midsole portion 44a.

Figure 22:
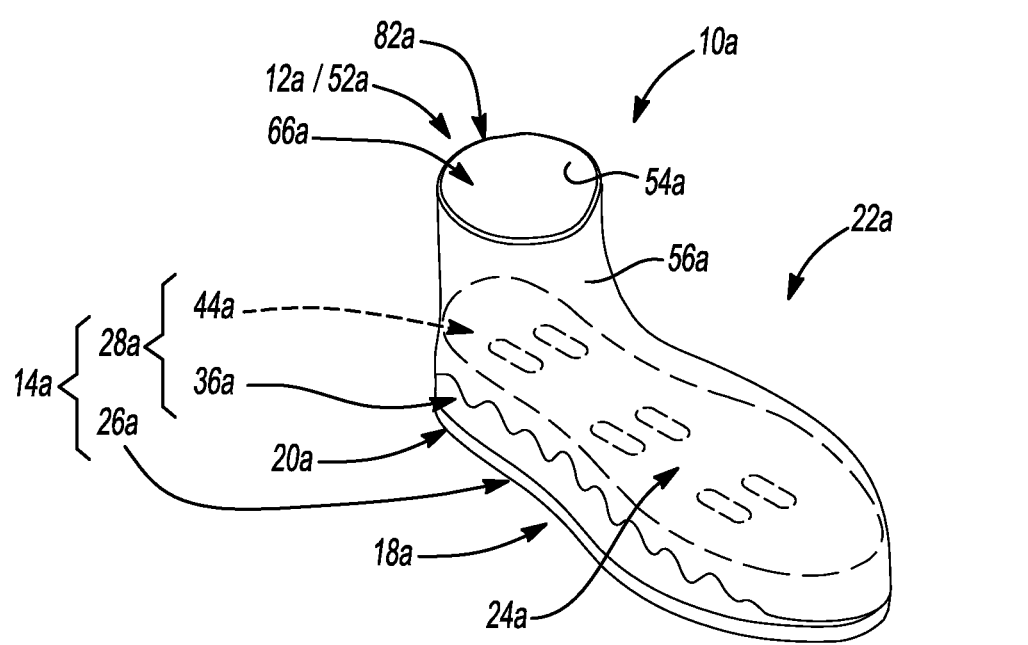
FIG. 22 is an assembled view of the article of footwear of FIG. 21.
Figure 23:
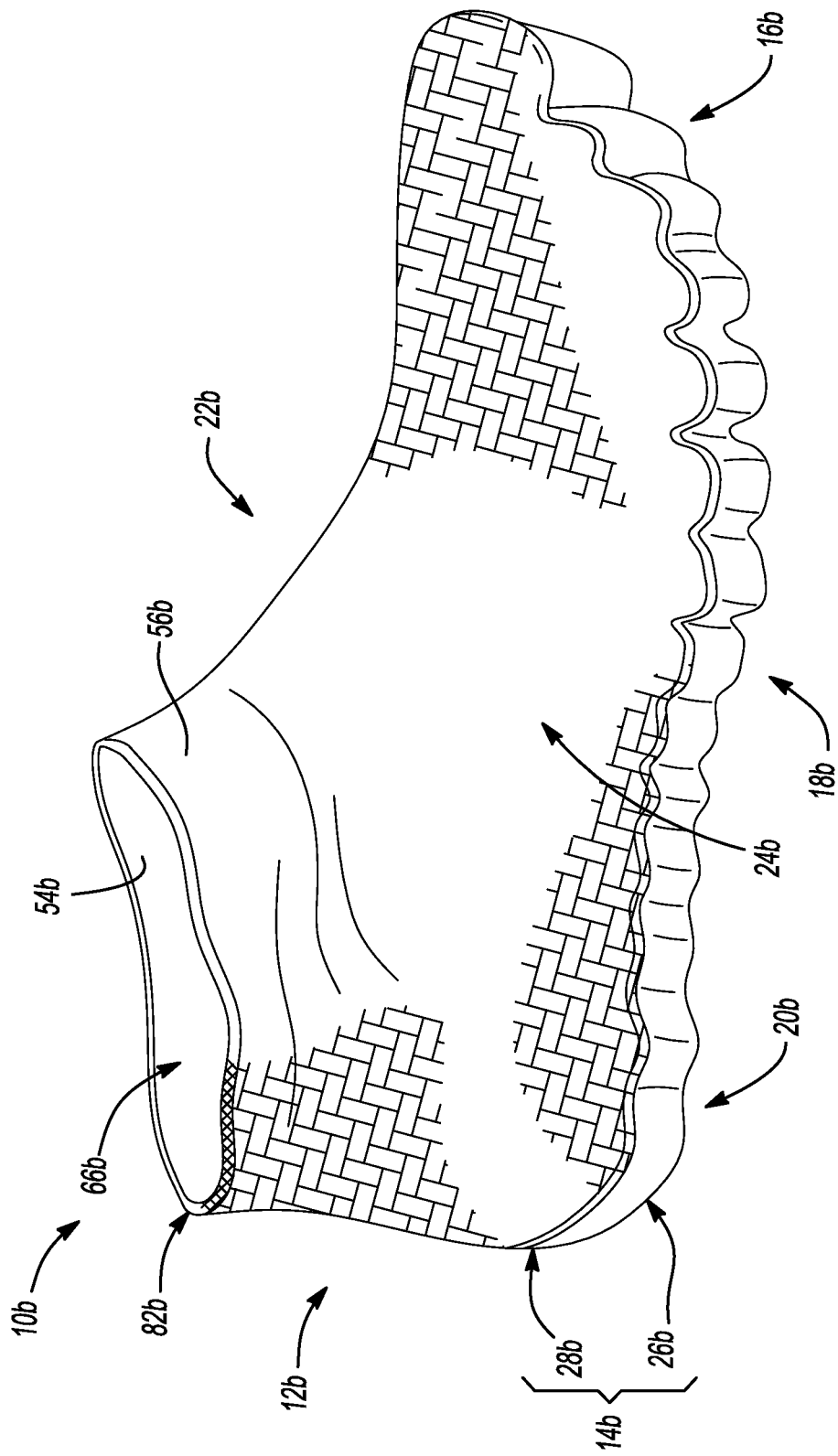
FIG. 23 is a perspective view of an article of footwear incorporating a sole structure in accordance with the principles of the present disclosure.
Figure 24:
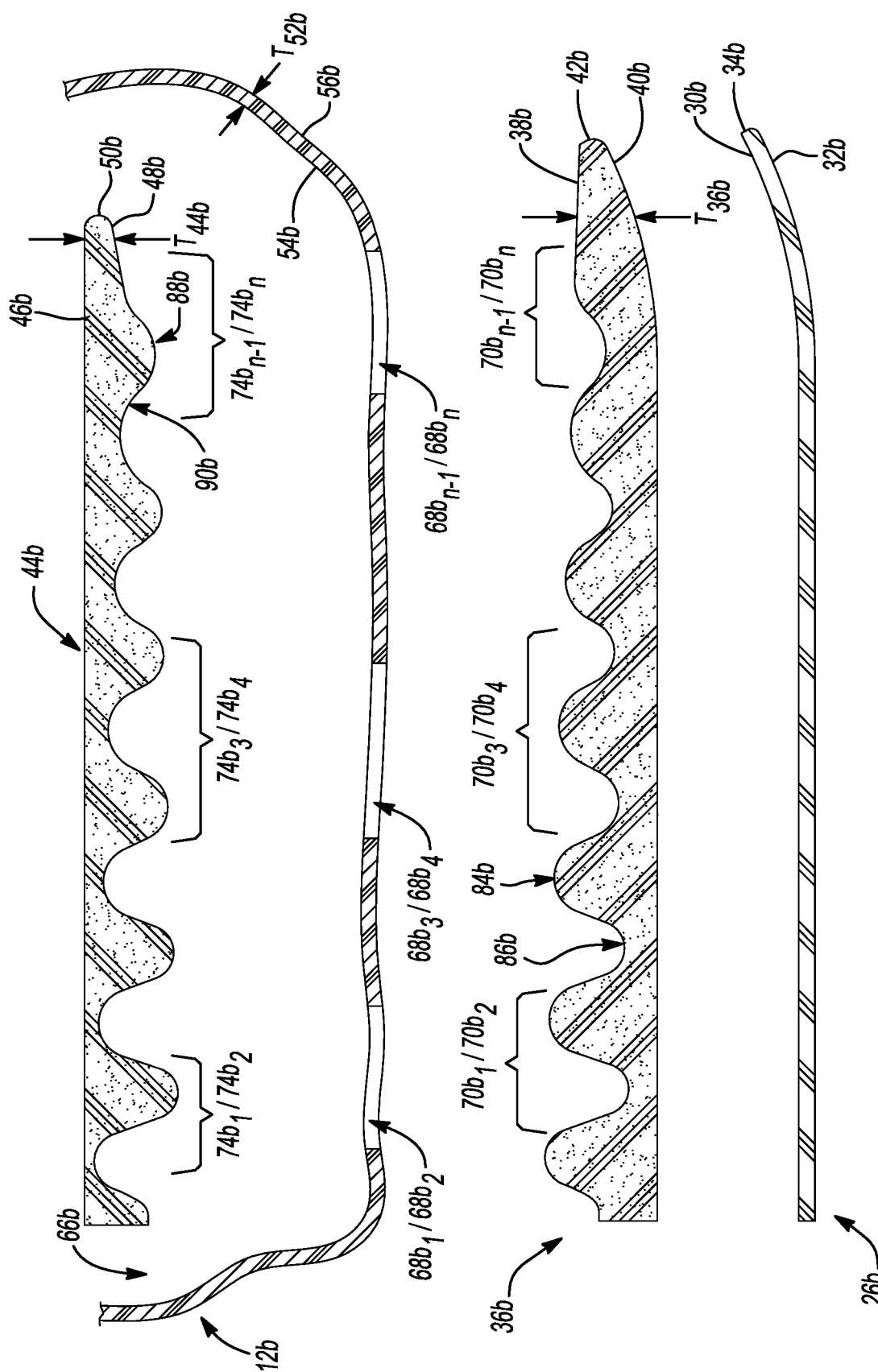
FIG. 24 is an exploded cross-sectional view of the article of footwear of FIG. 23.
Figure 25:
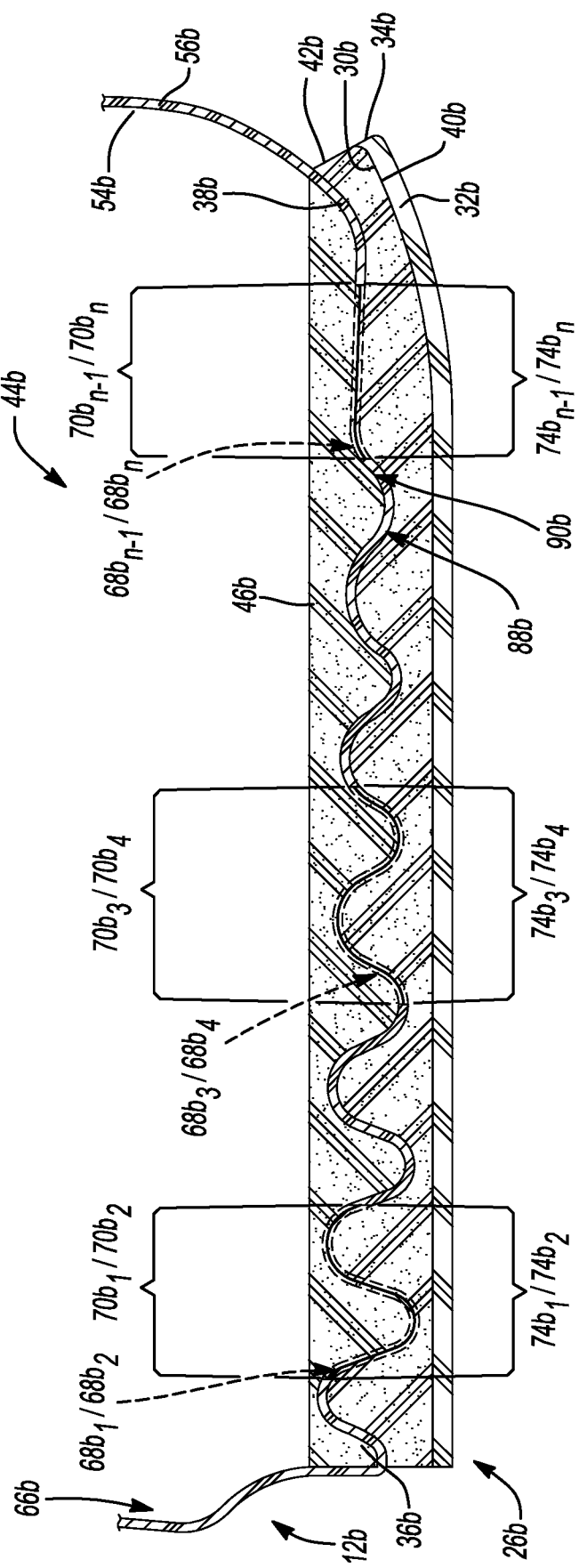
FIG. 25 is an assembled cross-sectional view of the article of footwear of FIG. 23.

With reference to FIG. 15, the first midsole portion 36a is disposed between the outsole 26a and the upper 12a. As shown in FIGS. 15 and 22, the second midsole portion 44a is disposed between the first midsole portion 36a and the upper 12a. As shown in FIG. 15, the sheet of material 52a is disposed between the first midsole portion 36a and the second midsole portion 44a. The bottom surface 56a of the sheet of material 52a extends across the top surface 38a of the first midsole portion 36a and beyond the sidewall surface 42a of the first midsole portion 36a. The top surface 54a of the sheet of material 52a extends across the bottom surface 48a of the second midsole portion 44a and beyond the sidewall surface 50a of the second midsole portion 44a. With reference to FIGS. 15 and 22, when forming the article of footwear 10a, the top surface 54a of the sheet of material 52a extends at least partially over the sidewall surface 50a of the second midsole portion 44a in a direction (X), as shown in FIG. 15, toward the top surface 46a of the second midsole portion 44a.

Figure 16:
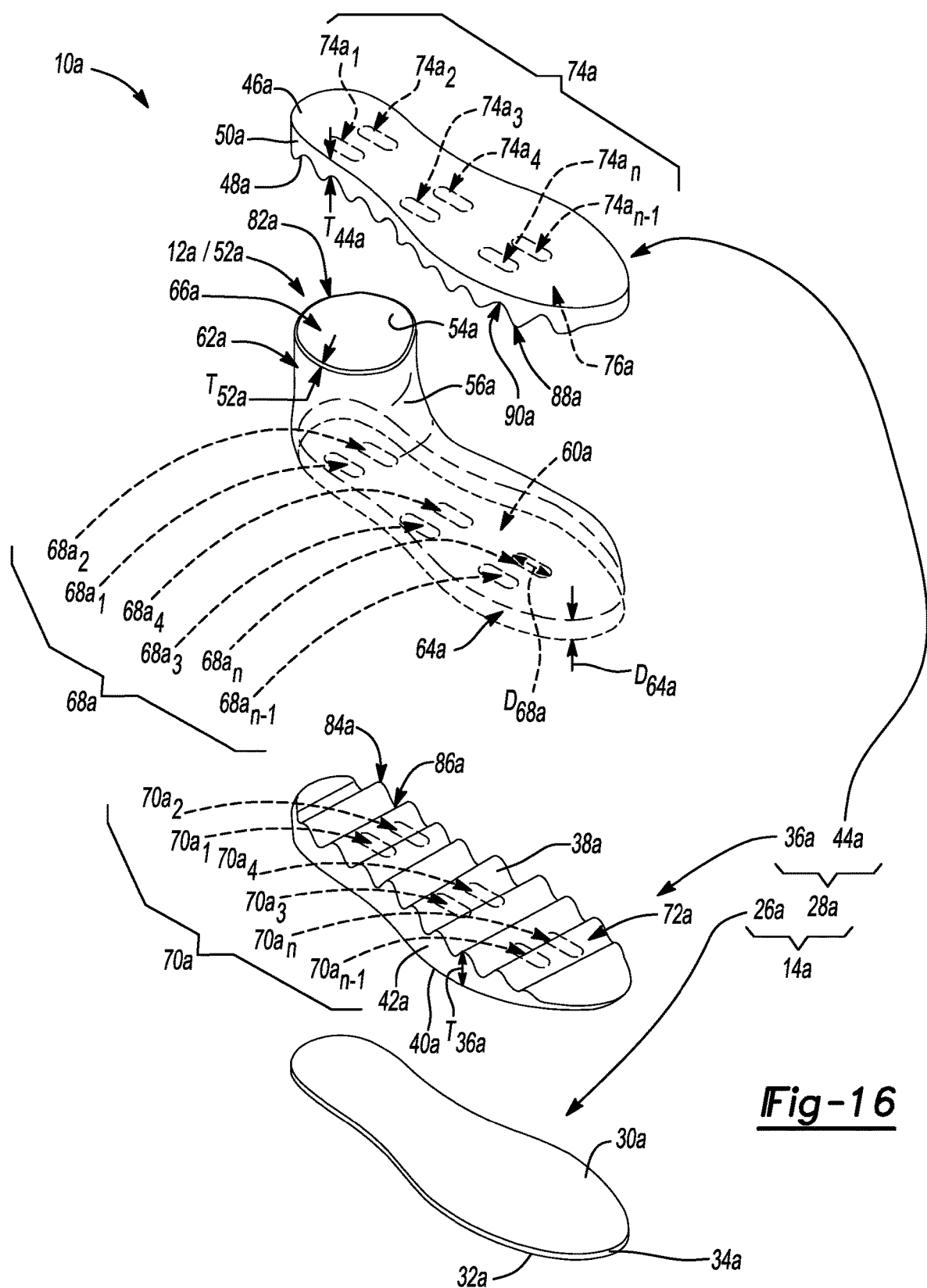
FIG. 16 is an exploded perspective view of the article of footwear of FIG. 12 illustrating a component of the article of footwear that contributes to formation of an upper arranged in a non-flat orientation defining at least a portion of a foot-receiving cavity.

With reference to FIGS. 15 and 16, the outer region 62a of the sheet of material 52a is sized for defining the upper 12a of the article of footwear 10a. As shown in FIG. 16, upon the outer region 62a of the sheet of material 52a forming the upper 12a, the top surface 54a of the sheet of material 52a defined by the outer region 62a of the sheet of material 52a generally forms a cavity 66a that is sized for receiving a foot (not shown) of a user.

With reference to FIG. 15, at least the central region 60a of the sheet of material 52a may be further define at least one passage or aperture 68a or absence of the sheet of material 52a. The at least one passage 68a extends through the thickness ($T_{52a}$) of the sheet of material 52a between the top surface 54a and the bottom surface 56a. In an example, the at least one passage 68a is formed in the central region 60a of the sheet of material 52a and not the outer region 62a or the intermediate region 64a of the sheet of material 52a. Although an implementation of the sheet of material 52a may include the at least one passage 68a exclusively formed by the central region 60a of the sheet of material 52a, other implementations of the sheet of material 52a may include the at least one passage 68a formed by two or more of the central region 60a, the outer region 62a and the intermediate region 64a of the sheet of material 52a. If a polymeric material defines one or both of the first midsole portion 36a and the second midsole portion 44a, the polymeric material may be molded around any surface defining the sheet of material 52a and/or through at least one passage 68a that extends through the thickness ($T_{52a}$) of the sheet of material 52a.

The at least one passage 68a may be defined by a plurality of passages or apertures $68a_1$-$68a_n$ having, for example: a first passage $68a_1$, a last passage $68a_n$ and one or more intermediate passages $68a_2$-$68a_{n-1}$. In an example, as shown in FIG. 15, the plurality of passages $68a_1$-$68a_n$ may be arranged in any desirable pattern (e.g., in: (1) a row-and-column grid, (2) staggered rows and columns, or (3) a random pattern) extending across the central region 60a of the sheet of material 52a between the forefoot region 16a and the heel region 20a of the sole structure 14a (i.e., across substantially most or all of the length ($L_{14a}$) of the sole structure 14a) and between the medial side 22a and the lateral side 24a of the article of footwear 10a (i.e., across the width ($W_{14a}$) of the sole structure 14a). In other implementations, the plurality of passages $68a_1$-$68a_n$ may be arranged in a pattern (e.g., in: (1) a row-and-column grid, (2) staggered rows and columns, or (3) a random pattern) that does not extend across the central region 60a of the sheet of material 52a between the forefoot region 16a and the heel region 20a of the sole structure 14a and between the medial side 22a and the lateral side 24a of the article of footwear 10a. Although the plurality of passages $68a_1$-$68a_n$ may extend across substantially most or all of the length ($L_{14a}$) of the sole structure 14a as described above, the plurality of passages $68a_1$-$68a_n$ may be arranged in a pattern (e.g., in: (1) a row-and-column grid, (2) staggered rows and columns, or (3) a random pattern) extending across: (1) some or all of the heel region 20a of the sole structure 14a but not the forefoot region 16a or the midfoot region 18a of the sole structure 14a, (2) some or all of the forefoot region 16a of the sole structure 14a but not the midfoot region 18a or the heel region 20a of the sole structure 14a or (3) some or all of the forefoot region 16a and the heel region 20a of the sole structure 14a but not the midfoot region 18a of the sole structure 14a.

With continued reference to FIG. 15, each passage of the plurality of passages $68a_1$-$68a_n$ is shown being defined by a substantially circular or oval shape having any dimension or diameter ($D_{68a}$). In some examples, the dimension or diameter ($D_{68a}$) may be approximately equal to about 0.5 mm or about 3.0 mm. In other examples, the dimension or diameter ($D_{68a}$) may be between approximately 0.5 mm and approximately 3.0 mm. Furthermore, each passage of the plurality of passages $68a_1$-$68a_n$ may be defined by a substantially similar dimension or diameter ($D_{68a}$). Although each passage of the plurality of passages $68a_1$-$68a_n$ may be defined by a substantially similar dimension or diameter ($D_{68a}$), implementations of the sheet of material 52a may include at least one passage of the plurality of passages $68a_1$-$68a_n$ having a different sized or shaped dimension or diameter ($D_{68a}$). For example, at least one passage of the plurality of passages $68a_1$-$68a_n$ may have a different sized or shaped dimension or diameter ($D_{68a}$) than another passage of the plurality of passages $68a_1$-$68a_n$ in the: (1) the heel region 20a of the sole structure 14a, (2) the forefoot region 16a of the sole structure 14a or (3) the forefoot region 16a and the heel region 20a of the sole structure 14a.

The top surface 38a of the first midsole portion 36a may be further defined by at least one second midsole contacting region 70a and at least one sheet of material contacting region 72a. The bottom surface 48a of the second midsole portion 44a may be further defined by at least one first midsole contacting region 74a and at least one sheet of material contacting region 76a.

Each of the at least one second midsole contacting region 70a of the first midsole portion 36a and the at least one first midsole contacting region 74a of the second midsole portion 44a may be defined by a shape that generally corresponds to a shape defined by the at least one passage 68a formed by the central region 60a of the sheet of material 52a. If the at least one passage 68a formed by the central region 60a of the sheet of material 52a is defined by plurality of passages $68a_1$-$68a_n$, each of the at least one second midsole contacting region 70a of the first midsole portion 36a and the at least one first midsole contacting region 74a of the second midsole portion 44a may be defined by a corresponding plurality of second midsole contacting regions $70a_1$-$70a_n$ and a plurality of first midsole contacting regions $74a_1$-$74a_{an}$. Furthermore, as shown in FIG. 15, each passage and contacting region of the plurality of passages $68a_1$-$68a_n$ and the plurality of second midsole contacting regions $70a_1$-$70a_n$ and the plurality of first midsole contacting regions $74a_1$-$74a_n$ is respectively axially aligned with one another.

In an example, when the article of footwear 10a is formed, the following surfaces of the outsole 26a, the first midsole portion 36a, the second midsole portion 44a and the sheet of material 52a may be arranged near, proximate, spaced-apart-from or adjacent one another. The at least one sheet of material contacting region 72a of the top surface 38a of the first midsole portion 36a may be disposed adjacent the bottom surface 56a of the sheet of material 52a. The at least one sheet of material contacting region 76a of the bottom surface 48a of the second midsole portion 44a may be disposed adjacent the top surface 54a of the sheet of material 52a defined by the central region 60a of the sheet of material 52a.

Once the sheet of material 52a is arranged relative the first midsole portion 36a and the second midsole portion 44a as described above, the sheet of material 52a may be said to be arranged between the first midsole portion 36a and the second midsole portion 44a. Even though the sheet of material 52a may be disposed between the first midsole portion 36a and the second midsole portion 44a, one or more portions of the first midsole portion 36a may be in direct contact with one or more portions of the second midsole portion 44a as a result of the formation of the at least one passage 68a of the sheet of material 52a such that at least one second midsole contacting region 70a of the top surface 38a of the first midsole portion 36a may be disposed adjacent the at least one first midsole contacting region 74a of the bottom surface 48a of the second midsole portion 44a. After arranging the at least one second midsole contacting region 70a of the top surface 38a of the first midsole portion 36a adjacent the at least one first midsole contacting region 74a of the bottom surface 48a of the second midsole portion 44a, the sheet of material 52a and the midsole 28a defined by the first midsole portion 36a and the second midsole portion 44a may be arranged in a molding tool 92a (see, e.g., FIGS. 17-20) for directly bonding the first midsole portion 36a to the second midsole portion 44a at the at least one second midsole contacting region 70a and the at least one first midsole contacting region 74a.

The mold tool 92a includes an upper mold half $92a_U$ and a lower mold half $9a2_L$. Each of the upper mold half $92a_U$ and the lower mold half $92a_L$ may be define a mold surface that corresponds to the shape of the central region 60a of the sheet of material 52a for bonding the first midsole portion 36a to the second midsole portion 44a under heat and pressure.

Figure 17:
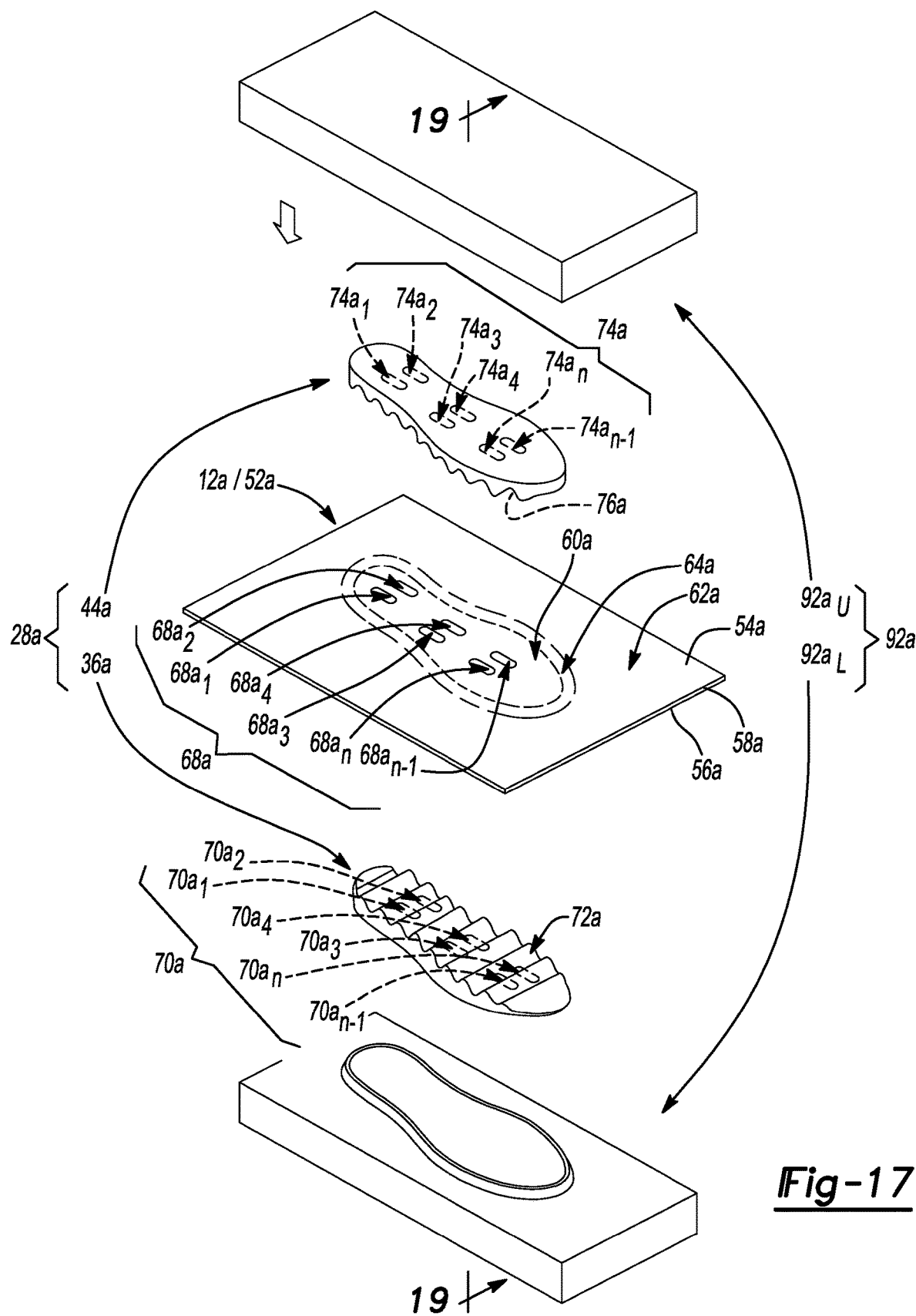
FIG. 17 is a perspective view of an exemplary mold tool and a portion of the article of footwear corresponding to FIG. 15.
Figure 18:
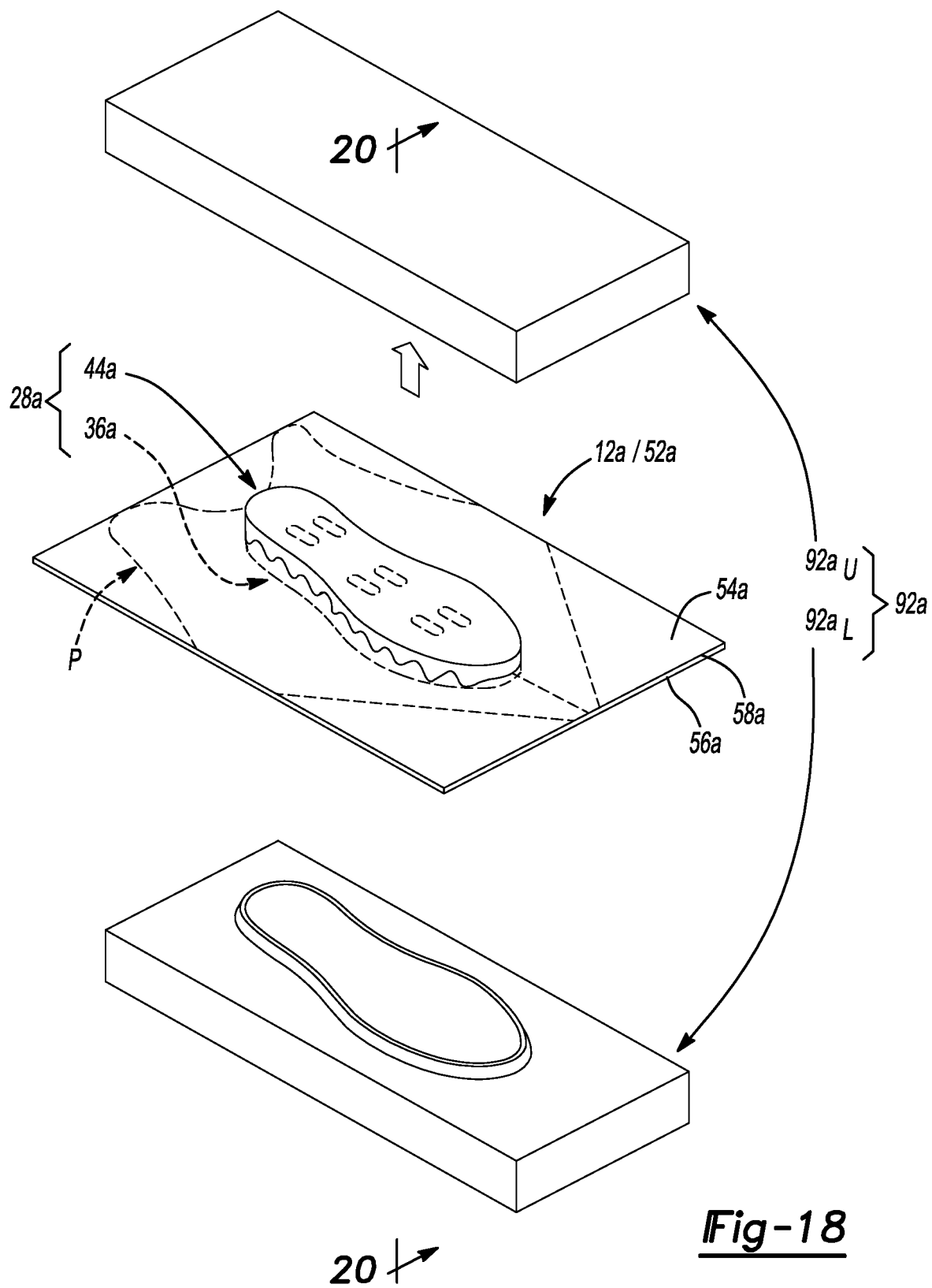
FIG. 18 is a further perspective view of the mold tool and the portion of the article of footwear of FIG. 17 arranged in a further partially assembled state.
Figure 19:
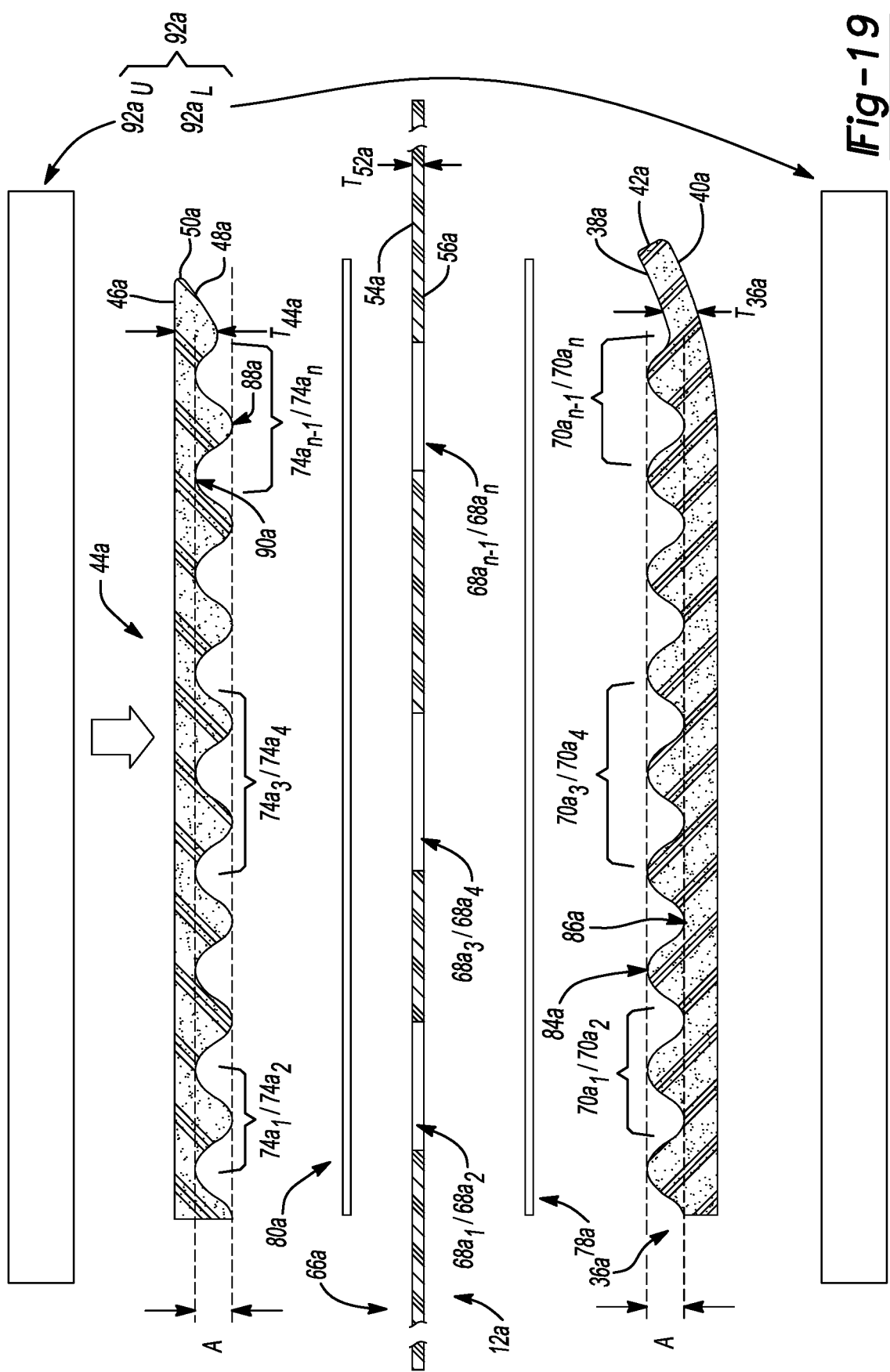
FIG. 19 is a cross-sectional view of the mold tool and the portion of the article of footwear taken along Line 19-19 of FIG. 17.
Figure 20:
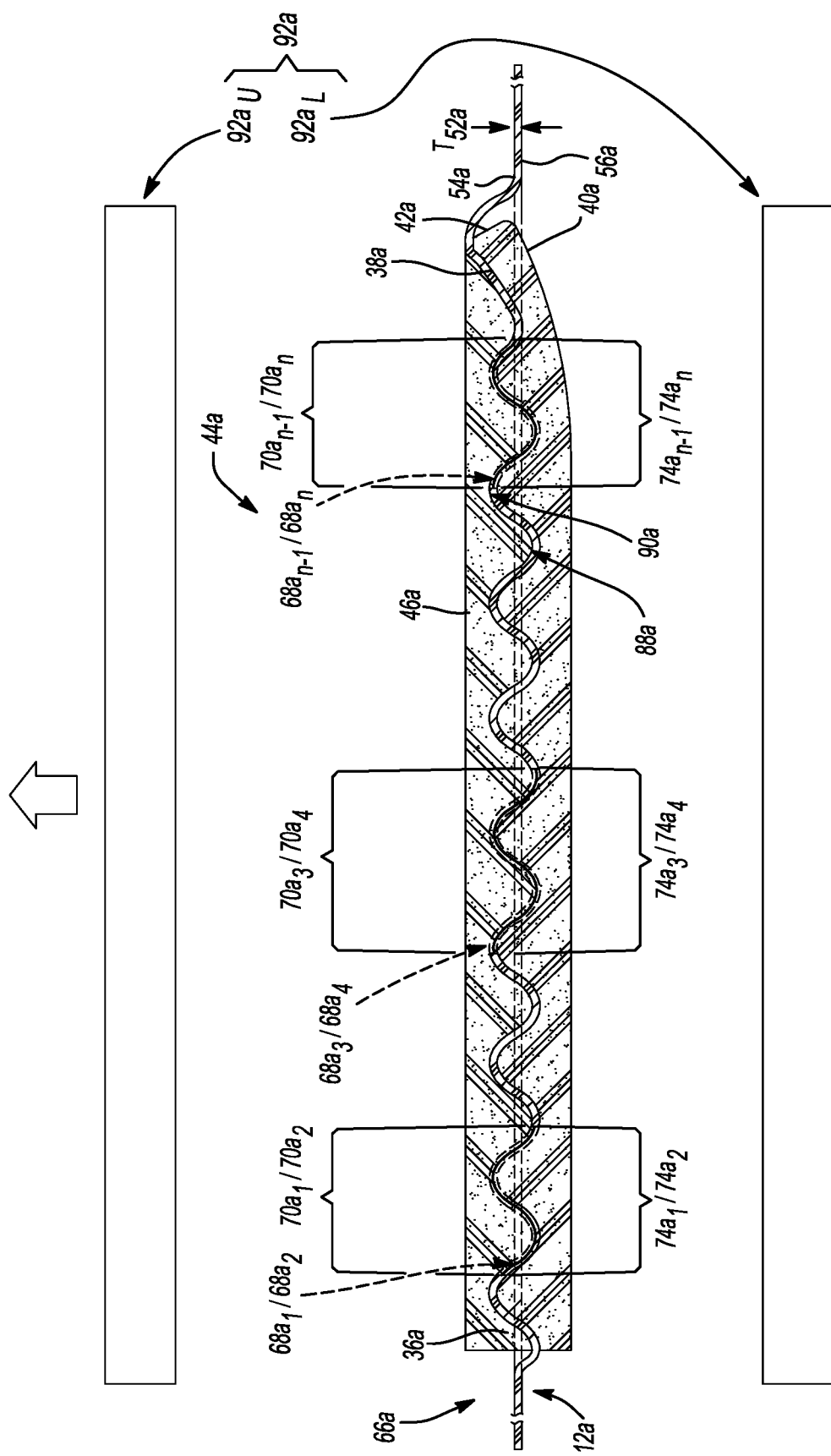
FIG. 20 is a cross-sectional view of the mold tool and the portion of the article of footwear taken along Line 20-20 of FIG. 18.

As shown in FIGS. 17 and 19, the mold tool 92a is arranged in an open configuration by spacing apart the upper mold half $92a_U$ and the lower mold half $92a_L$ such that the first midsole portion 36a, the second midsole portion 44a and the sheet of material 52a are arranged therebetween. Then, as shown in FIGS. 18 and 20, after arranging the mold tool 92a in a closed configuration for a period of time, the mold tool 92a may be returned to the open configuration with the first midsole portion 36a bonded to the second midsole portion 44a and the sheet of material 52a secured therebetween.

Figure 21:
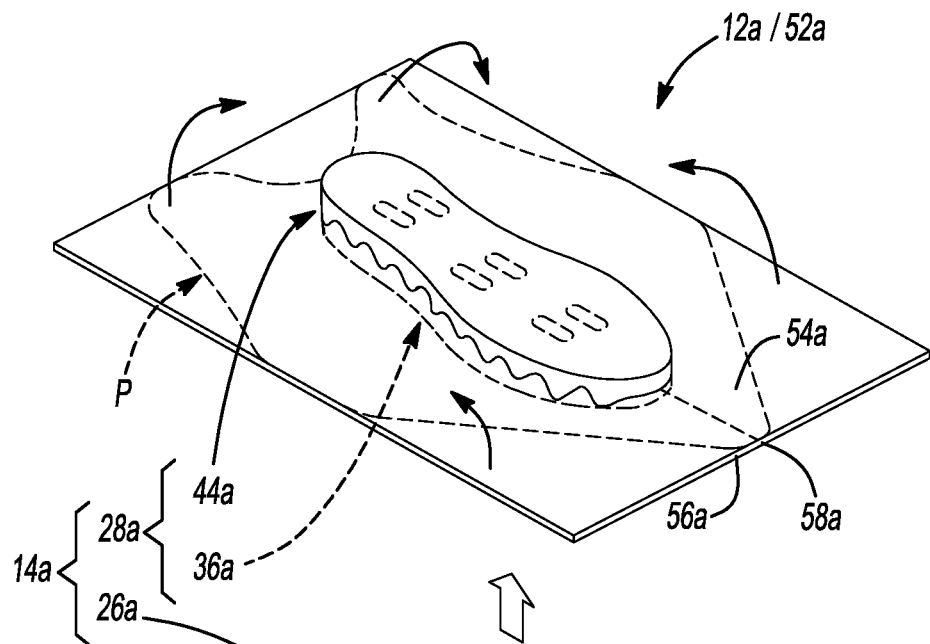
FIG. 21 is an exploded perspective view of the portion of the article of footwear of FIG. 18 and an outsole.

Thereafter, as shown in FIG. 21, the midsole-contacting surface 30a of the outsole 26a may be disposed adjacent the bottom surface 40a of the first midsole portion 36a for joining the outsole 26a to the first midsole portion 36a. In an example, the outsole 26a may be joined to the first midsole portion 36a with an adhesive or by way of a molding tool in a substantially similar manner as described above.

With continued reference to FIGS. 21-22, the outer region 62a and the intermediate region 64a of the sheet of material 52a is folded upwardly such that the intermediate region 64a defined by the top surface 54a of the sheet of material 52a is disposed adjacent the sidewall surface 50a of the second midsole portion 44a. After the intermediate region 64a defined by the top surface 54a of the sheet of material 52a is disposed adjacent the sidewall surface 50a of the second midsole portion 44a, the outer region 62a of the sheet of material 52a forms the upper 12a. In an example, one or more of the outer region 62a and the intermediate region 64a of the sheet of material 12a may be stamped, slit, perforated, cut or otherwise formed to define a pattern P that defines the upper 12a.

Although the mold tool 92a may be utilized for joining the first midsole portion 36a to the second midsole portion 44a under heat and pressure by way of the at least one passage 68a of the sheet of material 52a, as shown in FIG. 19, in some configurations, optional adhesive 78a, 80a may also or alternatively be utilized for adhering the first midsole portion 36a to the second midsole portion 44a. Although FIG. 19 illustrates the optional adhesive 78a, 80a in the form of a sheet having a shape that substantially corresponds to the shape of the central region 60a of the sheet of material 52a, the optional adhesive 78a, 80a may conform to any desirable shape, pattern or configuration, such as, for example, the shape, pattern or configuration of the of the at least one passage 68a of the sheet of material 52a.

In an example, one optional adhesive 78a may be arranged between the first midsole portion 36a and the second midsole portion 44a; furthermore, the one optional adhesive 78a may be arranged between the top surface 38a of the first midsole portion 36a and the bottom surface 56a of the sheet of material 52a such that the one optional adhesive 78a is axially aligned with and radially extends across at least a portion of the shape, pattern or configuration of the of the at least one passage 68a of the sheet of material 52a. The one optional adhesive 78a adhesively bonds the first midsole portion 36a, the second midsole portion 44a and the sheet of material 52a together.

In another example, one optional adhesive 80a may be arranged between the first midsole portion 36a and the second midsole portion 44a; furthermore, the one optional adhesive 80a may be arranged between the top surface 54a of the sheet of material 52a and the bottom surface 48a of the second midsole portion 44a such that the one optional adhesive 80a is axially aligned with and radially extends across at least a portion of the shape, pattern or configuration of the of the at least one passage 68a of the sheet of material 52a. The one optional adhesive 80a adhesively bonds the first midsole portion 36a, the second midsole portion 44a and the sheet of material 52a together.

In yet another example, a first optional adhesive 78a and a second optional adhesive 80a may be arranged between the first midsole portion 36a and the second midsole portion 44a. The first optional adhesive 78a may be arranged between the top surface 38a of the first midsole portion 36a and the bottom surface 56a of the sheet of material 52a such that the first optional adhesive 78a is axially aligned with and radially extends across at least a portion of the shape, pattern or configuration of the of the at least one passage 68a of the sheet of material 52a. The second optional adhesive 80a may be arranged between the top surface 54a of the sheet of material 52a and the bottom surface 48a of the second midsole portion 44a such that the second optional adhesive 80a is axially aligned with and radially extends across at least a portion of the shape, pattern or configuration of the of the at least one passage 68a of the sheet of material 52a. The first optional adhesive 78a and the second optional adhesive 80a adhesively bonds the first midsole portion 36a, the second midsole portion 44a and the sheet of material 52a together.

In other configurations, when the article of footwear 10a is formed, the following surfaces of the outsole 26a, the first midsole portion 36a, the second midsole portion 44a and the sheet of material 52a may be arranged near, proximate, spaced-apart-from or adjacent one another. In an example, the sheet of material 52a may extend from the sidewall surface 50a of the second midsole portion 44a at one of the medial side 22a and the lateral side 24a of the sole structure 14a. In another example, the sheet of material 52a may extend from the sidewall surface 50a of the second midsole portion 44a at both the medial side 22a and the lateral side 24a of the sole structure 14a. In yet another example, the sheet of material 52a extends from the sidewall surface 50a of the second midsole portion 44a around an entire perimeter of the sole structure 14a.

Although an exemplary implementation of the article of footwear 10a includes the outer region 62a of the sheet of material 52a forming the upper 12a, in other examples, the outer region 62a of the sheet of material 52a may form a first upper portion of the upper 12a, and, as such, at least a second upper portion may also contribute to forming the upper 12a. Accordingly, in another implementation, the outer region 62a of the sheet of material 52a may define a first upper portion and extend from the sidewall surface 50a of the second midsole portion 44a and at least partially cover a second upper portion (not shown) that further contributes to forming the upper 12a.

As described above, the intermediate region 64a of the sheet of material 52a may separate the central region 60a of the sheet of material 52a from the outer region 62a of the sheet of material 52a by the distance ($D_{64a}$). Furthermore, in an example, the outer region 62a of the sheet of material 52a may extend from top surface 46a of the second midsole portion 44a at a sufficient distance ($D_{62a}$) for forming at a foot covering portion of the upper 12a that terminates to define at least a portion of an ankle opening 82a (see, e.g., FIGS. 12, 16, 22) of the upper 12a. In one configuration, the central region 60a of the sheet of material 52a that is secured between the first midsole portion 36a and the second midsole portion 44a may be considered to be a portion of the midsole 28a. In other configurations, the central region 60a of the sheet of material 52a that is secured between the first midsole portion 36a and the second midsole portion 44a may be considered to be a portion of the sheet of material 52a that contributes to the formation of the midsole 28a, and the intermediate region 64a of the sheet of material 52a that: (1) extends beyond the sidewall surface 42a of the first midsole portion 36a and the sidewall surface 50a of the second midsole portion 44a and (2) is disposed adjacent the sidewall surface 50a of the second midsole portion 44a may both be considered to be another portion of the sheet of material 52a that contributes to the formation of the midsole 28a. However, in another configuration, the intermediate region 64a of the sheet of material 52a that: (1) extends beyond the sidewall surface 42a of the first midsole portion 36a and the sidewall surface 50a of the second midsole portion 44a and (2) is disposed adjacent the sidewall surface 50a of the second midsole portion 44a may be considered to be a first portion of the upper 12a, and, the outer region 62a of the sheet of material 52a that extends from top surface 46a of the second midsole portion 44a at the distance ($D_{62a}$) may define a second portion of the upper 12a. Therefore, the intermediate region 64a of the sheet of material 52a may contribute to the formation of one or both of the upper and the midsole 28a.

As described above, each of the first midsole portion 36a and the second midsole portion 44a is not flat and may, respectively, be interrupted by one or more peaks 84a, 88a and recesses, trenches or valleys 86a, 90a such that each of the first midsole portion 36a and the second midsole portion 44a defines a substantially sinusoidal pattern extending between the forefoot region 16a and the heel region 20a of the sole structure 14a. The one or more peaks 84a, 88a may define a series of peaks, and, the recesses, trenches or valleys 86a, 90a may define a series of recesses, trenches or valleys.

Furthermore, the respective sinusoidal patterns of each of the first midsole portion 36a and the second midsole portion 44a may be matingly shaped such that the first midsole portion 36a correspondingly mates with the second midsole portion 44a. Accordingly, in an implementation, the one or more peaks 84a of the first midsole portion 36a may oppose and be matingly-received by the recesses, trenches or valleys 90a of the second midsole portion 44a, and, the one or more peaks 88a of the second midsole portion 44a may oppose and be matingly-received by the recesses, trenches or valleys 86a of the first midsole portion 36a.

In some configurations, prior to the central region 60a of the sheet of material 52a being secured between the first midsole portion 36a and the second midsole portion 44a, the central region 60a of sheet of material 52a may be defined by a substantially flat, non-sinusoidal pattern. However, after the central region 60a of the sheet of material 52a is secured between the first midsole portion 36a and the second midsole portion 44a, the central region 60a of the sheet of material 52a may be shaped (by the sinusoidal pattern of each of the first midsole portion 36a and the second midsole portion 44a) to define a sinusoidal pattern that conforms to a mated configuration of the sinusoidal pattern of each of the first midsole portion 36a and the second midsole portion 44a. In an example, the sinusoidal pattern of the central region 60a of the sheet of material 52a may extend between a forefoot region 16a and a heel region 20a of the sole structure 14a. Furthermore, the sinusoidal pattern formed by the central region 60a of the sheet of material 52a includes one or more peaks (that is/are formed by the one or more recesses, trenches or valleys 86a of the first midsole portion 36a and the one or more recesses, trenches or valleys 90a of the second midsole portion 44a) and one or more valleys (that is/are formed by the one or more peaks 84a of the first midsole portion 36a and the one or more peaks 88a of the second midsole portion 44a) extending between a forefoot region 16a and a heel region 20a of the sole structure 14a.

Although some configurations may include the central region 60a of sheet of material 52a being defined by a substantially flat, non-sinusoidal pattern that is subsequently shaped to define a sinusoidal pattern after the central region 60a of the sheet of material 52a is secured between the first midsole portion 36a and the second midsole portion 44a as described above, other configurations may include the central region 60a of sheet of material 52a being preformed to define a sinusoidal pattern that corresponds to a mated configuration of the sinusoidal pattern of each of the first midsole portion 36a and the second midsole portion 44a. In an example, the preformed sinusoidal pattern of the central region 60a of the sheet of material 52a may extend between a forefoot region 16a and a heel region 20a of the sole structure 14a. Furthermore, the preformed sinusoidal pattern of the central region 60a of the sheet of material 52a includes one or more preformed peaks (that is aligned with and corresponds to the one or more recesses, trenches or valleys 86a of the first midsole portion 36a and the one or more recesses, trenches or valleys 90a of the second midsole portion 44a) and one or more preformed valleys (that is aligned with and corresponds to the one or more peaks 84a of the first midsole portion 36a and the one or more peaks 88a of the second midsole portion 44a) extending between a forefoot region 16a and a heel region 20a of the sole structure 14a.

With reference to FIGS. 23-27, an exemplary article of footwear 10b is provided and includes an upper 12b and a sole structure 14b attached to the upper 12b. The article of footwear 10b may be divided into one or more regions. The regions may include a forefoot region 16b, a midfoot region 18b, and a heel region 20b. The forefoot region 16b may correspond with toes and joints connecting metatarsal bones with phalanx bones of a foot. The midfoot region 18b may correspond with an arch area of the foot while the heel region 18b may correspond with rear portions of the foot, including a calcaneus bone. The article of footwear 10b may additionally include a medial side 22b and a lateral side 24b that correspond with opposite sides of the article of footwear 10b and extend through the regions 16b, 18b, 20b.

The sole structure 14b includes a midsole 28b and optionally includes an outsole 26b. A cushioning arrangement (not shown) may optionally be disposed generally between the outsole 26b and the midsole 28b.

Figure 26:
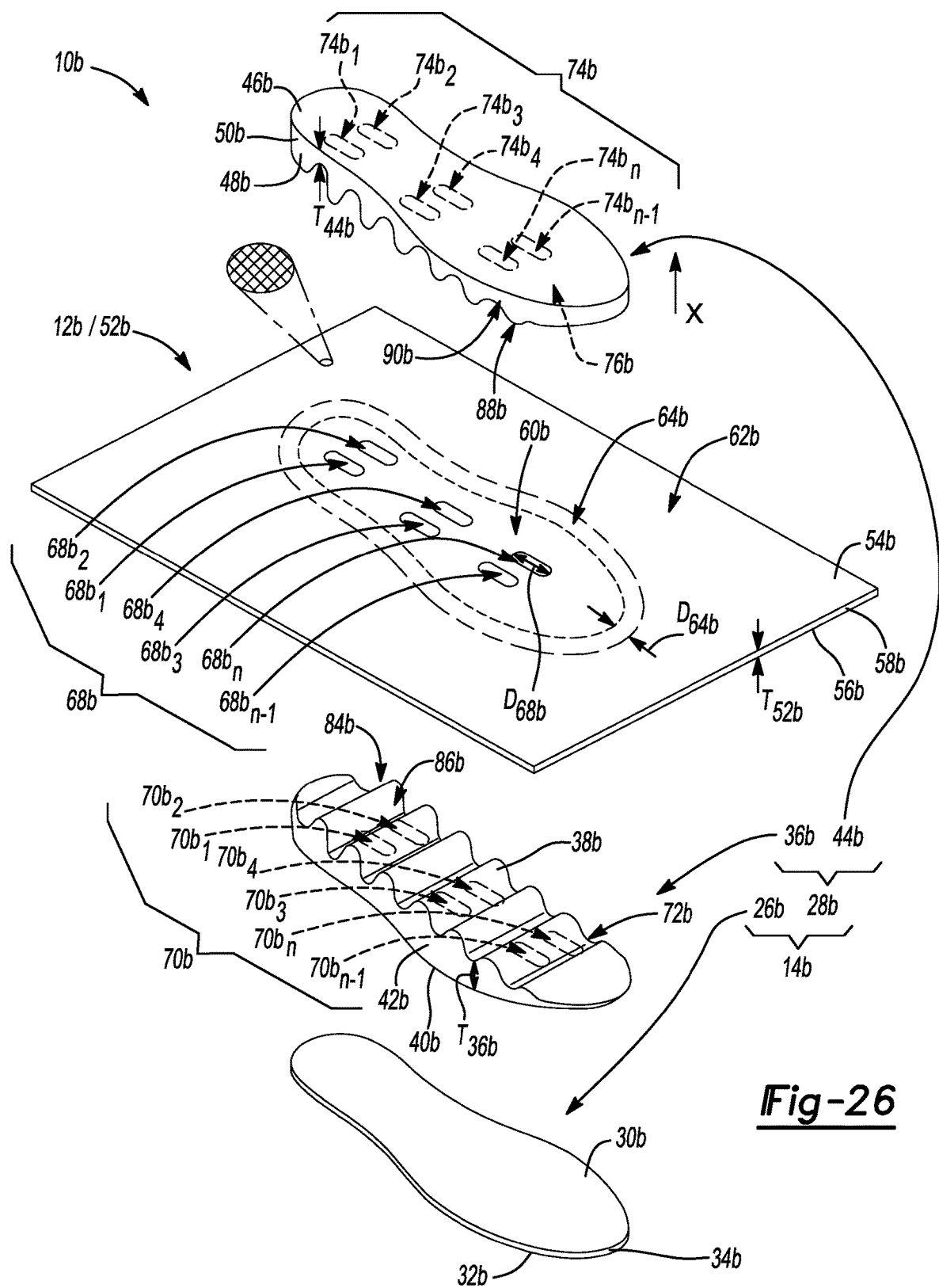
FIG. 26 is an exploded perspective view of the article of footwear of FIG. 23 illustrating a component of the article of footwear that contributes to formation of an upper arranged in a substantially flat orientation.

Referring to FIG. 26, the outsole 26b includes a midsole-contacting surface 30b and a ground-contacting surface 32b. The outsole 26b further includes a sidewall surface 34b extending between the midsole-contacting surface 30b and the ground-contacting surface 32b.

The midsole 28b includes a first midsole portion 36b and a second midsole portion 44b. The first midsole portion 36b includes a top surface 38b, a bottom surface 40b and a sidewall surface 42b extending between the top surface 38b and the bottom surface 40b. The sidewall surface 42b may define a thickness ($T_{36b}$) of the first midsole portion 36b extending between the top surface 38b and the bottom surface 40b.

The top surface 38b and the bottom surface 40b of the first midsole portion 36b may generally define an outer surface profile of the first midsole portion 36b. In an example, the top surface 38b of the first midsole portion 36b is not flat and may be interrupted by one or more peaks 84b and recesses, trenches or valleys 86b such that the first midsole portion 36b defines a substantially sinusoidal pattern extending between the forefoot region 16b and the heel region 20b of the sole structure 14b. Furthermore, in an example, the sinusoidal pattern of the first midsole portion 36b may be defined by a substantially non-constant amplitude A (see, e.g., FIG. 30) such that the thickness ($T_{36b}$) of the first midsole portion 36b (that is bound by each peak 84b of the top surface 38b and each peak 84b of the bottom surface 40b) is not substantially the same across a length ($L_{14b}$) of the sole structure 14b. In an example, the non-constant amplitude A of the first midsole portion 36b results in each peak 84b and each recess, trench or valley 86b progressively decreasing in a direction extending from the heel region 20b to the forefoot region 16b of the sole structure 14b. Further, the amplitude A defined by each peak 84b remains substantially the same as each peak 84b extends between the medial side 22b and the lateral side 24b of the sole structure 14b. Yet even further, in an example, the sinusoidal pattern of the first midsole portion 36b may be defined by a substantially constant frequency as the sinusoidal pattern extends between the forefoot region 16b and the heel region 20b of the sole structure 14b.

The second midsole portion 44b includes a top surface 46b, a bottom surface 48b and a sidewall surface 50b extending between the top surface 46b and the bottom surface 48b. The sidewall surface 50b may define a thickness ($T_{44b}$) of the second midsole portion 44b extending between the top surface 46b and the bottom surface 48b.

The top surface 46b and the bottom surface 48b of the second midsole portion 44b may generally define an outer surface profile of the second midsole portion 44b. In an example, the bottom surface 48b of the second midsole portion 44b is not flat and may be interrupted by one or more peaks 88b and recesses, trenches or valleys 90b such that the second midsole portion 44b defines a substantially sinusoidal pattern extending between the forefoot region 16b and the heel region 20b of the sole structure 14b. Furthermore, in an example, the sinusoidal pattern of the second midsole portion 44b may be defined by a substantially non-constant amplitude A (see, e.g., FIG. 30) such that the thickness ($T_{44b}$) of the second midsole portion 44b (that is bound by each peak 88b of the top surface 46b and each peak 90b of the bottom surface 48b) is not substantially the same across a length ($L_{14b}$) of the sole structure 14b. In an example, the non-constant amplitude A of the second midsole portion 44b results in each peak 88b and each recess, trench or valley 90b progressively decreasing in a direction extending from the heel region 20b to the forefoot region 16b of the sole structure 14b. Further, the amplitude A defined by each peak 88b remains substantially the same as each peak 88b extends between the medial side 22b and the lateral side 24b of the sole structure 14b. Yet even further, in an example, the sinusoidal pattern of the second midsole portion 44b may be defined by a substantially constant frequency as the sinusoidal pattern extends between the forefoot region 16b and the heel region 20b of the sole structure 14b.

In some examples, at least one of the first midsole portion 36b and the second midsole portion 44b are formed from a foamed material. In some instances, one or both of the first midsole portion 36b and the second midsole portion 44b are formed from a polymeric material. In another example, the first midsole portion 36b and the second midsole portion 44b are formed from the same material. In yet another example, the first midsole portion 36b and the second midsole portion 44b are formed from different materials. In a further example, the first midsole portion 36b is formed from a first material and the second midsole portion 44b is formed from a second material. In yet a further example, the first material forming the first midsole portion 36b has substantially the same stiffness as the second material forming the second midsole portion 44b. In some instances, the first material forming the first midsole portion 36b has a different stiffness than the second material forming the second midsole portion 44b. In other examples, the first material forming the first midsole portion 36b is the same as the second material forming the second midsole portion 44b. In yet another examples, the first material forming the first midsole portion 36b is different than the second material forming the second midsole portion 44b.

As shown in FIG. 26, the article of footwear 10b further includes a sheet of material 52b. The sheet of material 52b includes a top surface 54b, a bottom surface 56b and a sidewall surface 58b extending between the top surface 54b and the bottom surface 56b. The sidewall surface 58b may define a thickness ($T_{52b}$) of the sheet of material 52b extending between the top surface 54b and the bottom surface 56b.

In an example, the sheet of material 52b is formed from a flexible material. The sheet of material 52b may include a fabric material, a woven textile (see, e.g., enlarged view of the sheet of material 52b in FIG. 26), or a knitted textile (see, e.g., enlarged view of the sheet of material 52b in FIG. 26). In some instances, the sheet of material 52b is porous. The sheet of material 52b may be formed from a polymeric material such as, for example, a thermoplastic polymeric material. An exemplary thermoplastic polymeric material may include, for example, a thermoset polymeric material or the like. In some examples, the sheet of material 52b may be a thermoformable material. In some examples, if the sheet of material 52b is a woven or knit structure (as seen in, e.g., the enlarged view of FIG. 26), the woven or knit structure may be formed from a polyester yarn. Furthermore, in other examples, if the sheet of material 52b is a woven or knit structure (as seen in, e.g., the enlarged view of FIG. 26), each passage or aperture formed by overlapping members defining the woven or knit structure of the sheet of material 52b may be at least 0.5 mm in length in a largest dimension or at least 1.0 mm in length in a largest dimension. Furthermore, each passage or aperture formed by overlapping members defining the woven or knit structure of the sheet of material 52b may permit one or both of the first midsole portion 36b and the second midsole portion 44b to directly contact one another. In other implementations, one or both of the first midsole portion 36b and the second midsole portion 44b may be injection molded around or through each passage or aperture formed by overlapping members defining the woven or knit structure of the sheet of material 52b.

In some instances, the sheet of material 52b is an embroidered textile. In some examples, the sheet of material 52b has one or more first regions including embroidery and one or more second regions without embroidery or with a lower percentage of embroidered surface area as comparted to the one or more first regions. The embroidery can provide reduced stretch or a "lock down" feature to areas of the sheet of material 52b. Such areas of the sheet of material 52b providing a reduced stretch quality may be located, for example, at a region of the sheet of material 52b that is arranged between the first midsole portion 36b and the second midsole portion 44b, or, alternatively at a region that extends beyond the sidewall surface 58b of the sheet of material 52b.

The sheet of material 52b may be further defined by a plurality of regions 60b, 62b, 64b. Each of the top surface 54b and the bottom surface 56b extends across the plurality of regions 60b, 62b, 64b. The plurality of regions 60b, 62b, 64b may be defined by a central region 60b, an outer region 62b and an intermediate region 64b extending between the central region 60b and the outer region 62b. The intermediate region 64b may separate the central region 60b from the outer region 62b by a distance ($D_{64b}$).

The central region 60b of the sheet of material 52b may be defined by a shape that generally corresponds to a shape defining the top surface 46b of the second midsole portion 44b. The distance ($D_{64b}$) that separates the central region 60b from the outer region 62b may be approximately equal to the thickness ($T_{44b}$) of the second midsole portion 44b.

With reference to FIG. 26, the first midsole portion 36b is disposed between the outsole 26b and the upper 12b. As shown in FIGS. 26 and 33, the second midsole portion 44b is disposed between the first midsole portion 36b and the upper 12b. The sheet of material 52b is disposed between the first midsole portion 36b and the second midsole portion 44b. The bottom surface 56b of the sheet of material 52b extends across the top surface 38b of the first midsole portion 36b and beyond the sidewall surface 42b of the first midsole portion 36b. The top surface 54b of the sheet of material 52b extends across the bottom surface 48b of the second midsole portion 44b and beyond the sidewall surface 50b of the second midsole portion 44b. With reference to FIGS. 26 and 33, when forming the article of footwear 10b, the top surface 54b of the sheet of material 52b extends at least partially over the sidewall surface 50b of the second midsole portion 44b in a direction (X), as shown in FIG. 26, toward the top surface 46b of the second midsole portion 44b.

Figure 27:
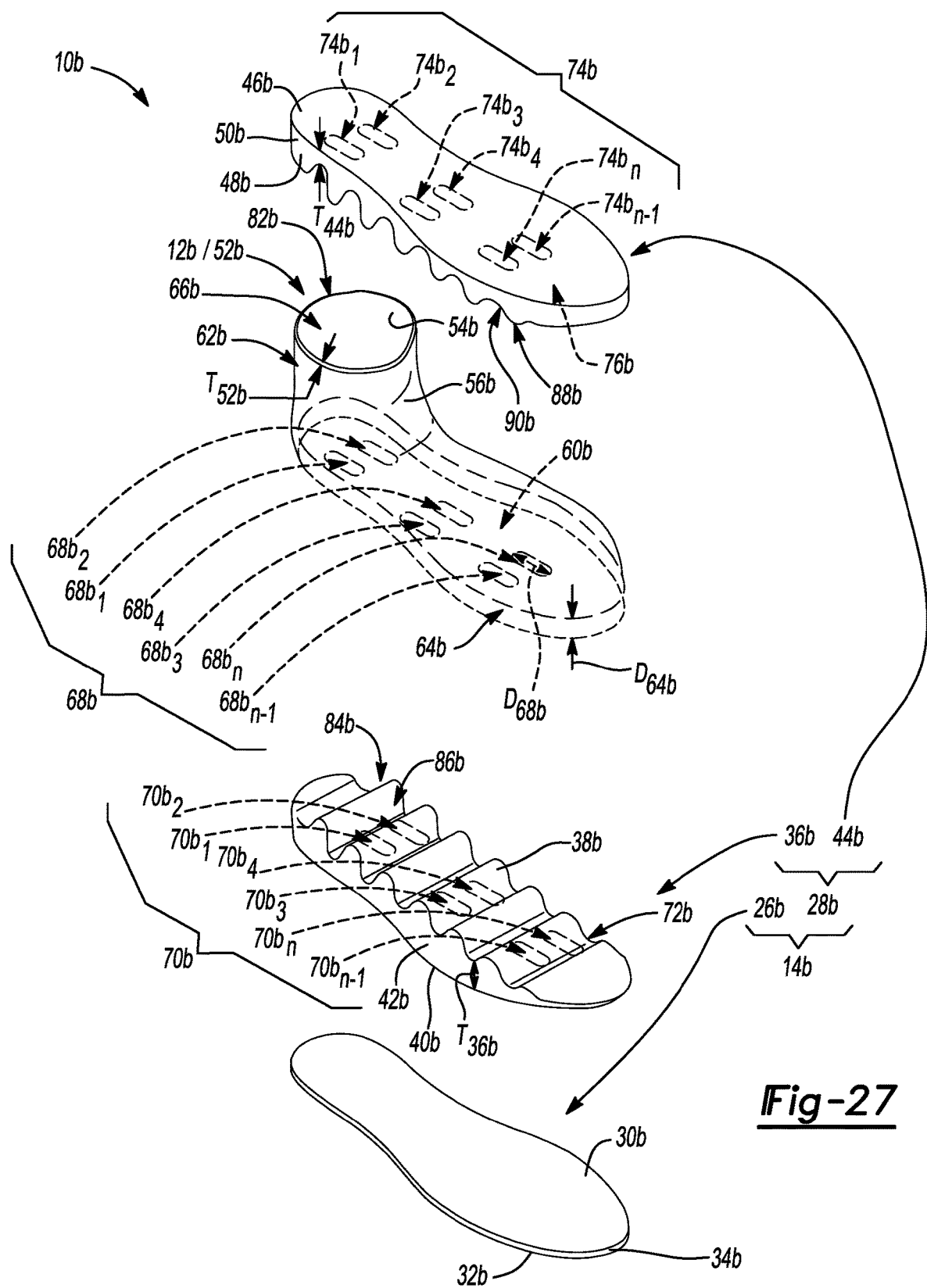
FIG. 27 is an exploded perspective view of the article of footwear of FIG. 23 illustrating a component of the article of footwear that contributes to formation of an upper arranged in a non-flat orientation defining at least a portion of a foot-receiving cavity.

With reference to FIGS. 26 and 27, the outer region 62b of the sheet of material 52b is sized for defining the upper 12b of the article of footwear 10b. As shown in FIG. 27, upon the outer region 62b of the sheet of material 52b forming the upper 12b, the top surface 46b of the second midsole portion 44b and the top surface 54b of the sheet of material 52b defined by the outer region 62b of the sheet of material 52b generally forms a cavity 66b that is sized for receiving a foot (not shown) of a user.

As shown in FIG. 26, at least the central region 60b of the sheet of material 52b may further define at least one passage or aperture 68b or absence of the sheet of material 52b. The at least one passage 68b extends through the thickness ($T_{52b}$) of the sheet of material 52b between the top surface 54b and the bottom surface 56b. In an example, the at least one passage 68b is formed in the central region 60b of the sheet of material 52b and not the outer region 62b or the intermediate region 64b of the sheet of material 52b. Although an implementation of the sheet of material 52b may include the at least one passage 68b exclusively formed by the central region 60b of the sheet of material 52b, other implementations of the sheet of material 52b may include the at least one passage 68b formed by two or more of the central region 60b, the outer region 62b and the intermediate region 64b of the sheet of material 52b. If a polymeric material defines one or both of the first midsole portion 36b and the second midsole portion 44b, the polymeric material may be molded around any surface defining the sheet of material 52b and/or through at least one passage 68b that extends through the thickness ($T_{52b}$) of the sheet of material 52b.

The at least one passage 68b may be defined by a plurality of passages or apertures $68b_1$-$68b_n$ having, for example: a first passage $68b_1$, a last passage $68b_n$ and one or more intermediate passages $68b_2$-$68b_{n-1}$. In an example, as shown in FIG. 26, the plurality of passages $68b_1$-$68b_n$ may be arranged in any desirable pattern (e.g., in: (1) a row-and-column grid, (2) staggered rows and columns, or (3) a random pattern) extending across the central region 60b of the sheet of material 52b between the forefoot region 16b and the heel region 20b of the sole structure 14b (i.e., across substantially most or all of the length ($L_{14b}$) of the sole structure 14b) and between the medial side 22b and the lateral side 24b of the article of footwear 10b (i.e., across the width ($W_{14b}$) of the sole structure 14b). In other implementations, the plurality of passages $68b_1$-$68b_n$ may be arranged in a pattern (e.g., in: (1) a row-and-column grid, (2) staggered rows and columns, or (3) a random pattern) that does not extend across the central region 60b of the sheet of material 52b between the forefoot region 16b and the heel region 20b of the sole structure 14b and between the medial side 22b and the lateral side 24b of the article of footwear 10b. Although the plurality of passages $68b_1$-$68b_n$ may extend across substantially most or all of the length ($L_{14b}$) of the sole structure 14b as described above, the plurality of passages $68b_1$-$68b_n$ may be arranged in a pattern (e.g., in: (1) a row-and-column grid, (2) staggered rows and columns, or (3) a random pattern) extending across: (1) some or all of the heel region 20b of the sole structure 14b but not the forefoot region 16b or the midfoot region 18b of the sole structure 14b, (2) some or all of the forefoot region 16b of the sole structure 14b but not the midfoot region 18b or the heel region 20b of the sole structure 14b or (3) some or all of the forefoot region 16b and the heel region 20b of the sole structure 14b but not the midfoot region 18b of the sole structure 14b.

With continued reference to FIG. 26, each passage of the plurality of passages $68b_1$-$68b_n$ is shown being defined by a substantially circular or oval shape having any dimension or diameter ($D_{68b}$). In some examples, the dimension or diameter ($D_{68b}$) may be approximately equal to about 0.5 mm or about 3.0 mm. In other examples, the dimension or diameter ($D_{68b}$) may be between approximately 0.5 mm and approximately 3.0 mm. Furthermore, each passage of the plurality of passages $68b_1$-$68b_n$ may be defined by a substantially similar dimension or diameter ($D_{68b}$). Although each passage of the plurality of passages $68b_1$-$68b_n$ may be defined by a substantially similar dimension or diameter ($D_{68b}$), implementations of the sheet of material 52b may include at least one passage of the plurality of passages $68b_1$-$68b_n$ having a different sized or shaped dimension or diameter ($D_{68b}$). For example, at least one passage of the plurality of passages $68b_1$-$68b_n$ may have a different sized or shaped dimension or diameter ($D_{68b}$) than another passage of the plurality of passages $68b_1$-$68b_n$ in the: (1) the heel region 20b of the sole structure 14b, (2) the forefoot region 16b of the sole structure 14b or (3) the forefoot region 16b and the heel region 20b of the sole structure 14b.

The top surface 38b of the first midsole portion 36b may be further defined by at least one second midsole contacting region 70b and at least one sheet of material contacting region 72b. The bottom surface 48b of the second midsole portion 44b may be further defined by at least one first midsole contacting region 74b and at least one sheet of material contacting region 76b.

Each of the at least one second midsole contacting region 70b of the first midsole portion 36b and the at least one first midsole contacting region 74b of the second midsole portion 44b may be defined by a shape that generally corresponds to a shape defined by the at least one passage 68b formed by the central region 60b of the sheet of material 52b. If the at least one passage 68b formed by the central region 60b of the sheet of material 52b is defined by plurality of passages $68b_1$-$68b_n$, each of the at least one second midsole contacting region 70b of the first midsole portion 36b and the at least one first midsole contacting region 74b of the second midsole portion 44b may be defined by a corresponding plurality of second midsole contacting regions $70b_1$-$70b_n$ and a plurality of first midsole contacting regions $74b_1$-$74b_n$. Furthermore, as shown in FIG. 26, each passage and contacting region of the plurality of passages $68b_1$-$68b_n$ and the plurality of second midsole contacting regions $70b_1$-$70b_n$ and the plurality of first midsole contacting regions $74b_1$-$74b_n$ is respectively axially aligned with one another.

In an example, when the article of footwear 10b is formed, the following surfaces of the outsole 26b, the first midsole portion 36b, the second midsole portion 44b and the sheet of material 52b may be arranged near, proximate, spaced-apart-from or adjacent one another. The at least one sheet of material contacting region 72b of the top surface 38b of the first midsole portion 36b may be disposed adjacent the bottom surface 56b of the sheet of material 52b. The at least one sheet of material contacting region 76b of the bottom surface 48b of the second midsole portion 44b may be disposed adjacent the top surface 54b of the sheet of material 52b defined by the central region 60b of the sheet of material 52b.

Once the sheet of material 52b is arranged relative the first midsole portion 36b and the second midsole portion 44b as described above, the sheet of material 52b may be said to be arranged between the first midsole portion 36b and the second midsole portion 44b. Even though the sheet of material 52b may be disposed between the first midsole portion 36b and the second midsole portion 44b, one or more portions of the first midsole portion 36b may be in direct contact with one or more portions of the second midsole portion 44b as a result of the formation of the at least one passage 68b of the sheet of material 52b such that at least one second midsole contacting region 70b of the top surface 38b of the first midsole portion 36b may be disposed adjacent the at least one first midsole contacting region 74b of the bottom surface 48b of the second midsole portion 44b. After arranging the at least one second midsole contacting region 70b of the top surface 38b of the first midsole portion 36b adjacent the at least one first midsole contacting region 74b of the bottom surface 48b of the second midsole portion 44b, the sheet of material 52b and the midsole 28b defined by the first midsole portion 36b and the second midsole portion 44b may be arranged in a molding tool 92b (see, e.g., FIGS. 28-31) for directly bonding the first midsole portion 36b to the second midsole portion 44b at the at least one second midsole contacting region 70b and the at least one first midsole contacting region 74b.

The mold tool 92b includes an upper mold half $92b_U$ and a lower mold half $92b_L$. Each of the upper mold half $92b_U$ and the lower mold half $92b_L$ may be define a mold surface that corresponds to the shape of the central region 60b of the sheet of material 52b for bonding the first midsole portion 36b to the second midsole portion 44b under heat and pressure.

Figure 28:
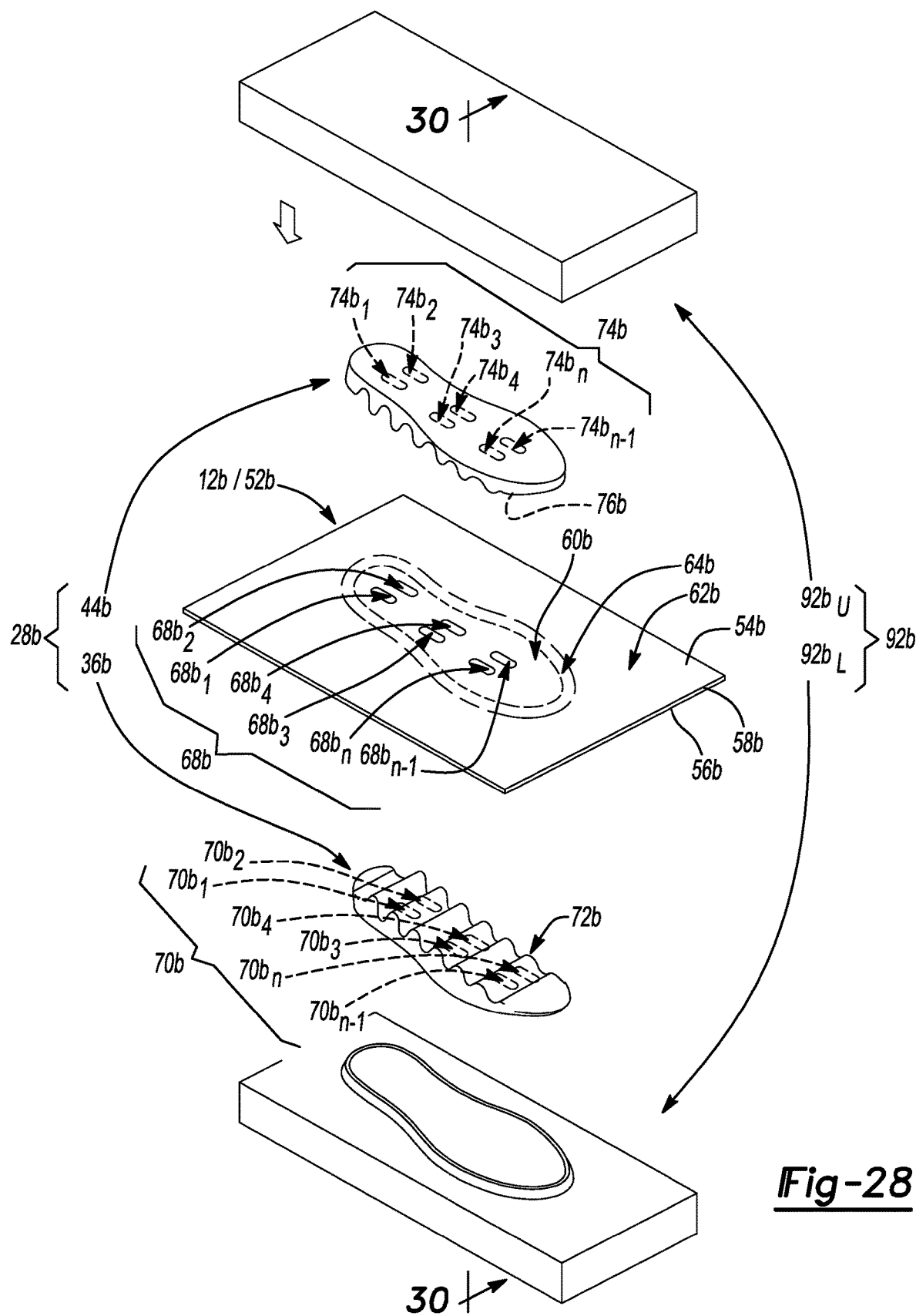
FIG. 28 is a perspective view of an exemplary mold tool and a portion of the article of footwear corresponding to FIG. 26.
Figure 29:
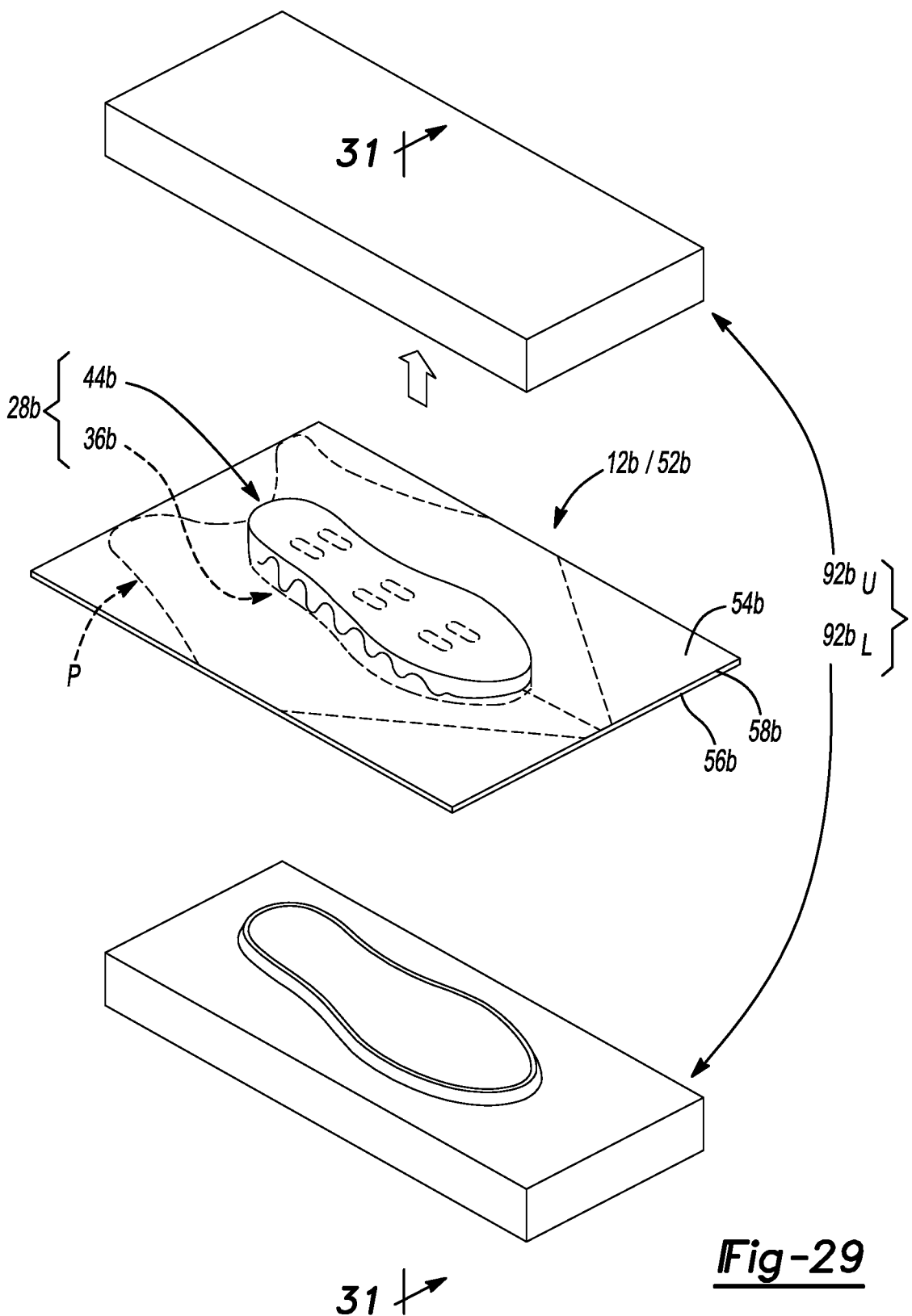
FIG. 29 is a further perspective view of the mold tool and the portion of the article of footwear of FIG. 28 arranged in a further partially assembled state.
Figure 30:
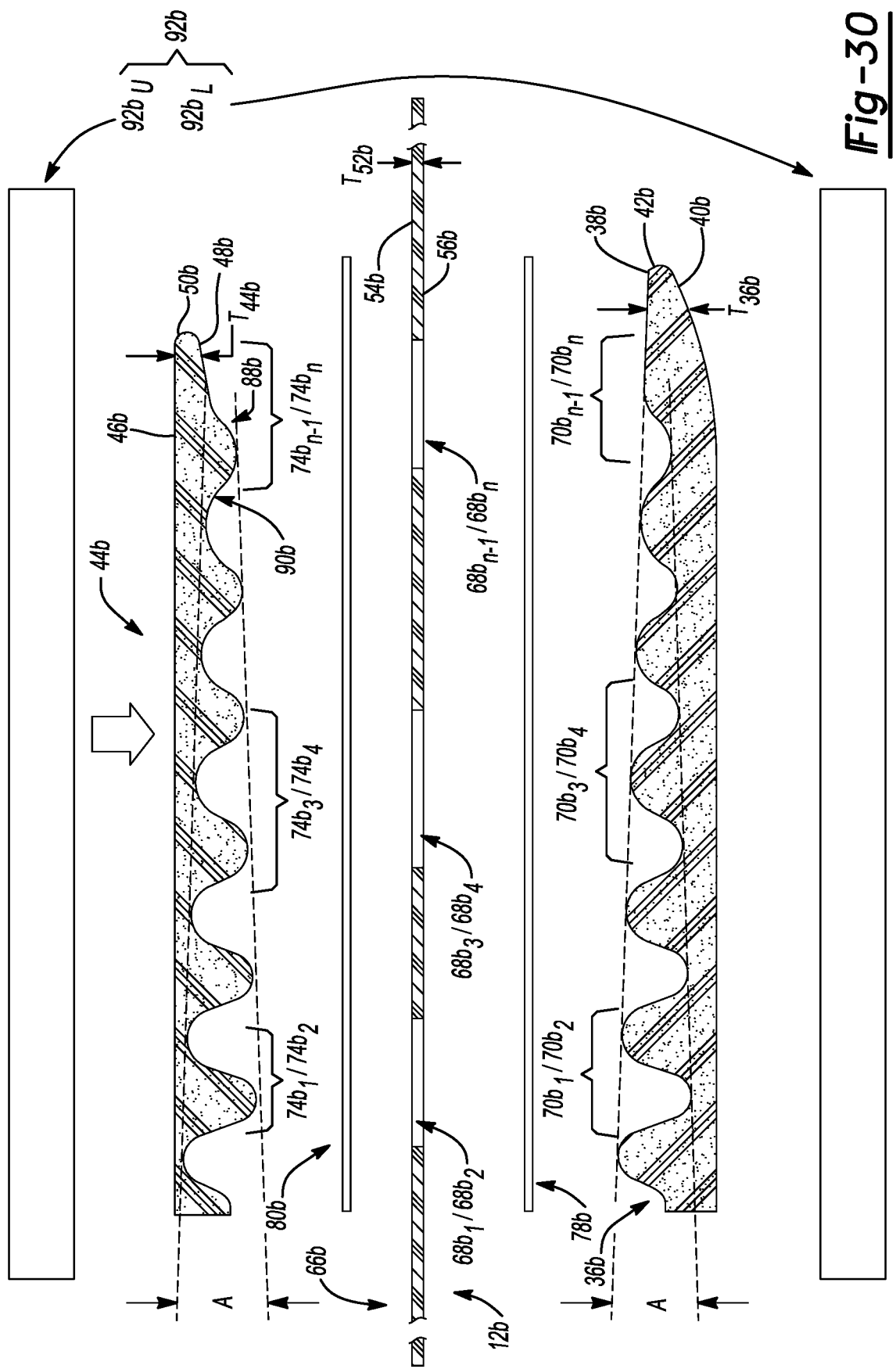
FIG. 30 is a cross-sectional view of the mold tool and the portion of the article of footwear taken along Line 30-30 of FIG. 28.
Figure 31:
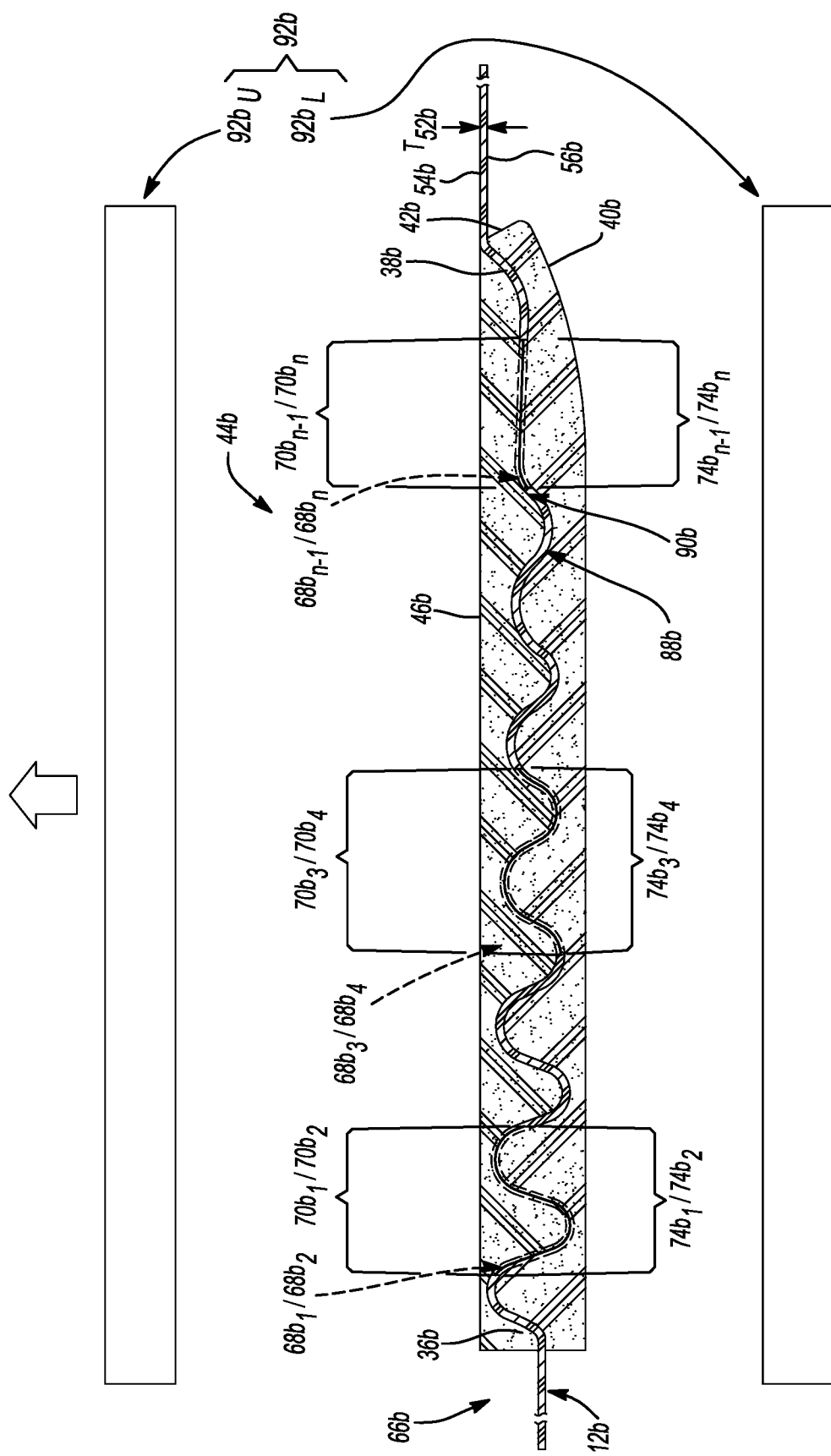
FIG. 31 is a cross-sectional view of the mold tool and the portion of the article of footwear taken along Line 31-31 of FIG. 29.
Figure 34:
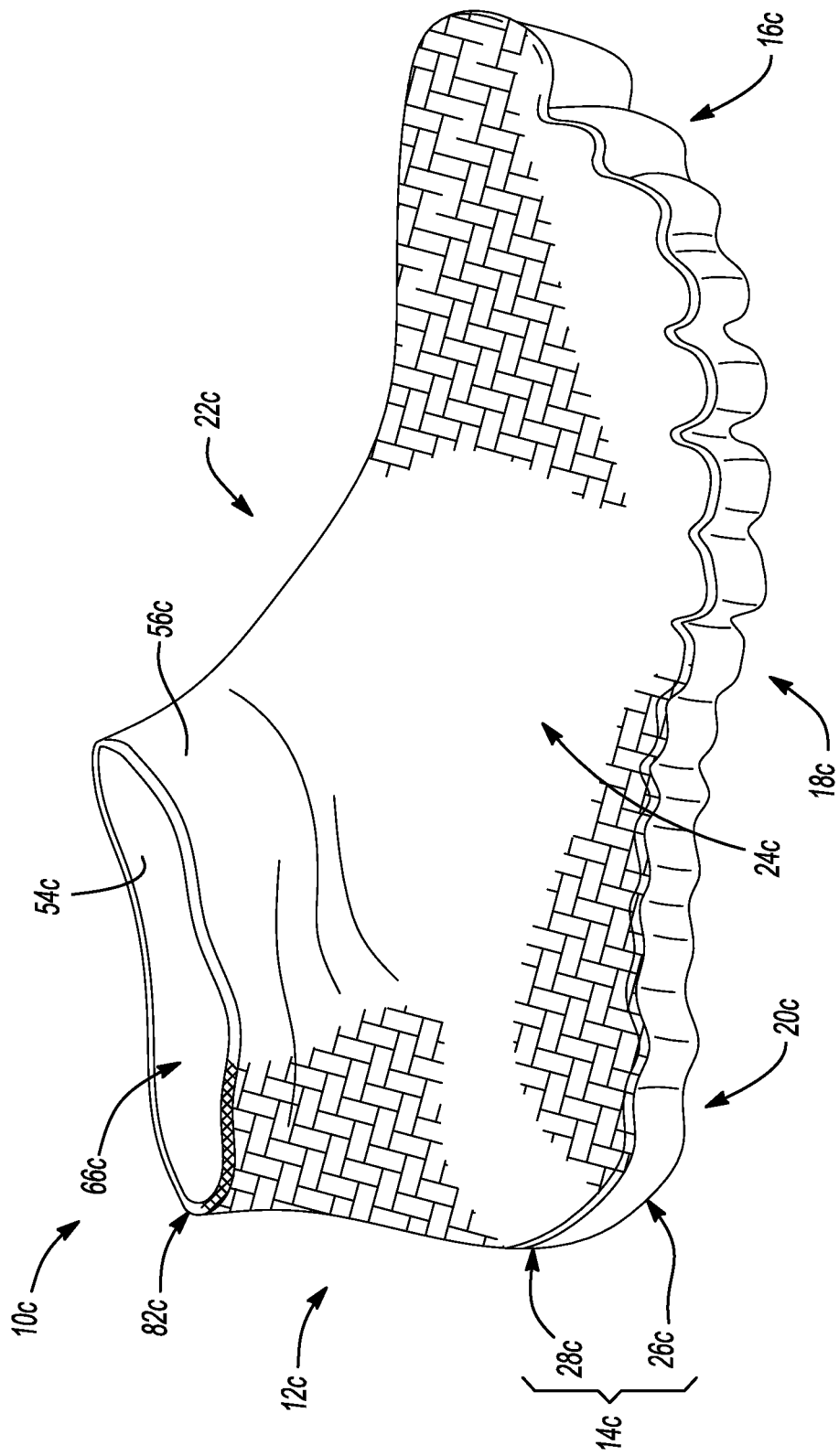
FIG. 34 is a perspective view of an article of footwear incorporating a sole structure in accordance with the principles of the present disclosure.
Figure 35:
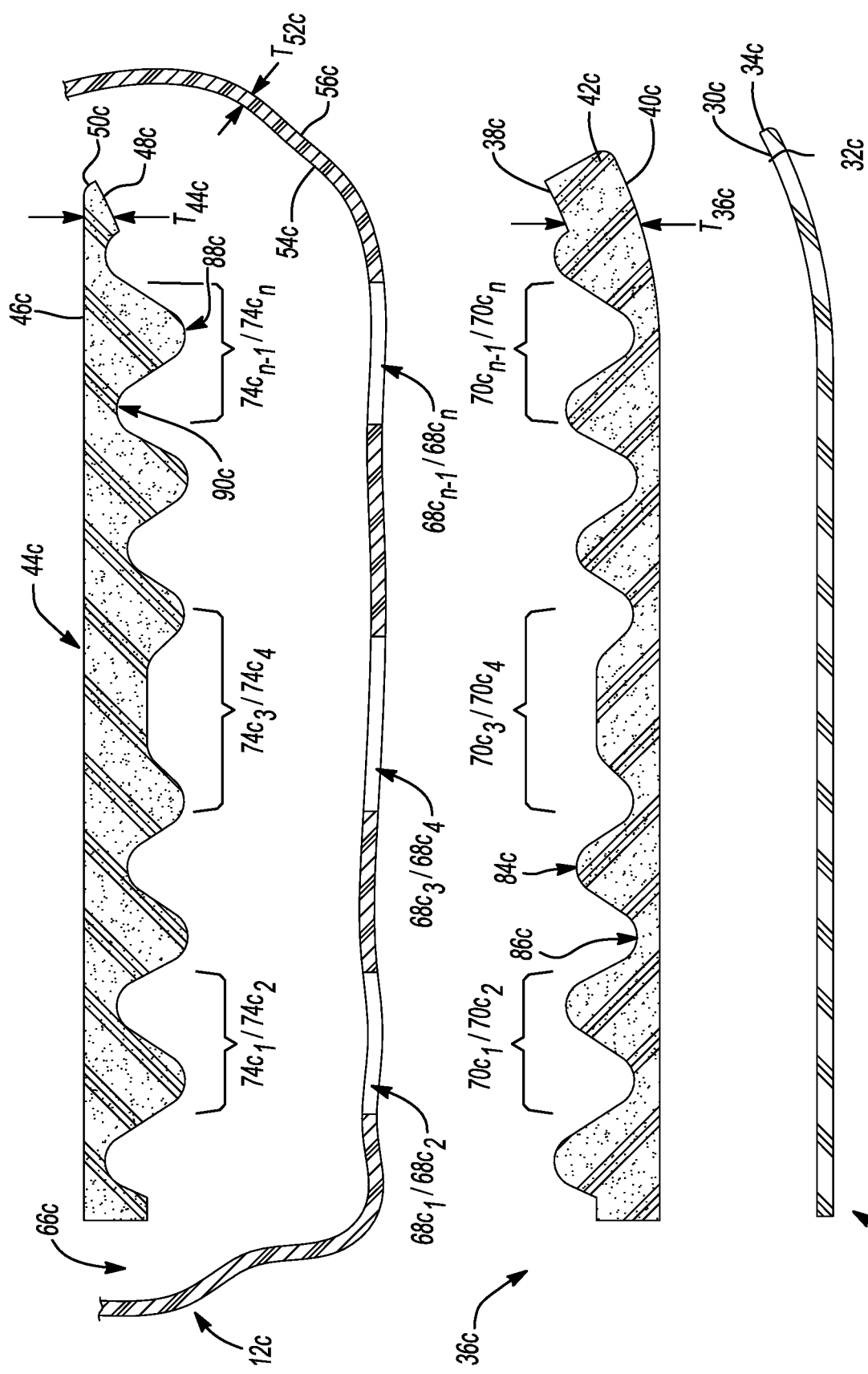
FIG. 35 is an exploded cross-sectional view of the article of footwear of FIG. 34.
Figure 36:
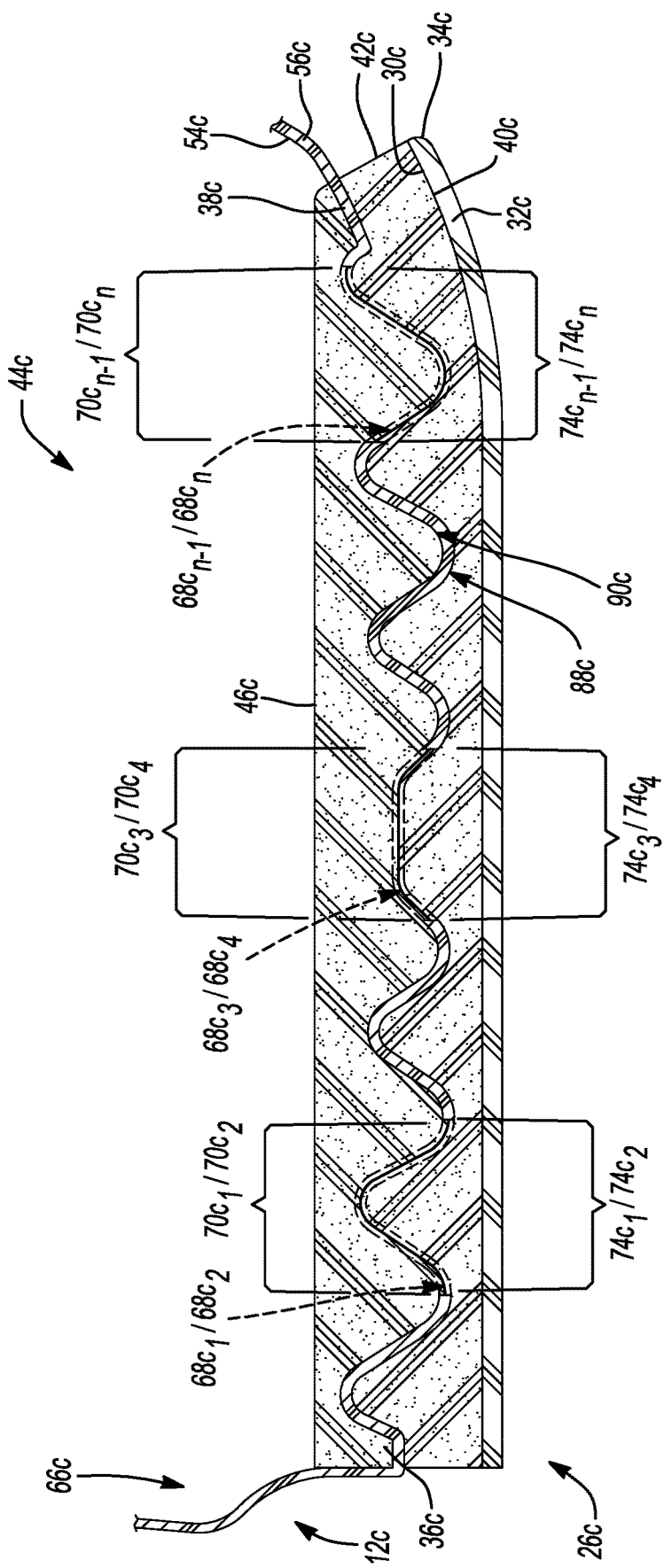
FIG. 36 is an assembled cross-sectional view of the article of footwear of FIG. 34.

As shown in FIGS. 28 and 30, the mold tool 92b is arranged in an open configuration by spacing apart the upper mold half $92b_U$ and the lower mold half $92b_L$ such that the first midsole portion 36b, the second midsole portion 44b and the sheet of material 52b are arranged therebetween. Then, as shown in FIGS. 29 and 31, after arranging the mold tool 92b in a closed configuration for a period of time, the mold tool 92b may be returned to the open configuration with the first midsole portion 36b bonded to the second midsole portion 44b and the sheet of material 52b secured therebetween.

Thereafter, as shown in FIG. 32, the midsole-contacting surface 30b of the outsole 26b may be disposed adjacent the bottom surface 40b of the first midsole portion 36b for joining the outsole 26b to the first midsole portion 36b. In an example, the outsole 26b may be joined to the first midsole portion 36b with an adhesive or by way of a molding tool in a substantially similar manner as described above.

With continued reference to FIGS. 32-33, the outer region 62b and the intermediate region 64b of the sheet of material 52b is folded upwardly such that the intermediate region 64b defined by the top surface 54b of the sheet of material 52b is disposed adjacent the sidewall surface 50b of the second midsole portion 44b. After the intermediate region 64b defined by the top surface 54b of the sheet of material 52b is disposed adjacent the sidewall surface 50b of the second midsole portion 44b, the outer region 62b of the sheet of material 52b forms the upper 12b. In an example, one or more of the outer region 62b and the intermediate region 64b of the sheet of material 12b may be stamped, slit, perforated, cut or otherwise formed to define a pattern P that defines the upper 12b.

Although the mold tool 92b may be utilized for joining the first midsole portion 36b to the second midsole portion 44b under heat and pressure by way of the at least one passage 68b of the sheet of material 52b, as shown in FIG. 30, in some configurations, optional adhesive 78b, 80b may also or alternatively be utilized for adhering the first midsole portion 36b to the second midsole portion 44b. Although FIG. 30 illustrates the optional adhesive 78b, 80b in the form of a sheet having a shape that substantially corresponds to the shape of the central region 60b of the sheet of material 52b, the optional adhesive 78b, 80b may conform to any desirable shape, pattern or configuration, such as, for example, the shape, pattern or configuration of the of the at least one passage 68b of the sheet of material 52b.

In an example, one optional adhesive 78b may be arranged between the first midsole portion 36b and the second midsole portion 44b; furthermore, the one optional adhesive 78b may be arranged between the top surface 38b of the first midsole portion 36b and the bottom surface 56b of the sheet of material 52b such that the one optional adhesive 78b is axially aligned with and radially extends across at least a portion of the shape, pattern or configuration of the of the at least one passage 68b of the sheet of material 52b. The one optional adhesive 78b adhesively bonds the first midsole portion 36b, the second midsole portion 44b and the sheet of material 52b together.

In another example, one optional adhesive 80b may be arranged between the first midsole portion 36b and the second midsole portion 44b; furthermore, the one optional adhesive 80b may be arranged between the top surface 54b of the sheet of material 52b and the bottom surface 48b of the second midsole portion 44b such that the one optional adhesive 80b is axially aligned with and radially extends across at least a portion of the shape, pattern or configuration of the of the at least one passage 68b of the sheet of material 52b. The one optional adhesive 80b adhesively bonds the first midsole portion 36b, the second midsole portion 44b and the sheet of material 52b together.

In yet another example, a first optional adhesive 78b and a second optional adhesive 80b may be arranged between the first midsole portion 36b and the second midsole portion 44b. The first optional adhesive 78b may be arranged between the top surface 38b of the first midsole portion 36b and the bottom surface 56b of the sheet of material 52b such that the first optional adhesive 78b is axially aligned with and radially extends across at least a portion of the shape, pattern or configuration of the of the at least one passage 68b of the sheet of material 52b. The second optional adhesive 80b may be arranged between the top surface 54b of the sheet of material 52b and the bottom surface 48b of the second midsole portion 44b such that the second optional adhesive 80b is axially aligned with and radially extends across at least a portion of the shape, pattern or configuration of the of the at least one passage 68b of the sheet of material 52b. The first optional adhesive 78b and the second optional adhesive 80b adhesively bonds the first midsole portion 36b, the second midsole portion 44b and the sheet of material 52b together.

In other configurations, when the article of footwear 10b is formed, the following surfaces of the outsole 26b, the first midsole portion 36b, the second midsole portion 44b and the sheet of material 52b may be arranged near, proximate, spaced-apart-from or adjacent one another. In an example, the sheet of material 52b may extend from the sidewall surface 50b of the second midsole portion 44b at one of the medial side 22b and the lateral side 24b of the sole structure 14b. In another example, the sheet of material 52b may extend from the sidewall surface 50b of the second midsole portion 44b at both the medial side 22b and the lateral side 24b of the sole structure 14b. In yet another example, the sheet of material 52b extends from the sidewall surface 50b of the second midsole portion 44b around an entire perimeter of the sole structure 14b.

Although an exemplary implementation of the article of footwear 10b includes the outer region 62b of the sheet of material 52b forming the upper 12b, in other examples, the outer region 62b of the sheet of material 52b may form a first upper portion of the upper 12b, and, as such, at least a second upper portion may also contribute to forming the upper 12b. Accordingly, in another implementation, the outer region 62b of the sheet of material 52b may define a first upper portion and extend from the sidewall surface 50b of the second midsole portion 44b and at least partially cover a second upper portion (not shown) that further contributes to forming the upper 12b.

As described above, the intermediate region 64b of the sheet of material 52b may separate the central region 60b of the sheet of material 52b from the outer region 62b of the sheet of material 52b by the distance ($D_{64b}$). Furthermore, in an example, the outer region 62b of the sheet of material 52b may extend from top surface 46b of the second midsole portion 44b at a sufficient distance ($D_{62b}$) for forming at a foot covering portion of the upper 12b that terminates to define at least a portion of an ankle opening 82b (see, e.g., FIGS. 23, 27, 33) of the upper 12b. In one configuration, the central region 60b of the sheet of material 52b that is secured between the first midsole portion 36b and the second midsole portion 44b may be considered to be a portion of the midsole 28b. In other configurations, the central region 60b of the sheet of material 52b that is secured between the first midsole portion 36b and the second midsole portion 44b may be considered to be a portion of the sheet of material 52b that contributes to the formation of the midsole 28b, and the intermediate region 64b of the sheet of material 52b that: (1) extends beyond the sidewall surface 42b of the first midsole portion 36b and the sidewall surface 50b of the second midsole portion 44b and (2) is disposed adjacent the sidewall surface 50b of the second midsole portion 44b may both be considered to be another portion of the sheet of material 52b that contributes to the formation of the midsole 28b. However, in another configuration, the intermediate region 64b of the sheet of material 52b that: (1) extends beyond the sidewall surface 42b of the first midsole portion 36b and the sidewall surface 50b of the second midsole portion 44b and (2) is disposed adjacent the sidewall surface 50b of the second midsole portion 44b may be considered to be a first portion of the upper 12b, and, the outer region 62b of the sheet of material 52b that extends from top surface 46b of the second midsole portion 44b at the distance ($D_{62b}$) may define a second portion of the upper 12b. Therefore, the intermediate region 64b of the sheet of material 52b may contribute to the formation of one or both of the upper and the midsole 28b.

As described above, each of the first midsole portion 36b and the second midsole portion 44b is not flat and may, respectively, be interrupted by one or more peaks 84b, 88b and recesses, trenches or valleys 86b, 90b such that each of the first midsole portion 36b and the second midsole portion 44b defines a substantially sinusoidal pattern extending between the forefoot region 16b and the heel region 20b of the sole structure 14b. The one or more peaks 84b, 88b may define a series of peaks, and, the recesses, trenches or valleys 86b, 90b may define a series of recesses, trenches or valleys.

Furthermore, the respective sinusoidal patterns of each of the first midsole portion 36b and the second midsole portion 44b may be matingly shaped such that the first midsole portion 36b correspondingly mates with the second midsole portion 44b. Accordingly, in an implementation, the one or more peaks 84b of the first midsole portion 36b may oppose and be matingly-received by the recesses, trenches or valleys 90b of the second midsole portion 44b, and, the one or more peaks 88b of the second midsole portion 44b may oppose and be matingly-received by the recesses, trenches or valleys 86b of the first midsole portion 36b.

In some configurations, prior to the central region 60b of the sheet of material 52b being secured between the first midsole portion 36b and the second midsole portion 44b, the central region 60b of sheet of material 52b may be defined by a substantially flat, non-sinusoidal pattern. However, after the central region 60b of the sheet of material 52b is secured between the first midsole portion 36b and the second midsole portion 44b, the central region 60b of the sheet of material 52b may be shaped (by the sinusoidal pattern of each of the first midsole portion 36b and the second midsole portion 44b) to define a sinusoidal pattern that conforms to a mated configuration of the sinusoidal pattern of each of the first midsole portion 36b and the second midsole portion 44b. In an example, the sinusoidal pattern of the central region 60b of the sheet of material 52b may extend between a forefoot region 16b and a heel region 20b of the sole structure 14b. Furthermore, the sinusoidal pattern formed by the central region 60b of the sheet of material 52b includes one or more peaks (that is/are formed by the one or more recesses, trenches or valleys 86b of the first midsole portion 36b and the one or more recesses, trenches or valleys 90b of the second midsole portion 44b) and one or more valleys (that is/are formed by the one or more peaks 84b of the first midsole portion 36b and the one or more peaks 88b of the second midsole portion 44b) extending between a forefoot region 16b and a heel region 20b of the sole structure 14b.

Although some configurations may include the central region 60b of sheet of material 52b being defined by a substantially flat, non-sinusoidal pattern that is subsequently shaped to define a sinusoidal pattern after the central region 60b of the sheet of material 52b is secured between the first midsole portion 36b and the second midsole portion 44b as described above, other configurations may include the central region 60b of sheet of material 52b being preformed to define a sinusoidal pattern that corresponds to a mated configuration of the sinusoidal pattern of each of the first midsole portion 36b and the second midsole portion 44b. In an example, the preformed sinusoidal pattern of the central region 60b of the sheet of material 52b may extend between a forefoot region 16b and a heel region 20b of the sole structure 14b. Furthermore, the preformed sinusoidal pattern of the central region 60b of the sheet of material 52b includes one or more preformed peaks (that is aligned with and corresponds to the one or more recesses, trenches or valleys 86b of the first midsole portion 36b and the one or more recesses, trenches or valleys 90b of the second midsole portion 44b) and one or more preformed valleys (that is aligned with and corresponds to the one or more peaks 84b of the first midsole portion 36b and the one or more peaks 88b of the second midsole portion 44b) extending between a forefoot region 16b and a heel region 20b of the sole structure 14b.

With reference to FIGS. 34-38, an exemplary article of footwear 10c is provided and includes an upper 12c and a sole structure 14c attached to the upper 12c. The article of footwear 10c may be divided into one or more regions. The regions may include a forefoot region 16c, a midfoot region 18c, and a heel region 20c. The forefoot region 16c may correspond with toes and joints connecting metatarsal bones with phalanx bones of a foot. The midfoot region 18c may correspond with an arch area of the foot while the heel region 18c may correspond with rear portions of the foot, including a calcaneus bone. The article of footwear 10c may additionally include a medial side 22c and a lateral side 24c that correspond with opposite sides of the article of footwear 10c and extend through the regions 16c, 18c, 20c.

The sole structure 14c includes a midsole 28c and optionally includes an outsole 26c. A cushioning arrangement (not shown) may optionally be disposed generally between the outsole 26c and the midsole 28c.

Figure 37:
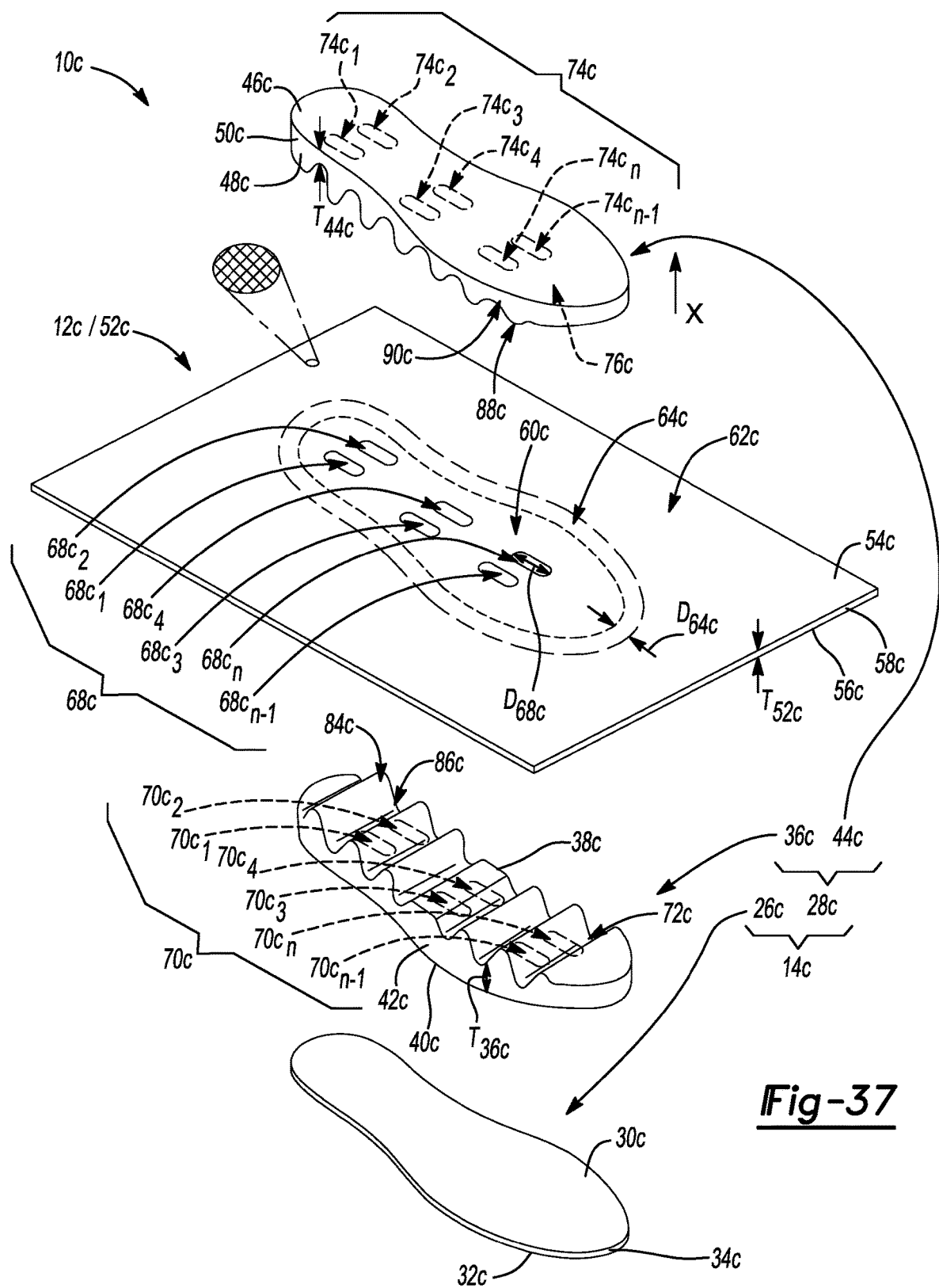
FIG. 37 is an exploded perspective view of the article of footwear of FIG. 34 illustrating a component of the article of footwear that contributes to formation of an upper arranged in a substantially flat orientation.

Referring to FIG. 37, the outsole 26c includes a midsole-contacting surface 30c and a ground-contacting surface 32c. The outsole 26c further includes a sidewall surface 34c extending between the midsole-contacting surface 30c and the ground-contacting surface 32c.

The midsole 28c includes a first midsole portion 36c and a second midsole portion 44c. The first midsole portion 36c includes a top surface 38c, a bottom surface 40c and a sidewall surface 42c extending between the top surface 38c and the bottom surface 40c. The sidewall surface 42c may define a thickness ($T_{36c}$) of the first midsole portion 36c extending between the top surface 38c and the bottom surface 40c.

The top surface 38c and the bottom surface 40c of the first midsole portion 36c may generally define an outer surface profile of the first midsole portion 36c. In an example, the top surface 38c of the first midsole portion 36c is not flat and may be interrupted by one or more peaks 84c and recesses, trenches or valleys 86c such that the first midsole portion 36c defines a substantially sinusoidal pattern extending between the forefoot region 16c and the heel region 20c of the sole structure 14c. Furthermore, in an example, the sinusoidal pattern of the first midsole portion 36c may be defined by a substantially non-constant amplitude A (see, e.g., FIG. 41) such that the thickness ($T_{36c}$) of the first midsole portion 36c that is bound by each peak 84c of the top surface 38c and each peak 84c of the bottom surface 40c is not substantially the same across a length ($L_{14c}$) of the sole structure 14c. In an example, the non-constant amplitude A of the first midsole portion 36c results in each peak 84c and each recess, trench or valley 86c progressively decreasing in a direction extending from the heel region 20c to the midfoot region 18c (such that there is an absence of the sinusoidal pattern extending across, for example, some, most or all of the midfoot region 18c) and then progressively increasing from the midfoot region 18c to the forefoot region 16c of the sole structure 14c. Further, the amplitude A defined by each peak 84c remains substantially the same as each peak 84c extends between the medial side 22c and the lateral side 24c of the sole structure 14c. Yet even further, in an example, as a result of the absence of the sinusoidal pattern across, for example, some, most or all of the midfoot region 18c, the first midsole portion 36c may be defined by a substantially non-constant frequency as the sinusoidal pattern extends between the forefoot region 16c and the heel region 20c of the sole structure 14c.

The second midsole portion 44c includes a top surface 46c, a bottom surface 48c and a sidewall surface 50c extending between the top surface 46c and the bottom surface 48c. The sidewall surface 50c may define a thickness ($T_{44c}$) of the second midsole portion 44c extending between the top surface 46c and the bottom surface 48c.

The top surface 46c and the bottom surface 48c of the second midsole portion 44c may generally define an outer surface profile of the second midsole portion 44c. In an example, the bottom surface 48c of the second midsole portion 44c is not flat and may be interrupted by one or more peaks 88c and recesses, trenches or valleys 90c such that the second midsole portion 44c defines a substantially sinusoidal pattern extending between the forefoot region 16c and the heel region 20c of the sole structure 14c. Furthermore, in an example, the sinusoidal pattern of the second midsole portion 44c may be defined by a substantially non-constant amplitude A (see, e.g., FIG. 41) such that the thickness ($T_{44c}$) of the second midsole portion 44c (that is bound by each peak 88c of the top surface 46c and each peak 90c of the bottom surface 48c) is not substantially the same across a length ($L_{14c}$) of the sole structure 14c. In an example, the non-constant amplitude A of the second midsole portion 44c results in each peak 88c and each recess, trench or valley 90c progressively decreasing in a direction extending from the heel region 20c to the midfoot region 18c (such that there is an absence of the sinusoidal pattern extending across, for example, some, most or all of the midfoot region 18c) and then progressively increasing from the midfoot region 18c to the forefoot region 16c of the sole structure 14c. Further, the amplitude A defined by each peak 88c remains substantially the same as each peak 88c extends between the medial side 22c and the lateral side 24c of the sole structure 14c. Yet even further, in an example, as a result of the absence of the sinusoidal pattern across, for example, some, most or all of the midfoot region 18c, the second midsole portion 44c may be defined by a substantially non-constant frequency as the sinusoidal pattern extends between the forefoot region 16c and the heel region 20c of the sole structure 14c.

In some examples, at least one of the first midsole portion 36c and the second midsole portion 44c are formed from a foamed material. In some instances, one or both of the first midsole portion 36c and the second midsole portion 44c are formed from a polymeric material. In another example, the first midsole portion 36c and the second midsole portion 44c are formed from the same material. In yet another example, the first midsole portion 36c and the second midsole portion 44c are formed from different materials. In a further example, the first midsole portion 36c is formed from a first material and the second midsole portion 44c is formed from a second material. In yet a further example, the first material forming the first midsole portion 36c has substantially the same stiffness as the second material forming the second midsole portion 44c. In some instances, the first material forming the first midsole portion 36c has a different stiffness than the second material forming the second midsole portion 44c. In other examples, the first material forming the first midsole portion 36c is the same as the second material forming the second midsole portion 44c. In yet another examples, the first material forming the first midsole portion 36c is different than the second material forming the second midsole portion 44c.

As shown in FIG. 37, the article of footwear 10c further includes a sheet of material 52c. The sheet of material 52c includes a top surface 54c, a bottom surface 56c and a sidewall surface 58c extending between the top surface 54c and the bottom surface 56c. The sidewall surface 58c may define a thickness ($T_{52c}$) of the sheet of material 52c extending between the top surface 54c and the bottom surface 56c.

In an example, the sheet of material 52c is formed from a flexible material. The sheet of material 52c may include a fabric material, a woven textile (see, e.g., enlarged view of the sheet of material 52c in FIG. 37), or a knitted textile (see, e.g., enlarged view of the sheet of material 52c in FIG. 37). In some instances, the sheet of material 52c is porous. The sheet of material 52c may be formed from a polymeric material such as, for example, a thermoplastic polymeric material. An exemplary thermoplastic polymeric material may include, for example, a thermoset polymeric material or the like. In some examples, the sheet of material 52c may be a thermoformable material. In some examples, if the sheet of material 52c is a woven or knit structure (as seen in, e.g., the enlarged view of FIG. 37), the woven or knit structure may be formed from a polyester yarn. Furthermore, in other examples, if the sheet of material 52c is a woven or knit structure (as seen in, e.g., the enlarged view of FIG. 37), each passage or aperture formed by overlapping members defining the woven or knit structure of the sheet of material 52c may be at least 0.5 mm in length in a largest dimension or at least 1.0 mm in length in a largest dimension. Furthermore, each passage or aperture formed by overlapping members defining the woven or knit structure of the sheet of material 52c may permit one or both of the first midsole portion 36c and the second midsole portion 44c to directly contact one another. In other implementations, one or both of the first midsole portion 36c and the second midsole portion 44c may be injection molded around or through each passage or aperture formed by overlapping members defining the woven or knit structure of the sheet of material 52c.

In some instances, the sheet of material 52c is an embroidered textile. In some examples, the sheet of material 52c has one or more first regions including embroidery and one or more second regions without embroidery or with a lower percentage of embroidered surface area as comparted to the one or more first regions. The embroidery can provide reduced stretch or a "lock down" feature to areas of the sheet of material 52c. Such areas of the sheet of material 52c providing a reduced stretch quality may be located, for example, at a region of the sheet of material 52c that is arranged between the first midsole portion 36c and the second midsole portion 44c, or, alternatively at a region that extends beyond the sidewall surface 58c of the sheet of material 52c.

The sheet of material 52c may be further defined by a plurality of regions 60c, 62c, 64c. Each of the top surface 54c and the bottom surface 56c extends across the plurality of regions 60c, 62c, 64c. The plurality of regions 60c, 62c, 64c may be defined by a central region 60c, an outer region 62c and an intermediate region 64c extending between the central region 60c and the outer region 62c. The intermediate region 64c may separate the central region 60c from the outer region 62c by a distance ($D_{64c}$).

The central region 60c of the sheet of material 52c may be defined by a shape that generally corresponds to a shape defining the top surface 46c of the second midsole portion 44c. The distance ($D_{64c}$) that separates the central region 60c from the outer region 62c may be approximately equal to the thickness ($T_{44c}$) of the second midsole portion 44c.

With reference to FIG. 37, the first midsole portion 36c is disposed between the outsole 26c and the upper 12c. As shown in FIGS. 37 and 44, the second midsole portion 44c is disposed between the first midsole portion 36c and the upper 12c. The sheet of material 52c is disposed between the first midsole portion 36c and the second midsole portion 44c. The bottom surface 56c of the sheet of material 52c extends across the top surface 38c of the first midsole portion 36c and beyond the sidewall surface 42c of the first midsole portion 36c. The top surface 54c of the sheet of material 52c extends across the bottom surface 48c of the second midsole portion 44c and beyond the sidewall surface 50c of the second midsole portion 44c. With reference to FIGS. 37 and 44, when forming the article of footwear 10c, the top surface 54c of the sheet of material 52c extends at least partially over the sidewall surface 50c of the second midsole portion 44c in a direction (X), as shown in FIG. 37, toward the top surface 46c of the second midsole portion 44c.

Figure 38:
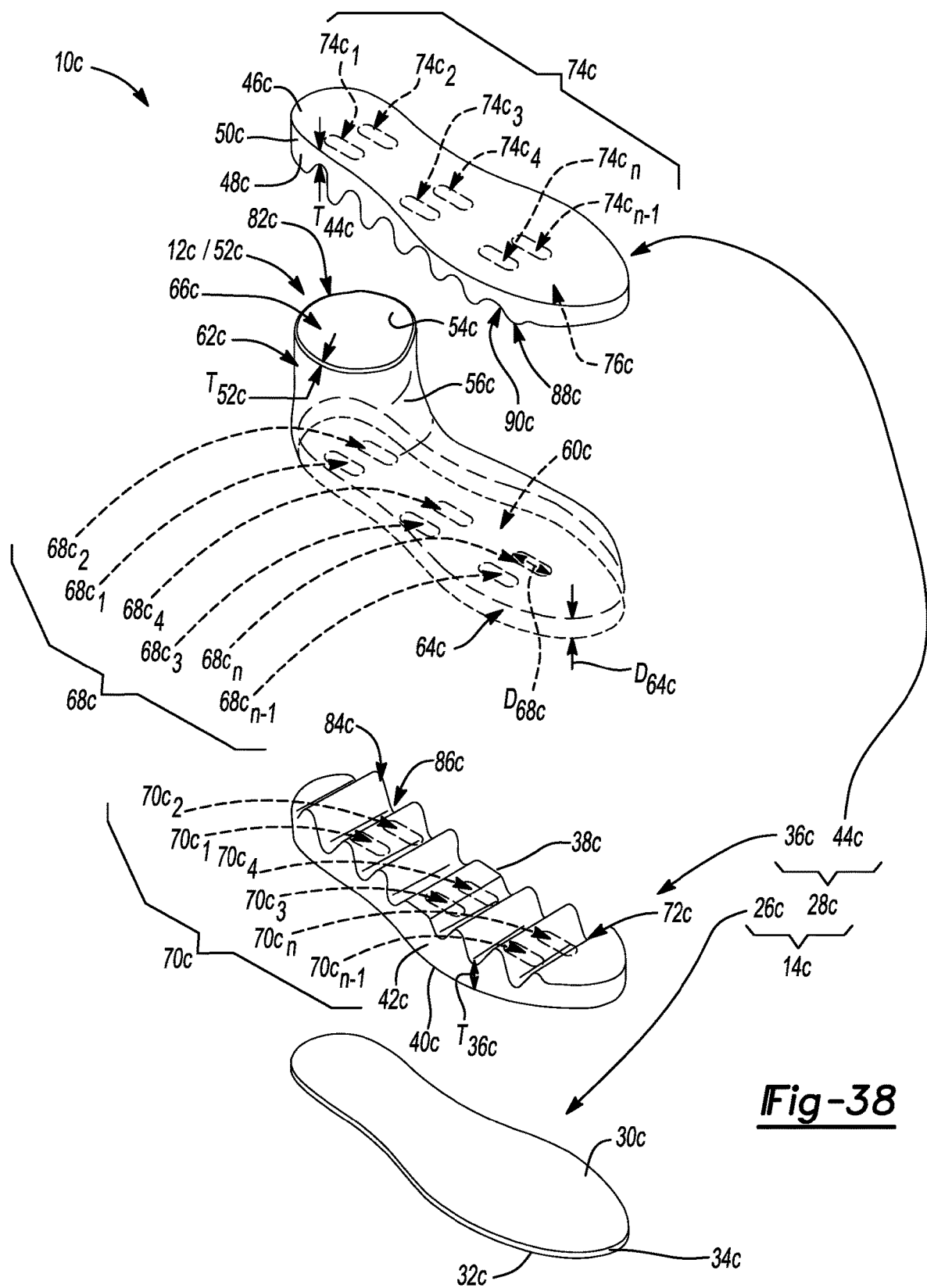
FIG. 38 is an exploded perspective view of the article of footwear of FIG. 34 illustrating a component of the article of footwear that contributes to formation of an upper arranged in a non-flat orientation defining at least a portion of a foot-receiving cavity.

With reference to FIGS. 37 and 38, the outer region 62c of the sheet of material 52c is sized for defining the upper 12c of the article of footwear 10c. As shown in FIG. 38, upon the outer region 62c of the sheet of material 52c forming the upper 12c, the top surface 46c of the second midsole portion 44c and the top surface 54c of the sheet of material 52c defined by the outer region 62c of the sheet of material 52c generally forms a cavity 66c that is sized for receiving a foot (not shown) of a user.

As shown in FIG. 37, at least the central region 60c of the sheet of material 52c may further define at least one passage or aperture 68c or absence of the sheet of material 52c. The at least one passage 68c extends through the thickness ($T_{52c}$) of the sheet of material 52c between the top surface 54c and the bottom surface 56c. In an example, the at least one passage 68c is formed in the central region 60c of the sheet of material 52c and not the outer region 62c or the intermediate region 64c of the sheet of material 52c. Although an implementation of the sheet of material 52c may include the at least one passage 68c exclusively formed by the central region 60c of the sheet of material 52c, other implementations of the sheet of material 52c may include the at least one passage 68c formed by two or more of the central region 60c, the outer region 62c and the intermediate region 64c of the sheet of material 52c. If a polymeric material defines one or both of the first midsole portion 36c and the second midsole portion 44c, the polymeric material may be molded around any surface defining the sheet of material 52c and/or through at least one passage 68c that extends through the thickness ($T_{52c}$) of the sheet of material 52c.

The at least one passage 68c may be defined by a plurality of passages or apertures $68c_1$-$68c_n$ having, for example: a first passage 68c1, a last passage $68c_n$ and one or more intermediate passages $68c_2$-$68c_{n-1}$. In an example, as shown in FIG. 37, the plurality of passages $68c_1$-$68c_n$ may be arranged in any desirable pattern (e.g., in: (1) a row-and-column grid, (2) staggered rows and columns, or (3) a random pattern) extending across the central region 60c of the sheet of material 52c between the forefoot region 16c and the heel region 20c of the sole structure 14c (i.e., across substantially most or all of the length ($L_{14c}$) of the sole structure 14c) and between the medial side 22c and the lateral side 24c of the article of footwear 10c (i.e., across the width ($W_{14c}$) of the sole structure 14c). In other implementations, the plurality of passages $68c_1$-$68c_n$ may be arranged in a pattern (e.g., in: (1) a row-and-column grid, (2) staggered rows and columns, or (3) a random pattern) that does not extend across the central region 60c of the sheet of material 52c between the forefoot region 16c and the heel region 20c of the sole structure 14c and between the medial side 22c and the lateral side 24c of the article of footwear 10c. Although the plurality of passages $68c_1$-$68c_n$ may extend across substantially most or all of the length ($L_{14c}$) of the sole structure 14c as described above, the plurality of passages $68c_1$-$68c_n$ may be arranged in a pattern (e.g., in: (1) a row-and-column grid, (2) staggered rows and columns, or (3) a random pattern) extending across: (1) some or all of the heel region 20c of the sole structure 14c but not the forefoot region 16c or the midfoot region 18c of the sole structure 14c, (2) some or all of the forefoot region 16c of the sole structure 14c but not the midfoot region 18c or the heel region 20c of the sole structure 14c or (3) some or all of the forefoot region 16c and the heel region 20c of the sole structure 14c but not the midfoot region 18c of the sole structure 14c.

With continued reference to FIG. 37, each passage of the plurality of passages $68c_1$-$68c_n$ is shown being defined by a substantially circular or oval shape having any dimension or diameter ($D_{68c}$). In some examples, the dimension or diameter ($D_{68c}$) may be approximately equal to about 0.5 mm or about 3.0 mm. In other examples, the dimension or diameter ($D_{68c}$) may be between approximately 0.5 mm and approximately 3.0 mm. Furthermore, each passage of the plurality of passages $68c_1$-$68c_n$ may be defined by a substantially similar dimension or diameter ($D_{68c}$). Although each passage of the plurality of passages $68c_1$-$68c_n$ may be defined by a substantially similar dimension or diameter ($D_{68c}$), implementations of the sheet of material 52c may include at least one passage of the plurality of passages $68c_1$-$68c_n$ having a different sized or shaped dimension or diameter ($D_{68c}$). For example, at least one passage of the plurality of passages $68c_1$-$68c_n$ may have a different sized or shaped dimension or diameter ($D_{68c}$) than another passage of the plurality of passages $68c_1$-$68c_n$ in the: (1) the heel region 20c of the sole structure 14c, (2) the forefoot region 16c of the sole structure 14c or (3) the forefoot region 16c and the heel region 20c of the sole structure 14c.

The top surface 38c of the first midsole portion 36c may be further defined by at least one second midsole contacting region 70c and at least one sheet of material contacting region 72c. The bottom surface 48c of the second midsole portion 44c may be further defined by at least one first midsole contacting region 74c and at least one sheet of material contacting region 76c.

Each of the at least one second midsole contacting region 70c of the first midsole portion 36c and the at least one first midsole contacting region 74c of the second midsole portion 44c may be defined by a shape that generally corresponds to a shape defined by the at least one passage 68c formed by the central region 60c of the sheet of material 52c. If the at least one passage 68c formed by the central region 60c of the sheet of material 52c is defined by plurality of passages $68c_1$-$68c_n$, each of the at least one second midsole contacting region 70c of the first midsole portion 36c and the at least one first midsole contacting region 74c of the second midsole portion 44c may be defined by a corresponding plurality of second midsole contacting regions $70c_1$-$70c_n$ and a plurality of first midsole contacting regions $74c_1$-$74c_n$. Furthermore, as shown in FIG. 37, each passage and contacting region of the plurality of passages $68c_1$-$68c_n$ and the plurality of second midsole contacting regions $70c_1$-$70c_n$ and the plurality of first midsole contacting regions $74c_1$-$74c_n$ is respectively axially aligned with one another.

In an example, when the article of footwear 10c is formed, the following surfaces of the outsole 26c, the first midsole portion 36c, the second midsole portion 44c and the sheet of material 52c may be arranged near, proximate, spaced-apart-from or adjacent one another. The at least one sheet of material contacting region 72c of the top surface 38c of the first midsole portion 36c may be disposed adjacent the bottom surface 56c of the sheet of material 52c. The at least one sheet of material contacting region 76c of the bottom surface 48c of the second midsole portion 44c may be disposed adjacent the top surface 54c of the sheet of material 52c defined by the central region 60c of the sheet of material 52c.

Once the sheet of material 52c is arranged relative the first midsole portion 36c and the second midsole portion 44c as described above, the sheet of material 52c may be said to be arranged between the first midsole portion 36c and the second midsole portion 44c. Even though the sheet of material 52c may be disposed between the first midsole portion 36c and the second midsole portion 44c, one or more portions of the first midsole portion 36c may be in direct contact with one or more portions of the second midsole portion 44c as a result of the formation of the at least one passage 68c of the sheet of material 52c such that at least one second midsole contacting region 70c of the top surface 38c of the first midsole portion 36c may be disposed adjacent the at least one first midsole contacting region 74c of the bottom surface 48c of the second midsole portion 44c. After arranging the at least one second midsole contacting region 70c of the top surface 38c of the first midsole portion 36c adjacent the at least one first midsole contacting region 74c of the bottom surface 48c of the second midsole portion 44c, the sheet of material 52c and the midsole 28c defined by the first midsole portion 36c and the second midsole portion 44c may be arranged in a molding tool 92c (see, e.g., FIGS. 39-42) for directly bonding the first midsole portion 36c to the second midsole portion 44c at the at least one second midsole contacting region 70c and the at least one first midsole contacting region 74c.

The mold tool 92c includes an upper mold half $92c_U$ and a lower mold half $92c_L$. Each of the upper mold half $92c_U$ and the lower mold half $92c_L$ may be define a mold surface that corresponds to the shape of the central region 60c of the sheet of material 52c for bonding the first midsole portion 36c to the second midsole portion 44c under heat and pressure.

Figure 39:
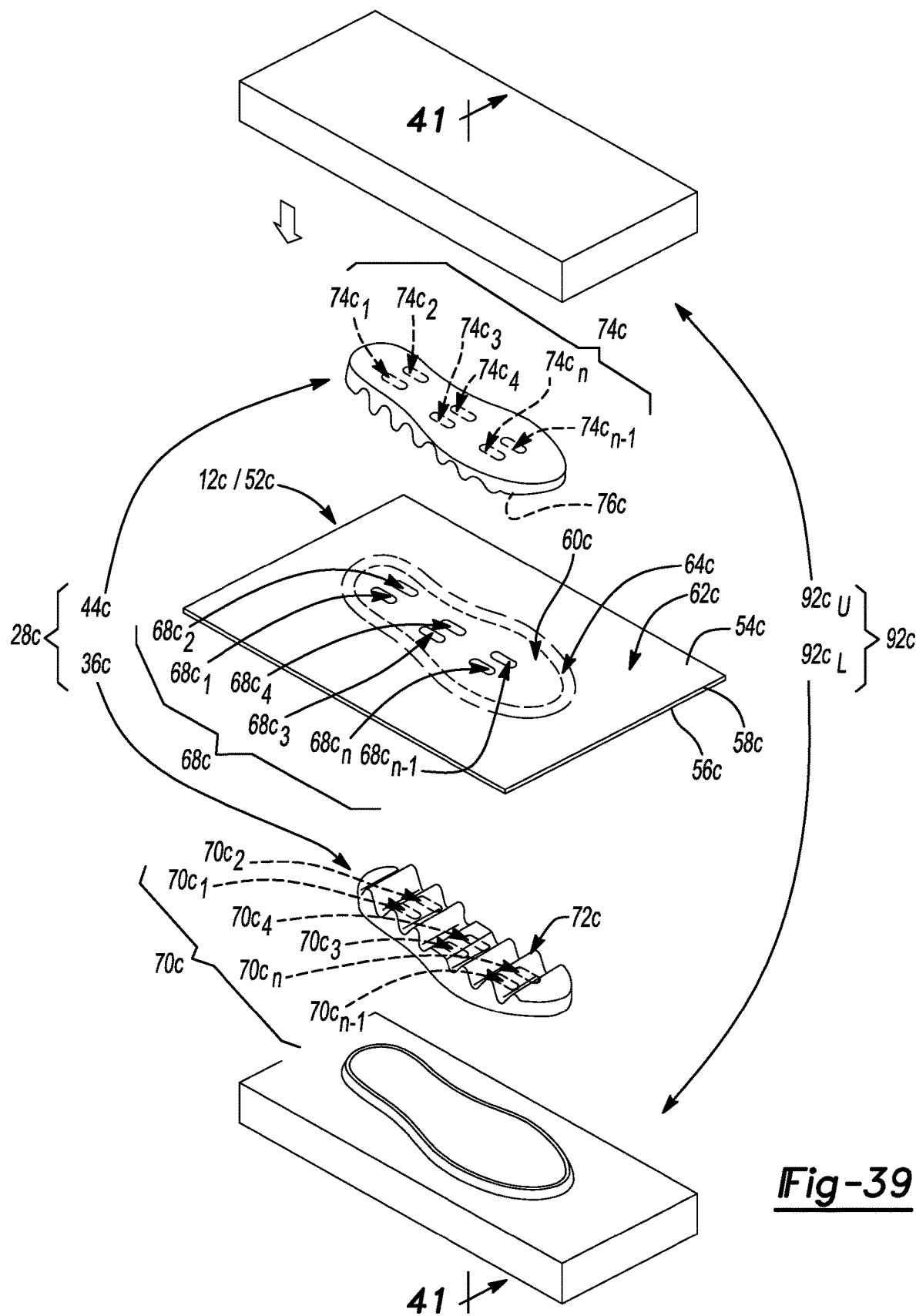
FIG. 39 is a perspective view of an exemplary mold tool and a portion of the article of footwear corresponding to FIG. 37.
Figure 40:
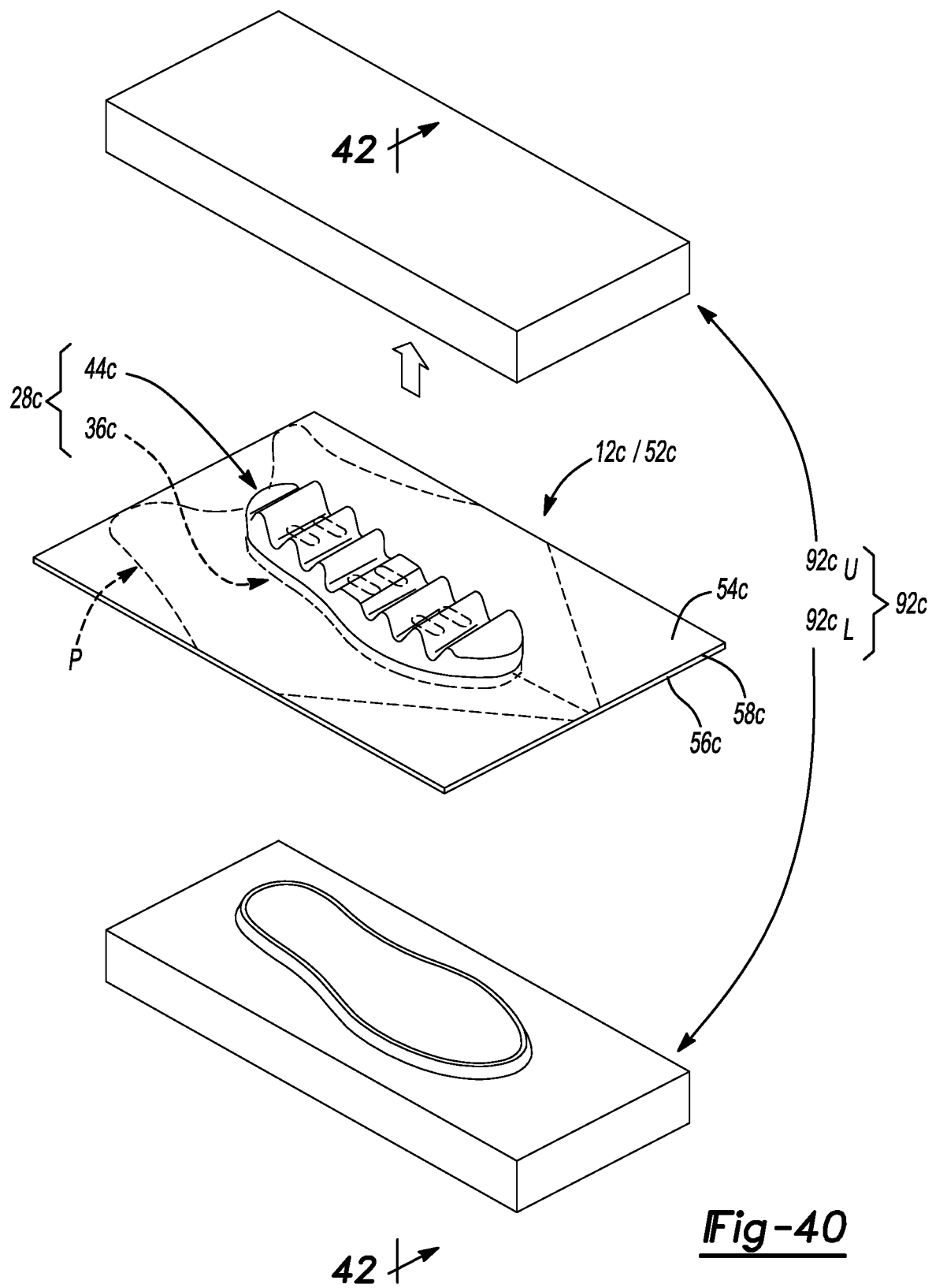
FIG. 40 is a further perspective view of the mold tool and the portion of the article of footwear of FIG. 39 arranged in a further partially assembled state.
Figure 41:
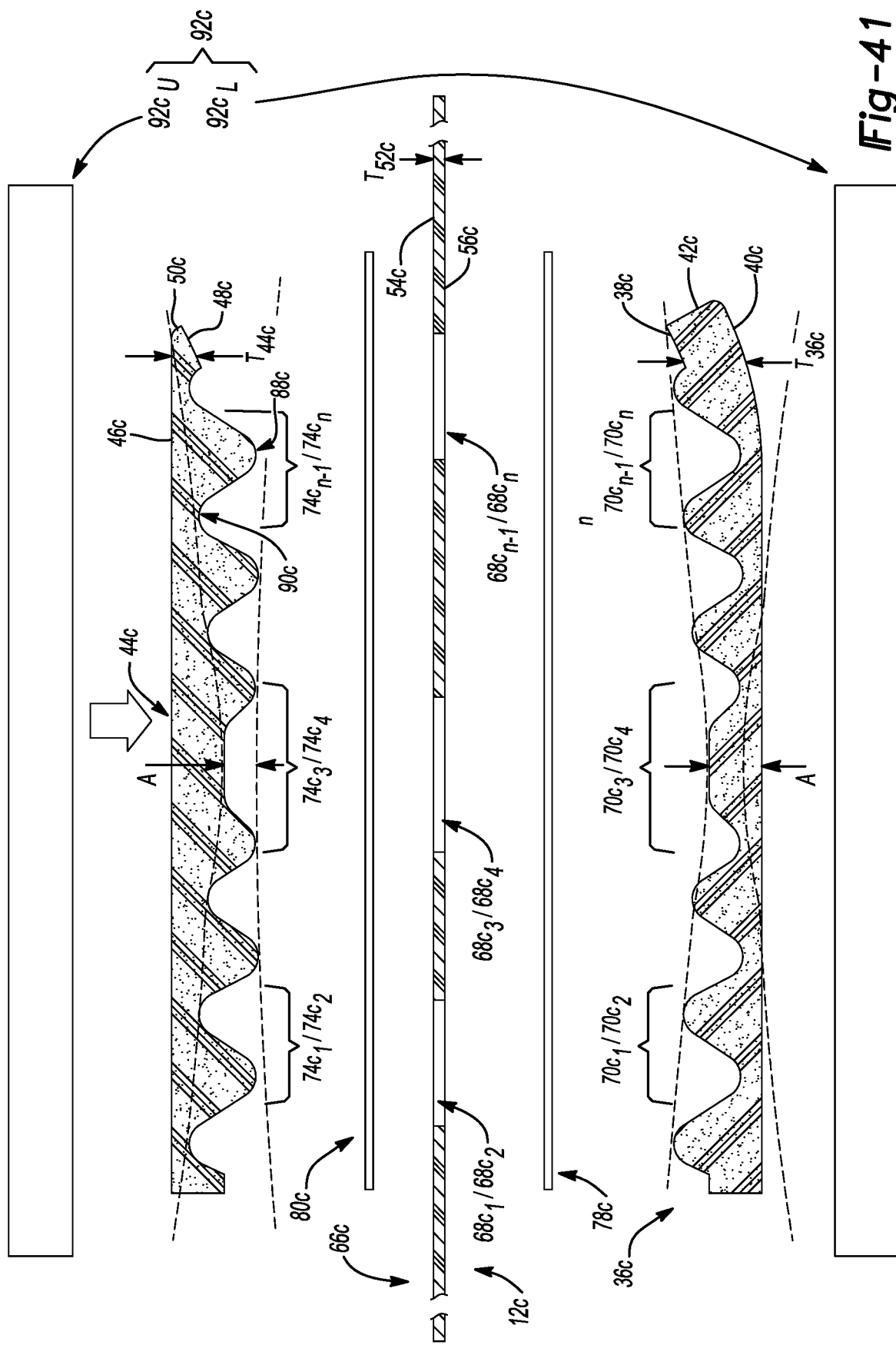
FIG. 41 is a cross-sectional view of the mold tool and the portion of the article of footwear taken along Line 41-41 of FIG. 39.
Figure 42:
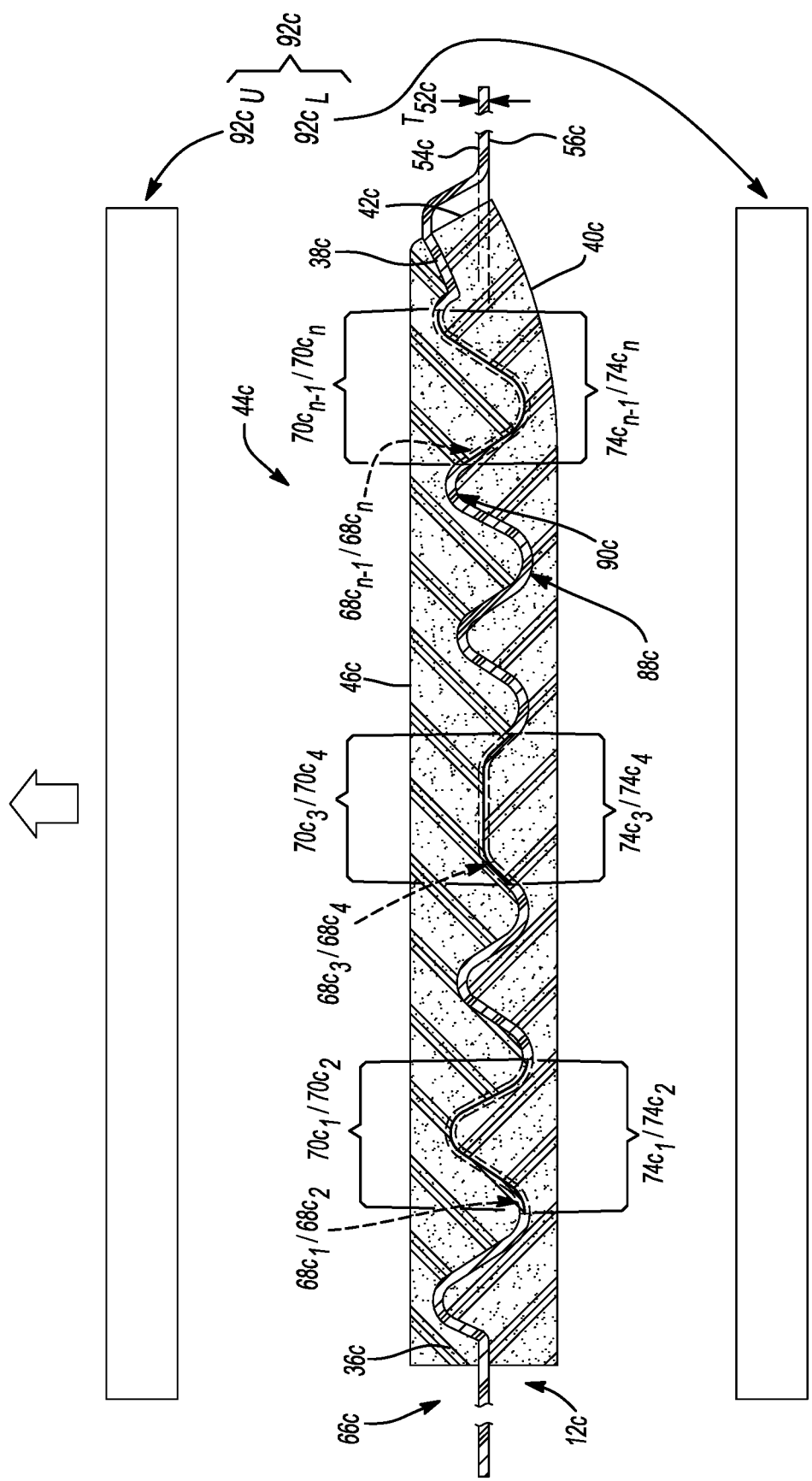
FIG. 42 is a cross-sectional view of the mold tool and the portion of the article of footwear taken along Line 42-42 of FIG. 40.
Figure 45:
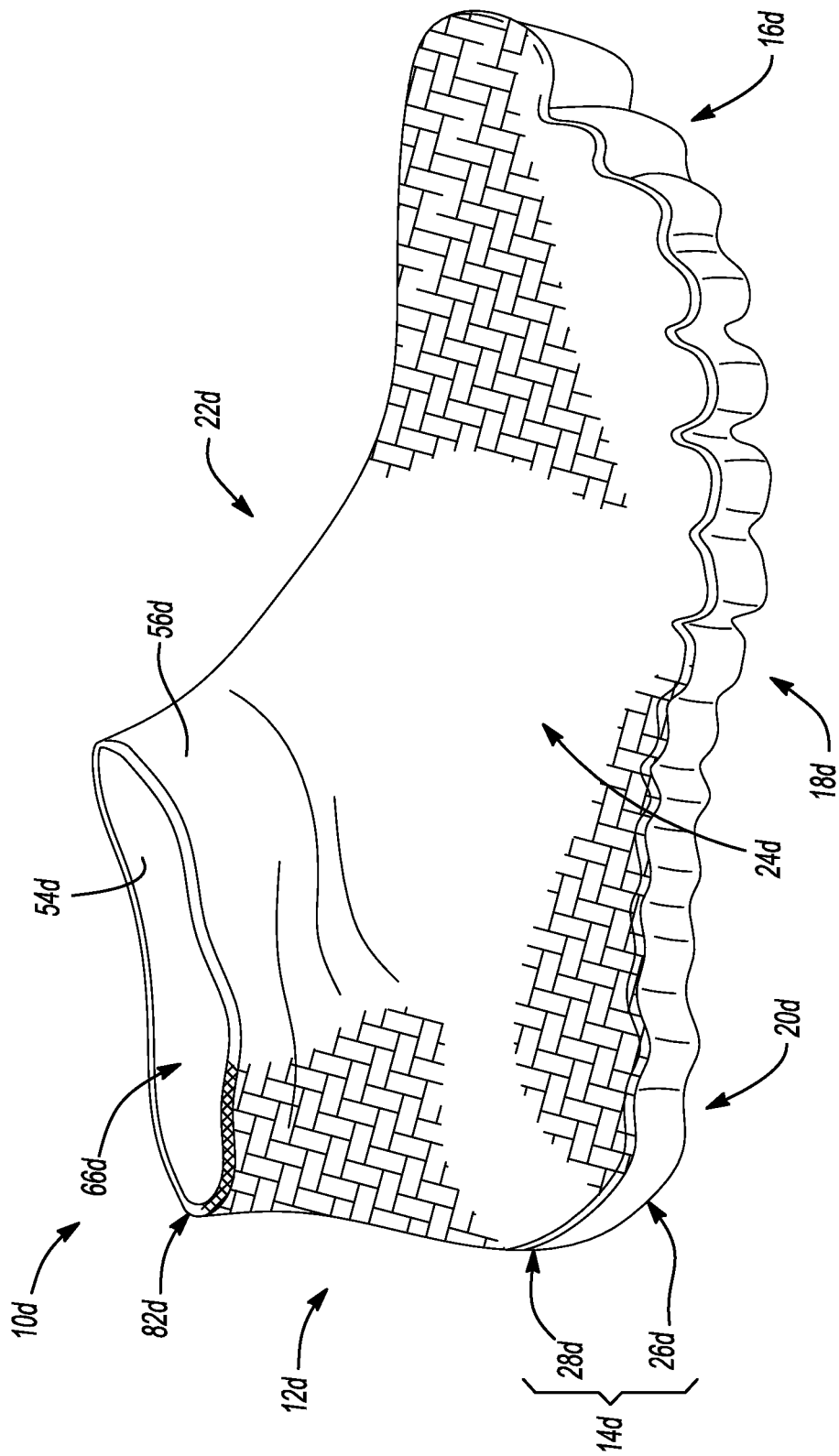
FIG. 45 is a perspective view of an article of footwear incorporating a sole structure in accordance with the principles of the present disclosure.
Figure 46:
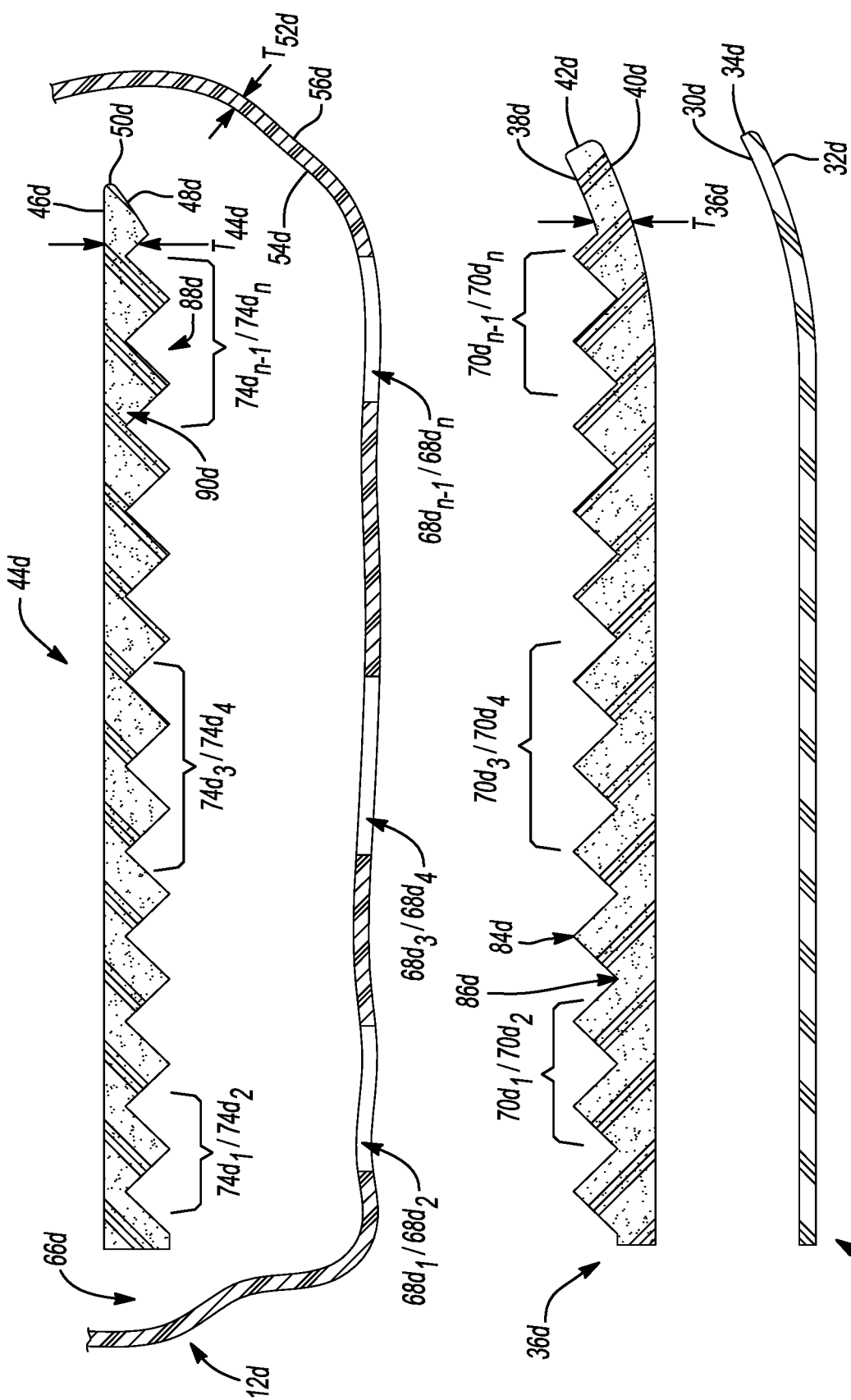
FIG. 46 is an exploded cross-sectional view of the article of footwear of FIG. 45.
Figure 47:
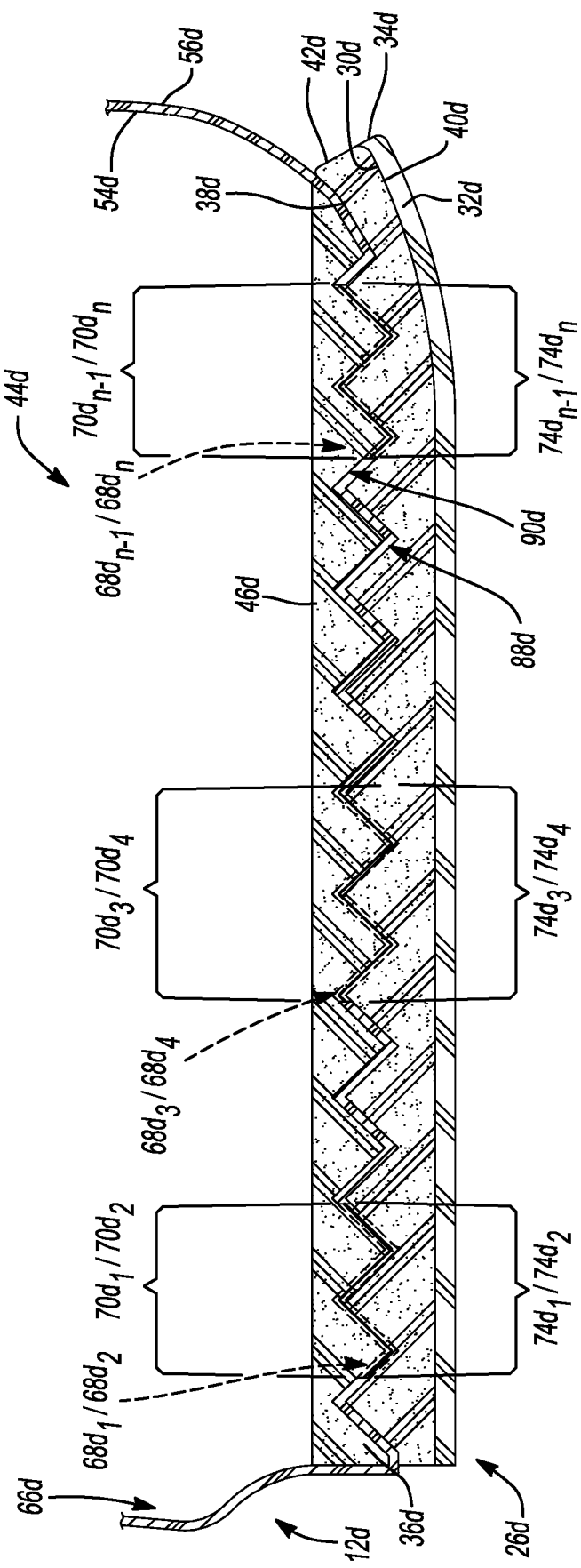
FIG. 47 is an assembled cross-sectional view of the article of footwear of FIG. 45.

As shown in FIGS. 39 and 41, the mold tool 92c is arranged in an open configuration by spacing apart the upper mold half $92c_U$ and the lower mold half $92c_L$ such that the first midsole portion 36c, the second midsole portion 44c and the sheet of material 52c are arranged therebetween. Then, as shown in FIGS. 40 and 42, after arranging the mold tool 92c in a closed configuration for a period of time, the mold tool 92c may be returned to the open configuration with the first midsole portion 36c bonded to the second midsole portion 44c and the sheet of material 52c secured therebetween.

Thereafter, as shown in FIG. 43, the midsole-contacting surface 30c of the outsole 26c may be disposed adjacent the bottom surface 40c of the first midsole portion 36c for joining the outsole 26c to the first midsole portion 36c. In an example, the outsole 26c may be joined to the first midsole portion 36c with an adhesive or by way of a molding tool in a substantially similar manner as described above.

With continued reference to FIGS. 43-44, the outer region 62c and the intermediate region 64c of the sheet of material 52c is folded upwardly such that the intermediate region 64c defined by the top surface 54c of the sheet of material 52c is disposed adjacent the sidewall surface 50c of the second midsole portion 44c. After the intermediate region 64c defined by the top surface 54c of the sheet of material 52c is disposed adjacent the sidewall surface 50c of the second midsole portion 44c, the outer region 62c of the sheet of material 52c forms the upper 12c. In an example, one or more of the outer region 62c and the intermediate region 64c of the sheet of material 12c may be stamped, slit, perforated, cut or otherwise formed to define a pattern P that defines the upper 12c. Although the mold tool 92c may be utilized for joining the first midsole portion 36c to the second midsole portion 44c under heat and pressure by way of the at least one passage 68c of the sheet of material 52c, as shown in FIG. 41, in some configurations, optional adhesive 78c, 80c may also or alternatively be utilized for adhering the first midsole portion 36c to the second midsole portion 44c. Although FIG. 41 illustrates the optional adhesive 78c, 80c in the form of a sheet having a shape that substantially corresponds to the shape of the central region 60c of the sheet of material 52c, the optional adhesive 78c, 80c may conform to any desirable shape, pattern or configuration, such as, for example, the shape, pattern or configuration of the of the at least one passage 68c of the sheet of material 52c.

In an example, one optional adhesive 78c may be arranged between the first midsole portion 36c and the second midsole portion 44c; furthermore, the one optional adhesive 78c may be arranged between the top surface 38c of the first midsole portion 36c and the bottom surface 56c of the sheet of material 52c such that the one optional adhesive 78c is axially aligned with and radially extends across at least a portion of the shape, pattern or configuration of the of the at least one passage 68c of the sheet of material 52c. The one optional adhesive 78c adhesively bonds the first midsole portion 36c, the second midsole portion 44c and the sheet of material 52c together.

In another example, one optional adhesive 80c may be arranged between the first midsole portion 36c and the second midsole portion 44c; furthermore, the one optional adhesive 80c may be arranged between the top surface 54c of the sheet of material 52c and the bottom surface 48c of the second midsole portion 44c such that the one optional adhesive 80c is axially aligned with and radially extends across at least a portion of the shape, pattern or configuration of the of the at least one passage 68c of the sheet of material 52c. The one optional adhesive 80c adhesively bonds the first midsole portion 36c, the second midsole portion 44c and the sheet of material 52c together.

In yet another example, a first optional adhesive 78c and a second optional adhesive 80c may be arranged between the first midsole portion 36c and the second midsole portion 44c. The first optional adhesive 78c may be arranged between the top surface 38c of the first midsole portion 36c and the bottom surface 56c of the sheet of material 52c such that the first optional adhesive 78c is axially aligned with and radially extends across at least a portion of the shape, pattern or configuration of the of the at least one passage 68c of the sheet of material 52c. The second optional adhesive 80c may be arranged between the top surface 54c of the sheet of material 52c and the bottom surface 48c of the second midsole portion 44c such that the second optional adhesive 80c is axially aligned with and radially extends across at least a portion of the shape, pattern or configuration of the of the at least one passage 68c of the sheet of material 52c. The first optional adhesive 78c and the second optional adhesive 80c adhesively bonds the first midsole portion 36c, the second midsole portion 44c and the sheet of material 52c together.

In other configurations, when the article of footwear 10c is formed, the following surfaces of the outsole 26c, the first midsole portion 36c, the second midsole portion 44c and the sheet of material 52c may be arranged near, proximate, spaced-apart-from or adjacent one another. In an example, the sheet of material 52c may extend from the sidewall surface 50c of the second midsole portion 44c at one of the medial side 22c and the lateral side 24c of the sole structure 14c. In another example, the sheet of material 52c may extend from the sidewall surface 50c of the second midsole portion 44c at both the medial side 22c and the lateral side 24c of the sole structure 14c. In yet another example, the sheet of material 52c extends from the sidewall surface 50c of the second midsole portion 44c around an entire perimeter of the sole structure 14c.

Although an exemplary implementation of the article of footwear 10c includes the outer region 62c of the sheet of material 52c forming the upper 12c, in other examples, the outer region 62c of the sheet of material 52c may form a first upper portion of the upper 12c, and, as such, at least a second upper portion may also contribute to forming the upper 12c. Accordingly, in another implementation, the outer region 62c of the sheet of material 52c may define a first upper portion and extend from the sidewall surface 50c of the second midsole portion 44c and at least partially cover a second upper portion (not shown) that further contributes to forming the upper 12c.

As described above, the intermediate region 64c of the sheet of material 52c may separate the central region 60c of the sheet of material 52c from the outer region 62c of the sheet of material 52c by the distance ($D_{64c}$). Furthermore, in an example, the outer region 62c of the sheet of material 52c may extend from top surface 46c of the second midsole portion 44c at a sufficient distance ($D_{62c}$) for forming at a foot covering portion of the upper 12c that terminates to define at least a portion of an ankle opening 82c (see, e.g., FIGS. 34, 38, 44) of the upper 12c. In one configuration, the central region 60c of the sheet of material 52c that is secured between the first midsole portion 36c and the second midsole portion 44c may be considered to be a portion of the midsole 28c. In other configurations, the central region 60c of the sheet of material 52c that is secured between the first midsole portion 36c and the second midsole portion 44c may be considered to be a portion of the sheet of material 52c that contributes to the formation of the midsole 28c, and the intermediate region 64c of the sheet of material 52c that: (1) extends beyond the sidewall surface 42c of the first midsole portion 36c and the sidewall surface 50c of the second midsole portion 44c and (2) is disposed adjacent the sidewall surface 50c of the second midsole portion 44c may both be considered to be another portion of the sheet of material 52c that contributes to the formation of the midsole 28c. However, in another configuration, the intermediate region 64c of the sheet of material 52c that: (1) extends beyond the sidewall surface 42c of the first midsole portion 36c and the sidewall surface 50c of the second midsole portion 44c and (2) is disposed adjacent the sidewall surface 50c of the second midsole portion 44c may be considered to be a first portion of the upper 12c, and, the outer region 62c of the sheet of material 52c that extends from top surface 46c of the second midsole portion 44c at the distance ($D_{62c}$) may define a second portion of the upper 12c. Therefore, the intermediate region 64c of the sheet of material 52c may contribute to the formation of one or both of the upper and the midsole 28c.

As described above, each of the first midsole portion 36c and the second midsole portion 44c is not flat and may, respectively, be interrupted by one or more peaks 84c, 88c and recesses, trenches or valleys 86c, 90c such that each of the first midsole portion 36c and the second midsole portion 44c defines a substantially sinusoidal pattern extending between the forefoot region 16c and the heel region 20c of the sole structure 14c. The one or more peaks 84c, 88c may define a series of peaks, and, the recesses, trenches or valleys 86c, 90c may define a series of recesses, trenches or valleys.

Furthermore, the respective sinusoidal patterns of each of the first midsole portion 36c and the second midsole portion 44c may be matingly shaped such that the first midsole portion 36c correspondingly mates with the second midsole portion 44c. Accordingly, in an implementation, the one or more peaks 84c of the first midsole portion 36c may oppose and be matingly-received by the recesses, trenches or valleys 90c of the second midsole portion 44c, and, the one or more peaks 88c of the second midsole portion 44c may oppose and be matingly-received by the recesses, trenches or valleys 86c of the first midsole portion 36c.

In some configurations, prior to the central region 60c of the sheet of material 52c being secured between the first midsole portion 36c and the second midsole portion 44c, the central region 60c of sheet of material 52c may be defined by a substantially flat, non-sinusoidal pattern. However, after the central region 60c of the sheet of material 52c is secured between the first midsole portion 36c and the second midsole portion 44c, the central region 60c of the sheet of material 52c may be shaped (by the sinusoidal pattern of each of the first midsole portion 36c and the second midsole portion 44c) to define a sinusoidal pattern that conforms to a mated configuration of the sinusoidal pattern of each of the first midsole portion 36c and the second midsole portion 44c. In an example, the sinusoidal pattern of the central region 60c of the sheet of material 52c may extend between a forefoot region 16c and a heel region 20c of the sole structure 14c. Furthermore, the sinusoidal pattern formed by the central region 60c of the sheet of material 52c includes one or more peaks (that is/are formed by the one or more recesses, trenches or valleys 86c of the first midsole portion 36c and the one or more recesses, trenches or valleys 90c of the second midsole portion 44c) and one or more valleys (that is/are formed by the one or more peaks 84c of the first midsole portion 36c and the one or more peaks 88c of the second midsole portion 44c) extending between a forefoot region 16c and a heel region 20c of the sole structure 14c.

Although some configurations may include the central region 60c of sheet of material 52c being defined by a substantially flat, non-sinusoidal pattern that is subsequently shaped to define a sinusoidal pattern after the central region 60c of the sheet of material 52c is secured between the first midsole portion 36c and the second midsole portion 44c as described above, other configurations may include the central region 60c of sheet of material 52c being preformed to define a sinusoidal pattern that corresponds to a mated configuration of the sinusoidal pattern of each of the first midsole portion 36c and the second midsole portion 44c. In an example, the preformed sinusoidal pattern of the central region 60c of the sheet of material 52c may extend between a forefoot region 16c and a heel region 20c of the sole structure 14c. Furthermore, the preformed sinusoidal pattern of the central region 60c of the sheet of material 52c includes one or more preformed peaks (that is aligned with and corresponds to the one or more recesses, trenches or valleys 86c of the first midsole portion 36c and the one or more recesses, trenches or valleys 90c of the second midsole portion 44c) and one or more preformed valleys (that is aligned with and corresponds to the one or more peaks 84c of the first midsole portion 36c and the one or more peaks 88c of the second midsole portion 44c) extending between a forefoot region 16c and a heel region 20c of the sole structure 14c.

With reference to FIGS. 45-49, an exemplary article of footwear 10d is provided and includes an upper 12d and a sole structure 14d attached to the upper 12d. The article of footwear 10d may be divided into one or more regions. The regions may include a forefoot region 16d, a midfoot region 18d, and a heel region 20d. The forefoot region 16d may correspond with toes and joints connecting metatarsal bones with phalanx bones of a foot. The midfoot region 18d may correspond with an arch area of the foot while the heel region 18d may correspond with rear portions of the foot, including a calcaneus bone. The article of footwear 10d may additionally include a medial side 22d and a lateral side 24d that correspond with opposite sides of the article of footwear 10d and extend through the regions 16d, 18d, 20d.

The sole structure 14d includes a midsole 28d and optionally includes an outsole 26d. A cushioning arrangement (not shown) may optionally be disposed generally between the outsole 26d and the midsole 28d.

Figure 48:
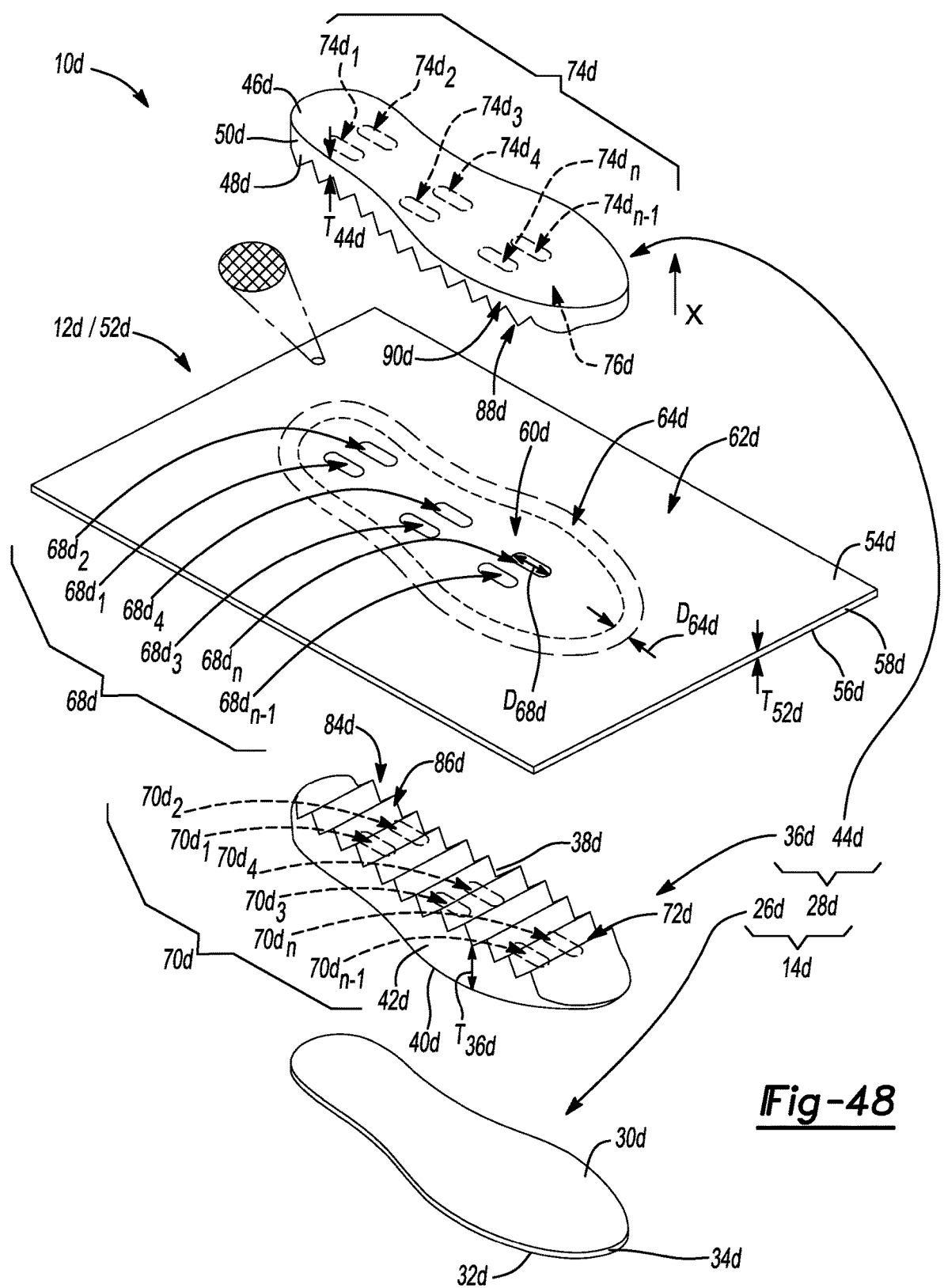
FIG. 48 is an exploded perspective view of the article of footwear of FIG. 45 illustrating a component of the article of footwear that contributes to formation of an upper arranged in a substantially flat orientation.

Referring to FIG. 48, the outsole 26d includes a midsole-contacting surface 30d and a ground-contacting surface 32d. The outsole 26d further includes a sidewall surface 34d extending between the midsole-contacting surface 30d and the ground-contacting surface 32d.

The midsole 28d includes a first midsole portion 36d and a second midsole portion 44d. The first midsole portion 36d includes a top surface 38d, a bottom surface 40d and a sidewall surface 42d extending between the top surface 38d and the bottom surface 40d. The sidewall surface 42d may define a thickness ($T_{36d}$) of the first midsole portion 36d extending between the top surface 38d and the bottom surface 40d.

The top surface 38d and the bottom surface 40d of the first midsole portion 36d may generally define an outer surface profile of the first midsole portion 36d. In an example, the top surface 38d of the first midsole portion 36d is not flat and may be interrupted by one or more peaks 84d and recesses, trenches or valleys 86d such that the first midsole portion 36d defines a substantially saw tooth pattern extending between the forefoot region 16d and the heel region 20d of the sole structure 14d. Furthermore, in an example, the saw tooth pattern of the first midsole portion 36d may be defined by a substantially constant amplitude A (see, e.g., FIG. 52) such that the thickness ($T_{36d}$) of the first midsole portion 36d (that is bound by each peak 84d of the top surface 38d and each peak 84d of the bottom surface 40d) is substantially the same across a length ($L_{14d}$) of the sole structure 14d. Further, the amplitude A defined by each peak 84d remains substantially the same as each peak 84d extends between the medial side 22d and the lateral side 24d of the sole structure 14d. Yet even further, in an example, the saw tooth pattern of the first midsole portion 36d may be defined by a substantially constant frequency as the saw tooth pattern extends between the forefoot region 16d and the heel region 20d of the sole structure 14d.

The second midsole portion 44d includes a top surface 46d, a bottom surface 48d and a sidewall surface 50d extending between the top surface 46d and the bottom surface 48d. The sidewall surface 50d may define a thickness ($T_{44d}$) of the second midsole portion 44d extending between the top surface 46d and the bottom surface 48d.

The top surface 46d and the bottom surface 48d of the second midsole portion 44d may generally define an outer surface profile of the second midsole portion 44d. In an example, the bottom surface 48d of the second midsole portion 44d is not flat and may be interrupted by one or more peaks 88d and recesses, trenches or valleys 90d such that the second midsole portion 44d defines a substantially saw tooth pattern extending between the forefoot region 16d and the heel region 20d of the sole structure 14d. Furthermore, in an example, the saw tooth pattern of the second midsole portion 44d may be defined by a substantially constant amplitude A (see, e.g., FIG. 52) such that the thickness ($T_{44d}$) of the second midsole portion 44d (that is bound by each peak 88d of the top surface 46d and each peak 90d of the bottom surface 48d) is substantially the same across a length ($L_{14d}$) of the sole structure 14d. Further, the amplitude A defined by each peak 88d remains substantially the same as each peak 88d extends between the medial side 22d and the lateral side 24d of the sole structure 14d. Yet even further, in an example, the saw tooth pattern of the second midsole portion 44d may be defined by a substantially constant frequency as the saw tooth pattern extends between the forefoot region 16d and the heel region 20d of the sole structure 14d.

In some examples, at least one of the first midsole portion 36d and the second midsole portion 44d are formed from a foamed material. In some instances, one or both of the first midsole portion 36d and the second midsole portion 44d are formed from a polymeric material. In another example, the first midsole portion 36d and the second midsole portion 44d are formed from the same material. In yet another example, the first midsole portion 36d and the second midsole portion 44d are formed from different materials. In a further example, the first midsole portion 36d is formed from a first material and the second midsole portion 44d is formed from a second material. In yet a further example, the first material forming the first midsole portion 36d has substantially the same stiffness as the second material forming the second midsole portion 44d. In some instances, the first material forming the first midsole portion 36d has a different stiffness than the second material forming the second midsole portion 44d. In other examples, the first material forming the first midsole portion 36d is the same as the second material forming the second midsole portion 44d. In yet another examples, the first material forming the first midsole portion 36d is different than the second material forming the second midsole portion 44d.

As shown in FIG. 48, the article of footwear 10d further includes a sheet of material 52d. The sheet of material 52d includes a top surface 54d, a bottom surface 56d and a sidewall surface 58d extending between the top surface 54d and the bottom surface 56d. The sidewall surface 58d may define a thickness ($T_{52d}$) of the sheet of material 52d extending between the top surface 54d and the bottom surface 56d.

In an example, the sheet of material 52d is formed from a flexible material. The sheet of material 52d may include a fabric material, a woven textile (see, e.g., enlarged view of the sheet of material 52d in FIG. 48), or a knitted textile (see, e.g., enlarged view of the sheet of material 52d in FIG. 48). In some instances, the sheet of material 52d is porous. The sheet of material 52d may be formed from a polymeric material such as, for example, a thermoplastic polymeric material. An exemplary thermoplastic polymeric material may include, for example, a thermoset polymeric material or the like. In some examples, the sheet of material 52d may be a thermoformable material. In some examples, if the sheet of material 52d is a woven or knit structure (as seen in, e.g., the enlarged view of FIG. 48), the woven or knit structure may be formed from a polyester yarn. Furthermore, in other examples, if the sheet of material 52d is a woven or knit structure (as seen in, e.g., the enlarged view of FIG. 48), each passage or aperture formed by overlapping members defining the woven or knit structure of the sheet of material 52d may be at least 0.5 mm in length in a largest dimension or at least 1.0 mm in length in a largest dimension. Furthermore, each passage or aperture formed by overlapping members defining the woven or knit structure of the sheet of material 52d may permit one or both of the first midsole portion 36d and the second midsole portion 44d to directly contact one another. In other implementations, one or both of the first midsole portion 36d and the second midsole portion 44d may be injection molded around or through each passage or aperture formed by overlapping members defining the woven or knit structure of the sheet of material 52d.

In some instances, the sheet of material 52d is an embroidered textile. In some examples, the sheet of material 52d has one or more first regions including embroidery and one or more second regions without embroidery or with a lower percentage of embroidered surface area as comparted to the one or more first regions. The embroidery can provide reduced stretch or a "lock down" feature to areas of the sheet of material 52d. Such areas of the sheet of material 52d providing a reduced stretch quality may be located, for example, at a region of the sheet of material 52d that is arranged between the first midsole portion 36d and the second midsole portion 44d, or, alternatively at a region that extends beyond the sidewall surface 58d of the sheet of material 52d.

The sheet of material 52d may be further defined by a plurality of regions 60d, 62d, 64d. Each of the top surface 54d and the bottom surface 56d extends across the plurality of regions 60d, 62d, 64d. The plurality of regions 60d, 62d, 64d may be defined by a central region 60d, an outer region 62d and an intermediate region 64d extending between the central region 60d and the outer region 62d. The intermediate region 64d may separate the central region 60d from the outer region 62d by a distance ($D_{64d}$).

The central region 60d of the sheet of material 52d may be defined by a shape that generally corresponds to a shape defining the top surface 46d of the second midsole portion 44d. The distance ($D_{64d}$) that separates the central region 60d from the outer region 62d may be approximately equal to the thickness ($T_{44d}$) of the second midsole portion 44d.

Figure 55:
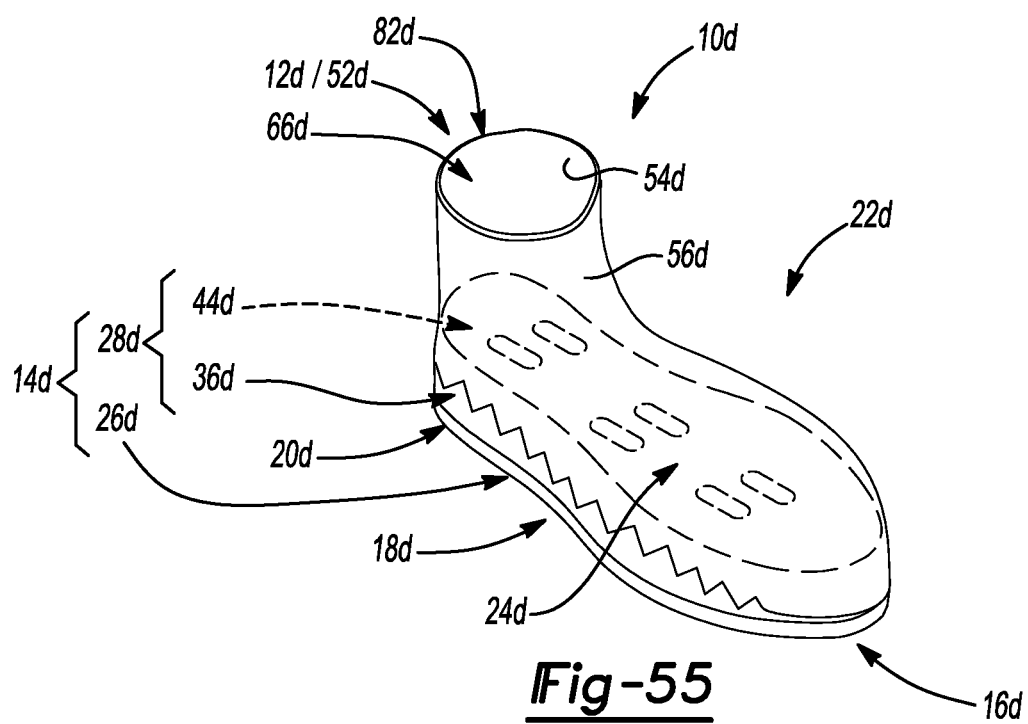
FIG. 55 is an assembled view of the article of footwear of FIG. 54.

With reference to FIG. 48, the first midsole portion 36d is disposed between the outsole 26d and the upper 12d. As shown in FIGS. 48 and 55, the second midsole portion 44d is disposed between the first midsole portion 36d and the upper 12d. The sheet of material 52d is disposed between the first midsole portion 36d and the second midsole portion 44d. The bottom surface 56d of the sheet of material 52d extends across the top surface 38d of the first midsole portion 36d and beyond the sidewall surface 42d of the first midsole portion 36d. The top surface 54d of the sheet of material 52d extends across the bottom surface 48d of the second midsole portion 44d and beyond the sidewall surface 50d of the second midsole portion 44d. With reference to FIGS. 48 and 55, when forming the article of footwear 10d, the top surface 54d of the sheet of material 52d extends at least partially over the sidewall surface 50d of the second midsole portion 44d in a direction (X), as shown in FIG. 48, toward the top surface 46d of the second midsole portion 44d.

Figure 49:
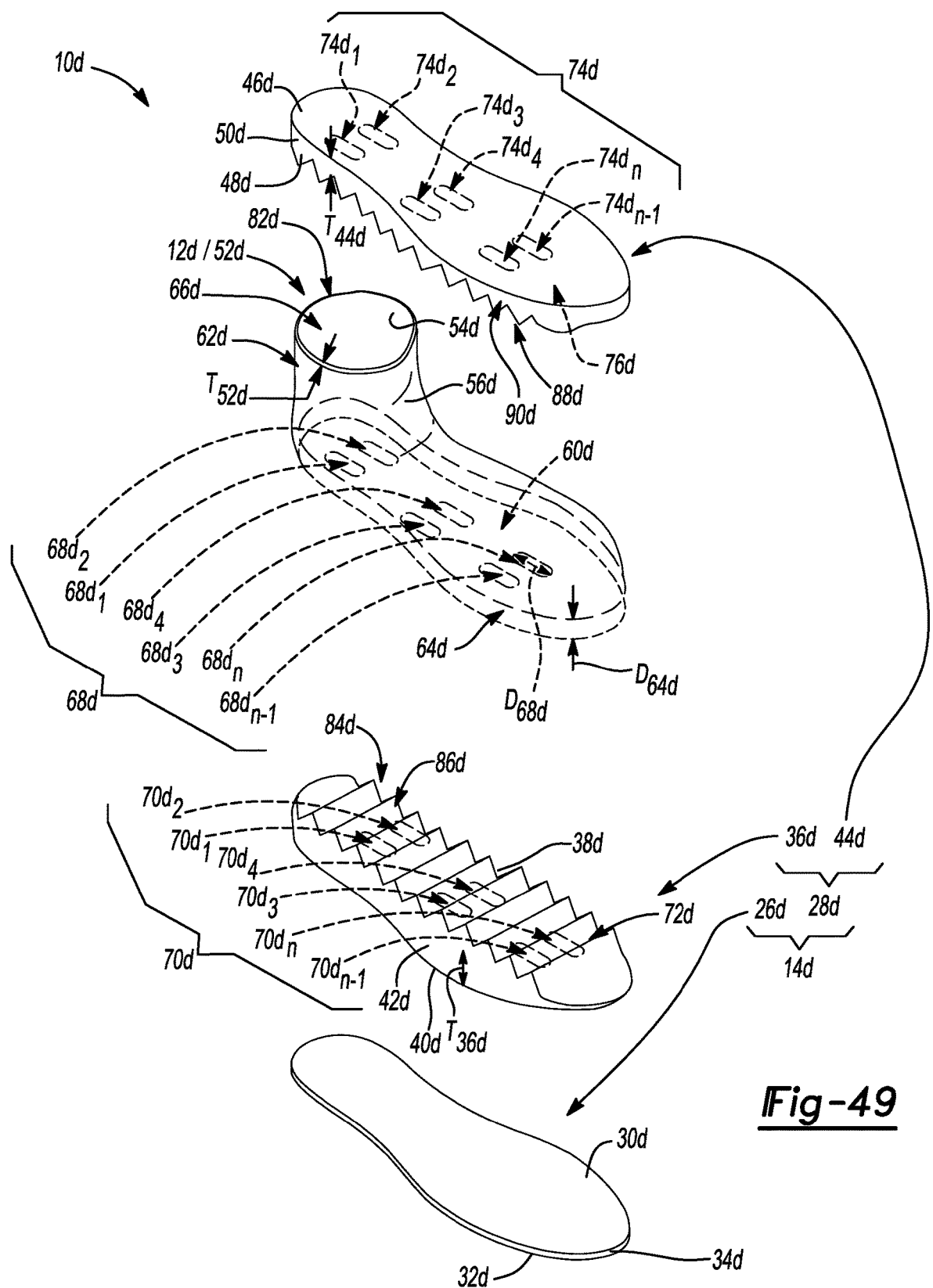
FIG. 49 is an exploded perspective view of the article of footwear of FIG. 12 illustrating a component of the article of footwear that contributes to formation of an upper arranged in a non-flat orientation defining at least a portion of a foot-receiving cavity.

With reference to FIGS. 48 and 49, the outer region 62d of the sheet of material 52d is sized for defining the upper 12d of the article of footwear 10d. As shown in FIG. 49, upon the outer region 62d of the sheet of material 52d forming the upper 12d, the top surface 46d of the second midsole portion 44d and the top surface 54d of the sheet of material 52d defined by the outer region 62d of the sheet of material 52d generally forms a cavity 66d that is sized for receiving a foot (not shown) of a user.

As shown in FIG. 48, at least the central region 60d of the sheet of material 52d may further define at least one passage or aperture 68d or absence of the sheet of material 52d. The at least one passage 68d extends through the thickness ($T_{52d}$)

of the sheet of material 52d between the top surface 54d and the bottom surface 56d. In an example, the at least one passage 68d is formed in the central region 60d of the sheet of material 52d and not the outer region 62d or the intermediate region 64d of the sheet of material 52d. Although an implementation of the sheet of material 52d may include the at least one passage 68d exclusively formed by the central region 60d of the sheet of material 52d, other implementations of the sheet of material 52d may include the at least one passage 68d formed by two or more of the central region 60d, the outer region 62d and the intermediate region 64d of the sheet of material 52d. If a polymeric material defines one or both of the first midsole portion 36d and the second midsole portion 44d, the polymeric material may be molded around any surface defining the sheet of material 52d and/or through at least one passage 68d that extends through the thickness ($T_{52d}$) of the sheet of material 52d.

The at least one passage 68d may be defined by a plurality of passages or apertures $68d_1$-$68d_n$ having, for example: a first passage $68d_1$, a last passage $68d_n$ and one or more intermediate passages $68d_2$-$68d_{n-1}$. In an example, as shown in FIG. 48, the plurality of passages $68d_1$-$68d_n$ may be arranged in any desirable pattern (e.g., in: (1) a row-and-column grid, (2) staggered rows and columns, or (3) a random pattern) extending across the central region 60d of the sheet of material 52d between the forefoot region 16d and the heel region 20d of the sole structure 14d (i.e., across substantially most or all of the length ($L_{14d}$) of the sole structure 14d) and between the medial side 22d and the lateral side 24d of the article of footwear 10d (i.e., across the width ($W_{14d}$) of the sole structure 14d). In other implementations, the plurality of passages $68d_1$-$68d_n$ may be arranged in a pattern (e.g., in: (1) a row-and-column grid, (2) staggered rows and columns, or (3) a random pattern) that does not extend across the central region 60d of the sheet of material 52d between the forefoot region 16d and the heel region 20d of the sole structure 14d and between the medial side 22d and the lateral side 24d of the article of footwear 10d. Although the plurality of passages $68d_1$-$68d_n$ may extend across substantially most or all of the length ($L_{14d}$) of the sole structure 14d as described above, the plurality of passages $68d_1$-$68d_n$ may be arranged in a pattern (e.g., in: (1) a row-and-column grid, (2) staggered rows and columns, or (3) a random pattern) extending across: (1) some or all of the heel region 20d of the sole structure 14d but not the forefoot region 16d or the midfoot region 18d of the sole structure 14d, (2) some or all of the forefoot region 16d of the sole structure 14d but not the midfoot region 18d or the heel region 20d of the sole structure 14d or (3) some or all of the forefoot region 16d and the heel region 20d of the sole structure 14d but not the midfoot region 18d of the sole structure 14d.

With continued reference to FIG. 48, each passage of the plurality of passages $68d_1$-$68d_n$ is shown being defined by a substantially oval or circular shape having any dimension or diameter ($D_{68d}$). In some examples, the dimension or diameter ($D_{68d}$) may be approximately equal to about 0.5 mm or about 3.0 mm. In other examples, the dimension or diameter ($D_{68d}$) may be between approximately 0.5 mm and approximately 3.0 mm. Furthermore, each passage of the plurality of passages $68d_1$-$68d_n$ may be defined by a substantially similar dimension or diameter ($D_{68d}$). Although each passage of the plurality of passages $68d_1$-$68d_n$ may be defined by a substantially similar dimension or diameter ($D_{68d}$), implementations of the sheet of material 52d may include at least one passage of the plurality of passages $68d_1$-$68d_n$ having a different sized or shaped dimension or diameter ($D_{68d}$). For example, at least one passage of the plurality of passages $68d_1$-$68d_n$ may have a different sized or shaped dimension or diameter ($D_{68d}$) than another passage of the plurality of passages $68d_1$-$68d_n$ in the: (1) the heel region 20d of the sole structure 14d, (2) the forefoot region 16d of the sole structure 14d or (3) the forefoot region 16d and the heel region 20d of the sole structure 14d.

The top surface 38d of the first midsole portion 36d may be further defined by at least one second midsole contacting region 70d and at least one sheet of material contacting region 72d. The bottom surface 48d of the second midsole portion 44d may be further defined by at least one first midsole contacting region 74d and at least one sheet of material contacting region 76d.

Each of the at least one second midsole contacting region 70d of the first midsole portion 36d and the at least one first midsole contacting region 74d of the second midsole portion 44d may be defined by a shape that generally corresponds to a shape defined by the at least one passage 68d formed by the central region 60d of the sheet of material 52d. If the at least one passage 68d formed by the central region 60d of the sheet of material 52d is defined by plurality of passages $68d_1$-$68d_n$, each of the at least one second midsole contacting region 70d of the first midsole portion 36d and the at least one first midsole contacting region 74d of the second midsole portion 44d may be defined by a corresponding plurality of second midsole contacting regions $70d_1$-$70d_n$ and a plurality of first midsole contacting regions $74d_1$-$74d_n$. Furthermore, as shown in FIG. 48, each passage and contacting region of the plurality of passages $68d_1$-$68d_n$ and the plurality of second midsole contacting regions $70d_1$-$70d_n$ and the plurality of first midsole contacting regions $74d_1$-$74d_n$ is respectively axially aligned with one another.

In an example, when the article of footwear 10d is formed, the following surfaces of the outsole 26d, the first midsole portion 36d, the second midsole portion 44d and the sheet of material 52d may be arranged near, proximate, spaced-apart-from or adjacent one another. The at least one sheet of material contacting region 72d of the top surface 38d of the first midsole portion 36d may be disposed adjacent the bottom surface 56d of the sheet of material 52d. The at least one sheet of material contacting region 76d of the bottom surface 48d of the second midsole portion 44d may be disposed adjacent the top surface 54d of the sheet of material 52d defined by the central region 60d of the sheet of material 52d.

Once the sheet of material 52d is arranged relative the first midsole portion 36d and the second midsole portion 44d as described above, the sheet of material 52d may be said to be arranged between the first midsole portion 36d and the second midsole portion 44d. Even though the sheet of material 52d may be disposed between the first midsole portion 36d and the second midsole portion 44d, one or more portions of the first midsole portion 36d may be in direct contact with one or more portions of the second midsole portion 44d as a result of the formation of the at least one passage 68d of the sheet of material 52d such that at least one second midsole contacting region 70d of the top surface 38d of the first midsole portion 36d may be disposed adjacent the at least one first midsole contacting region 74d of the bottom surface 48d of the second midsole portion 44d. After arranging the at least one second midsole contacting region 70d of the top surface 38d of the first midsole portion 36d adjacent the at least one first midsole contacting region 74d of the bottom surface 48d of the second midsole portion 44d, the sheet of material 52d and the midsole 28d defined by the first midsole portion 36d and the second midsole portion 44*d* may be arranged in a molding tool 92*d* (see, e.g., FIGS. 50-53) for directly bonding the first midsole portion 36*d* to the second midsole portion 44*d* at the at least one second midsole contacting region 70*d* and the at least one first midsole contacting region 74*d*.

The mold tool 92*d* includes an upper mold half 92*d*$_U$ and a lower mold half 92*d*$_L$. Each of the upper mold half 92*d*$_U$ and the lower mold half 92*d*$_L$ may be define a mold surface that corresponds to the shape of the central region 60*d* of the sheet of material 52*d* for bonding the first midsole portion 36*d* to the second midsole portion 44*d* under heat and pressure.

Figure 50:
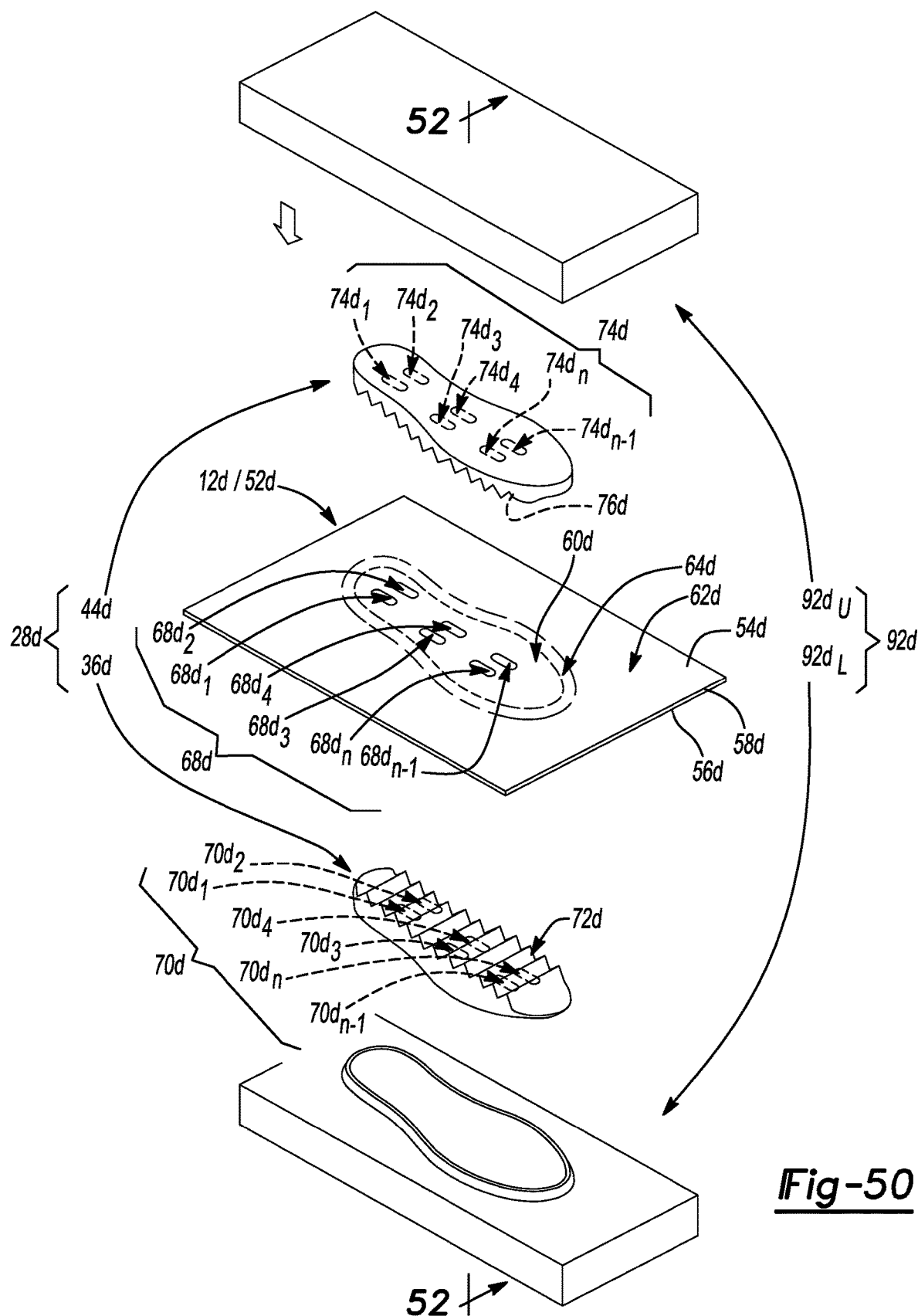
FIG. 50 is a perspective view of an exemplary mold tool and a portion of the article of footwear corresponding to FIG. 48.
Figure 51:
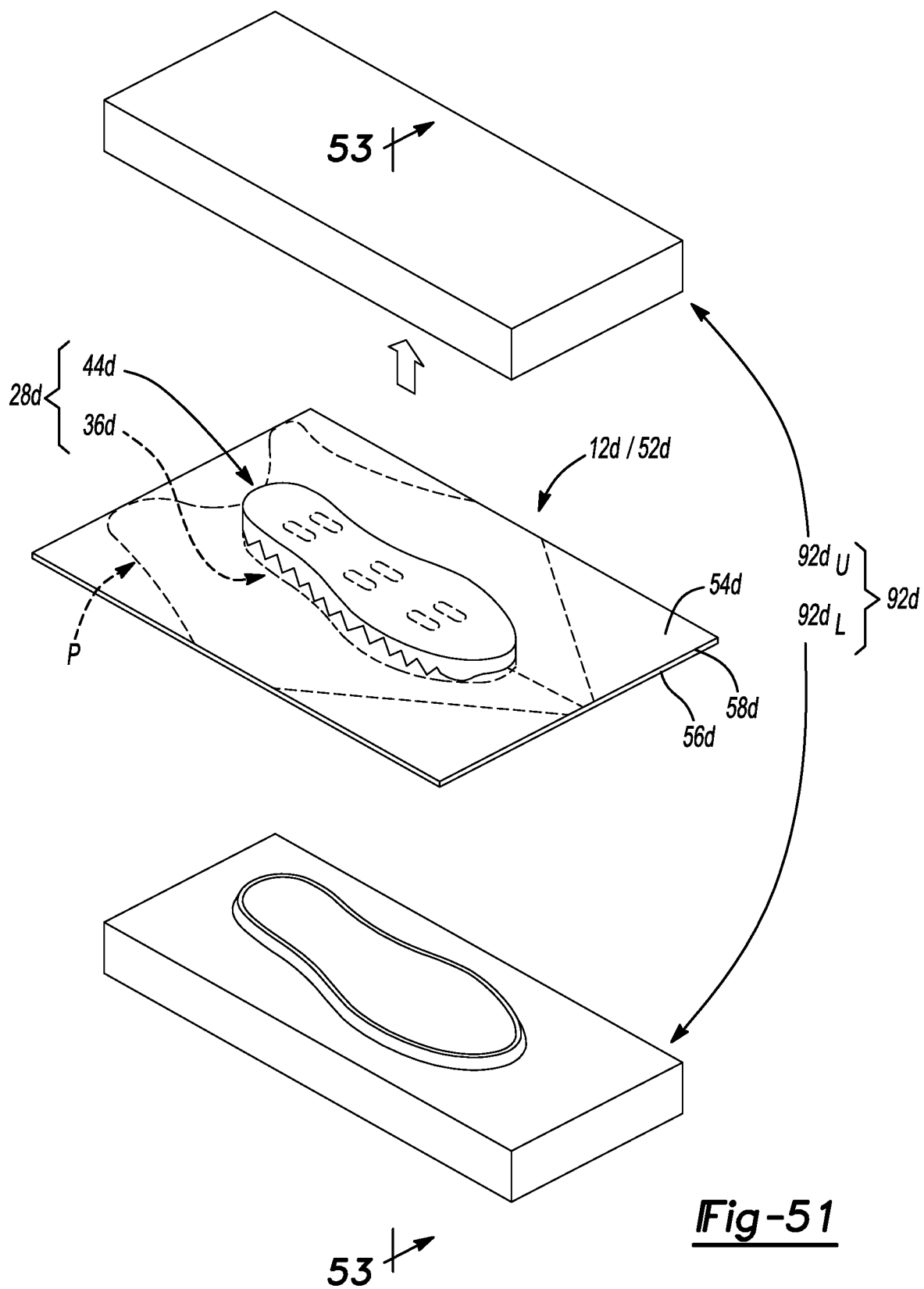
FIG. 51 is a further perspective view of the mold tool and the portion of the article of footwear of FIG. 50 arranged in a further partially assembled state.
Figure 52:
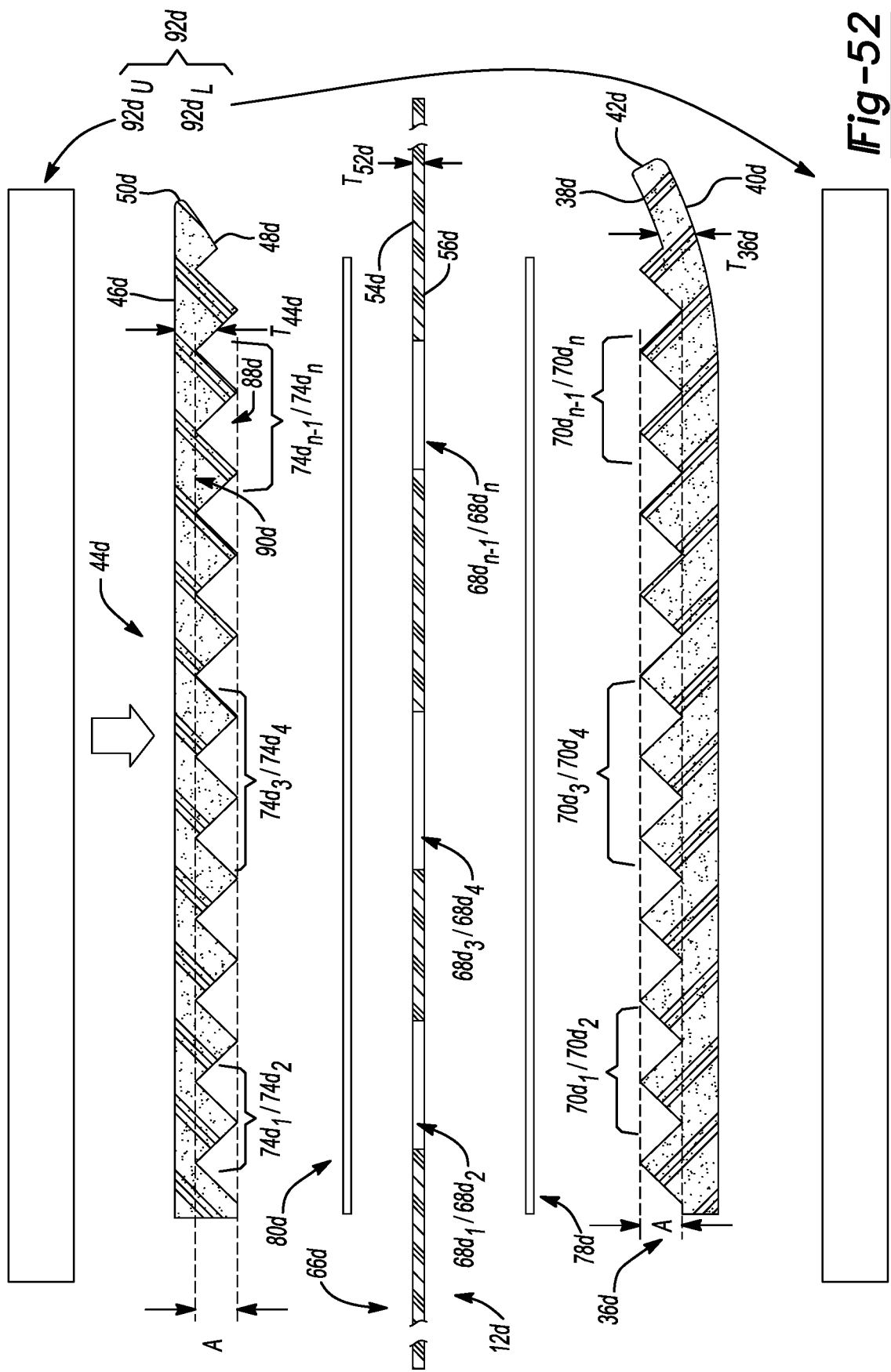
FIG. 52 is a cross-sectional view of the mold tool and the portion of the article of footwear taken along Line 52-52 of FIG. 50.
Figure 53:
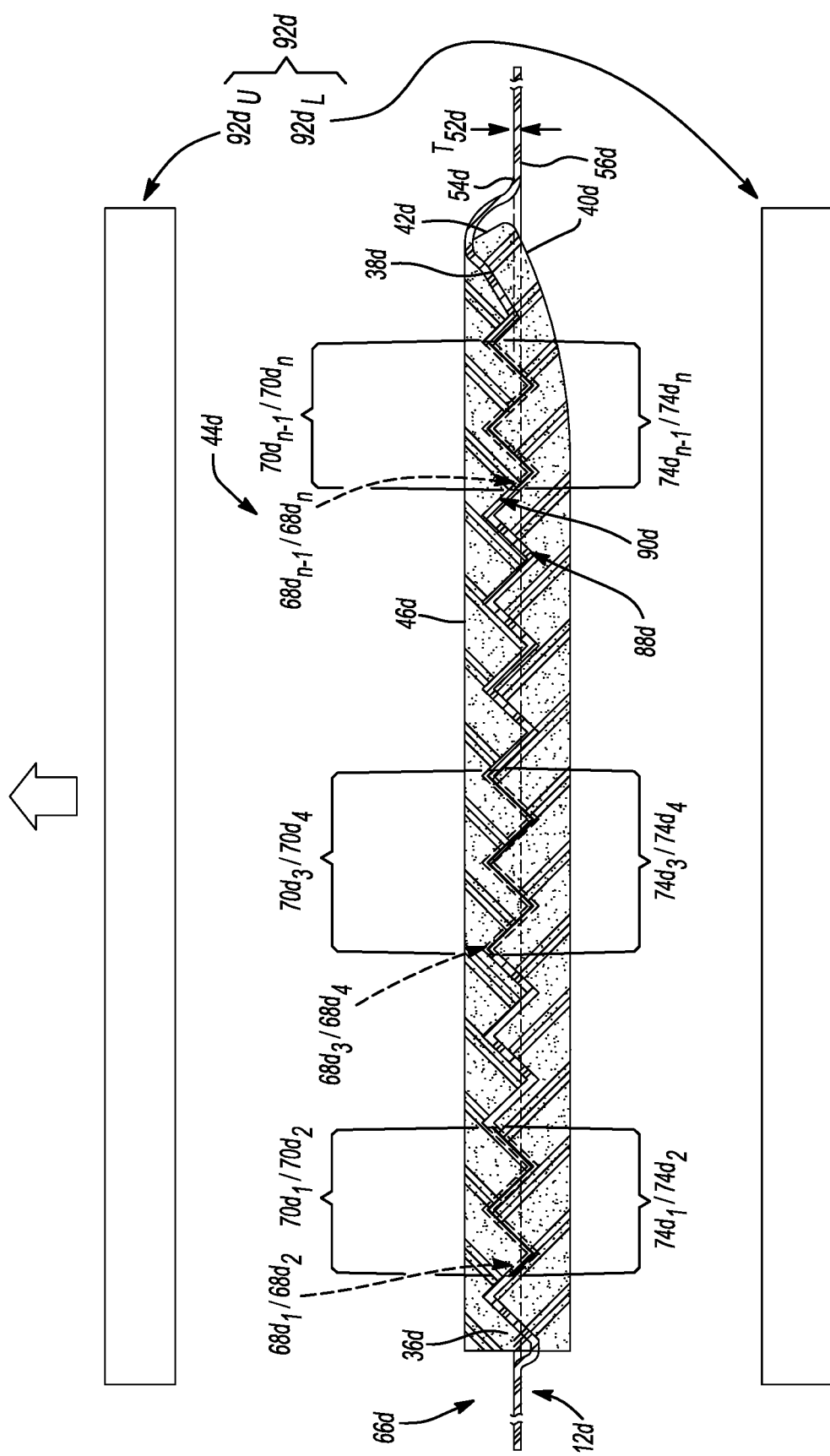
FIG. 53 is a cross-sectional view of the mold tool and the portion of the article of footwear taken along Line 53-53 of FIG. 51.

As shown in FIGS. 50 and 52, the mold tool 92*d* is arranged in an open configuration by spacing apart the upper mold half 92*d*$_U$ and the lower mold half 92*d*$_L$ such that the first midsole portion 36*d*, the second midsole portion 44*d* and the sheet of material 52*d* are arranged therebetween. Then, as shown in FIGS. 51 and 53, after arranging the mold tool 92*d* in a closed configuration for a period of time, the mold tool 92*d* may be returned to the open configuration with the first midsole portion 36*d* bonded to the second midsole portion 44*d* and the sheet of material 52*d* secured therebetween.

Figure 54:
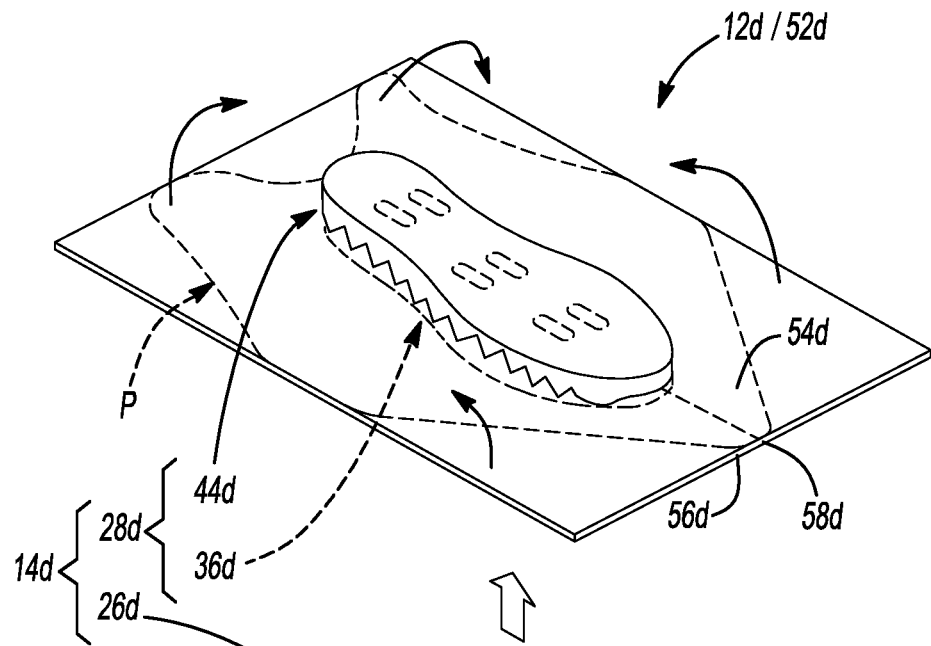
FIG. 54 is an exploded perspective view of the portion of the article of footwear of FIG. 51 and an outsole.

Thereafter, as shown in FIG. 54, the midsole-contacting surface 30*d* of the outsole 26*d* may be disposed adjacent the bottom surface 40*d* of the first midsole portion 36*d* for joining the outsole 26*d* to the first midsole portion 36*d*. In an example, the outsole 26*d* may be joined to the first midsole portion 36*d* with an adhesive or by way of a molding tool in a substantially similar manner as described above.

With continued reference to FIGS. 54-55, the outer region 62*d* and the intermediate region 64*d* of the sheet of material 52*d* is folded upwardly such that the intermediate region 64*d* defined by the top surface 54*d* of the sheet of material 52*d* is disposed adjacent the sidewall surface 50*d* of the second midsole portion 44*d*. After the intermediate region 64*d* defined by the top surface 54*d* of the sheet of material 52*d* is disposed adjacent the sidewall surface 50*d* of the second midsole portion 44*d*, the outer region 62*d* of the sheet of material 52*d* forms the upper 12*d*. In an example, one or more of the outer region 62*d* and the intermediate region 64*d* of the sheet of material 12*d* may be stamped, slit, perforated, cut or otherwise formed to define a pattern P that defines the upper 12*d*.

Although the mold tool 92*d* may be utilized for joining the first midsole portion 36*d* to the second midsole portion 44*d* under heat and pressure by way of the at least one passage 68*d* of the sheet of material 52*d*, as shown in FIG. 52, in some configurations, optional adhesive 78*d*, 80*d* may also or alternatively be utilized for adhering the first midsole portion 36*d* to the second midsole portion 44*d*. Although FIG. 52 illustrates the optional adhesive 78*d*, 80*d* in the form of a sheet having a shape that substantially corresponds to the shape of the central region 60*d* of the sheet of material 52*d*, the optional adhesive 78*d*, 80*d* may conform to any desirable shape, pattern or configuration, such as, for example, the shape, pattern or configuration of the of the at least one passage 68*d* of the sheet of material 52*d*.

In an example, one optional adhesive 78*d* may be arranged between the first midsole portion 36*d* and the second midsole portion 44*d*; furthermore, the one optional adhesive 78*d* may be arranged between the top surface 38*d* of the first midsole portion 36*d* and the bottom surface 56*d* of the sheet of material 52*d* such that the one optional adhesive 78*d* is axially aligned with and radially extends across at least a portion of the shape, pattern or configuration of the of the at least one passage 68*d* of the sheet of material 52*d*. The one optional adhesive 78*d* adhesively bonds the first midsole portion 36*d*, the second midsole portion 44*d* and the sheet of material 52*d* together.

In another example, one optional adhesive 80*d* may be arranged between the first midsole portion 36*d* and the second midsole portion 44*d*; furthermore, the one optional adhesive 80*d* may be arranged between the top surface 54*d* of the sheet of material 52*d* and the bottom surface 48*d* of the second midsole portion 44*d* such that the one optional adhesive 80*d* is axially aligned with and radially extends across at least a portion of the shape, pattern or configuration of the of the at least one passage 68*d* of the sheet of material 52*d*. The one optional adhesive 80*d* adhesively bonds the first midsole portion 36*d*, the second midsole portion 44*d* and the sheet of material 52*d* together.

In yet another example, a first optional adhesive 78*d* and a second optional adhesive 80*d* may be arranged between the first midsole portion 36*d* and the second midsole portion 44*d*. The first optional adhesive 78*d* may be arranged between the top surface 38*d* of the first midsole portion 36*d* and the bottom surface 56*d* of the sheet of material 52*d* such that the first optional adhesive 78*d* is axially aligned with and radially extends across at least a portion of the shape, pattern or configuration of the of the at least one passage 68*d* of the sheet of material 52*d*. The second optional adhesive 80*d* may be arranged between the top surface 54*d* of the sheet of material 52*d* and the bottom surface 48*d* of the second midsole portion 44*d* such that the second optional adhesive 80*d* is axially aligned with and radially extends across at least a portion of the shape, pattern or configuration of the of the at least one passage 68*d* of the sheet of material 52*d*. The first optional adhesive 78*d* and the second optional adhesive 80*d* adhesively bonds the first midsole portion 36*d*, the second midsole portion 44*d* and the sheet of material 52*d* together.

In other configurations, when the article of footwear 10*d* is formed, the following surfaces of the outsole 26*d*, the first midsole portion 36*d*, the second midsole portion 44*d* and the sheet of material 52*d* may be arranged near, proximate, spaced-apart-from or adjacent one another. In an example, the sheet of material 52*d* may extend from the sidewall surface 50*d* of the second midsole portion 44*d* at one of the medial side 22*d* and the lateral side 24*d* of the sole structure 14*d*. In another example, the sheet of material 52*d* may extend from the sidewall surface 50*d* of the second midsole portion 44*d* at both the medial side 22*d* and the lateral side 24*d* of the sole structure 14*d*. In yet another example, the sheet of material 52*d* extends from the sidewall surface 50*d* of the second midsole portion 44*d* around an entire perimeter of the sole structure 14*d*.

Although an exemplary implementation of the article of footwear 10*d* includes the outer region 62*d* of the sheet of material 52*d* forming the upper 12*d*, in other examples, the outer region 62*d* of the sheet of material 52*d* may form a first upper portion of the upper 12*d*, and, as such, at least a second upper portion may also contribute to forming the upper 12*d*. Accordingly, in another implementation, the outer region 62*d* of the sheet of material 52*d* may define a first upper portion and extend from the sidewall surface 50*d* of the second midsole portion 44*d* and at least partially cover a second upper portion (not shown) that further contributes to forming the upper 12*d*.

As described above, the intermediate region 64*d* of the sheet of material 52*d* may separate the central region 60*d* of the sheet of material 52*d* from the outer region 62*d* of the sheet of material 52*d* by the distance ($D_{64d}$). Furthermore, in an example, the outer region 62*d* of the sheet of material 52*d* may extend from top surface 46d of the second midsole portion 44d at a sufficient distance ($D_{62d}$) for forming at a foot covering portion of the upper 12d that terminates to define at least a portion of an ankle opening 82d (see, e.g., FIGS. 45, 49, 55) of the upper 12d. In one configuration, the central region 60d of the sheet of material 52d that is secured between the first midsole portion 36d and the second midsole portion 44d may be considered to be a portion of the midsole 28d. In other configurations, the central region 60d of the sheet of material 52d that is secured between the first midsole portion 36d and the second midsole portion 44d may be considered to be a portion of the sheet of material 52d that contributes to the formation of the midsole 28d, and the intermediate region 64d of the sheet of material 52d that: (1) extends beyond the sidewall surface 42d of the first midsole portion 36d and the sidewall surface 50d of the second midsole portion 44d and (2) is disposed adjacent the sidewall surface 50d of the second midsole portion 44d may both be considered to be another portion of the sheet of material 52d that contributes to the formation of the midsole 28d. However, in another configuration, the intermediate region 64d of the sheet of material 52d that: (1) extends beyond the sidewall surface 42d of the first midsole portion 36d and the sidewall surface 50d of the second midsole portion 44d and (2) is disposed adjacent the sidewall surface 50d of the second midsole portion 44d may be considered to be a first portion of the upper 12d, and, the outer region 62d of the sheet of material 52d that extends from top surface 46d of the second midsole portion 44d at the distance ($D_{62d}$) may define a second portion of the upper 12d. Therefore, the intermediate region 64d of the sheet of material 52d may contribute to the formation of one or both of the upper and the midsole 28d.

As described above, each of the first midsole portion 36d and the second midsole portion 44d is not flat and may, respectively, be interrupted by one or more peaks 84d, 88d and recesses, trenches or valleys 86d, 90d such that each of the first midsole portion 36d and the second midsole portion 44d defines a substantially saw tooth pattern extending between the forefoot region 16d and the heel region 20d of the sole structure 14d. The one or more peaks 84d, 88d may define a series of peaks, and, the recesses, trenches or valleys 86d, 90d may define a series of recesses, trenches or valleys.

Furthermore, the respective saw tooth patterns of each of the first midsole portion 36d and the second midsole portion 44d may be matingly shaped such that the first midsole portion 36d correspondingly mates with the second midsole portion 44d. Accordingly, in an implementation, the one or more peaks 84d of the first midsole portion 36d may oppose and be matingly-received by the recesses, trenches or valleys 90d of the second midsole portion 44d, and, the one or more peaks 88d of the second midsole portion 44d may oppose and be matingly-received by the recesses, trenches or valleys 86d of the first midsole portion 36d.

In some configurations, prior to the central region 60d of the sheet of material 52d being secured between the first midsole portion 36d and the second midsole portion 44d, the central region 60d of sheet of material 52d may be defined by a substantially flat, non-saw tooth pattern. However, after the central region 60d of the sheet of material 52d is secured between the first midsole portion 36d and the second midsole portion 44d, the central region 60d of the sheet of material 52d may be shaped (by the saw tooth pattern of each of the first midsole portion 36d and the second midsole portion 44d) to define a saw tooth pattern that conforms to a mated configuration of the saw tooth pattern of each of the first midsole portion 36d and the second midsole portion 44d. In an example, the saw tooth pattern of the central region 60d of the sheet of material 52d may extend between a forefoot region 16d and a heel region 20d of the sole structure 14d. Furthermore, the saw tooth pattern formed by the central region 60d of the sheet of material 52d includes one or more peaks (that is/are formed by the one or more recesses, trenches or valleys 86d of the first midsole portion 36d and the one or more recesses, trenches or valleys 90d of the second midsole portion 44d) and one or more valleys (that is/are formed by the one or more peaks 84d of the first midsole portion 36d and the one or more peaks 88d of the second midsole portion 44d) extending between a forefoot region 16d and a heel region 20d of the sole structure 14d. Although some configurations may include the central region 60d of sheet of material 52d being defined by a substantially flat, non-saw tooth pattern that is subsequently shaped to define a saw tooth pattern after the central region 60d of the sheet of material 52d is secured between the first midsole portion 36d and the second midsole portion 44d as described above, other configurations may include the central region 60d of sheet of material 52d being preformed to define a saw tooth pattern that corresponds to a mated configuration of the saw tooth pattern of each of the first midsole portion 36d and the second midsole portion 44d. In an example, the preformed saw tooth pattern of the central region 60d of the sheet of material 52d may extend between a forefoot region 16d and a heel region 20d of the sole structure 14d. Furthermore, the preformed saw tooth pattern of the central region 60d of the sheet of material 52d includes one or more preformed peaks (that is aligned with and corresponds to the one or more recesses, trenches or valleys 86d of the first midsole portion 36d and the one or more recesses, trenches or valleys 90d of the second midsole portion 44d) and one or more preformed valleys (that is aligned with and corresponds to the one or more peaks 84d of the first midsole portion 36d and the one or more peaks 88d of the second midsole portion 44d) extending between a forefoot region 16d and a heel region 20d of the sole structure 14d.

Figure 56:
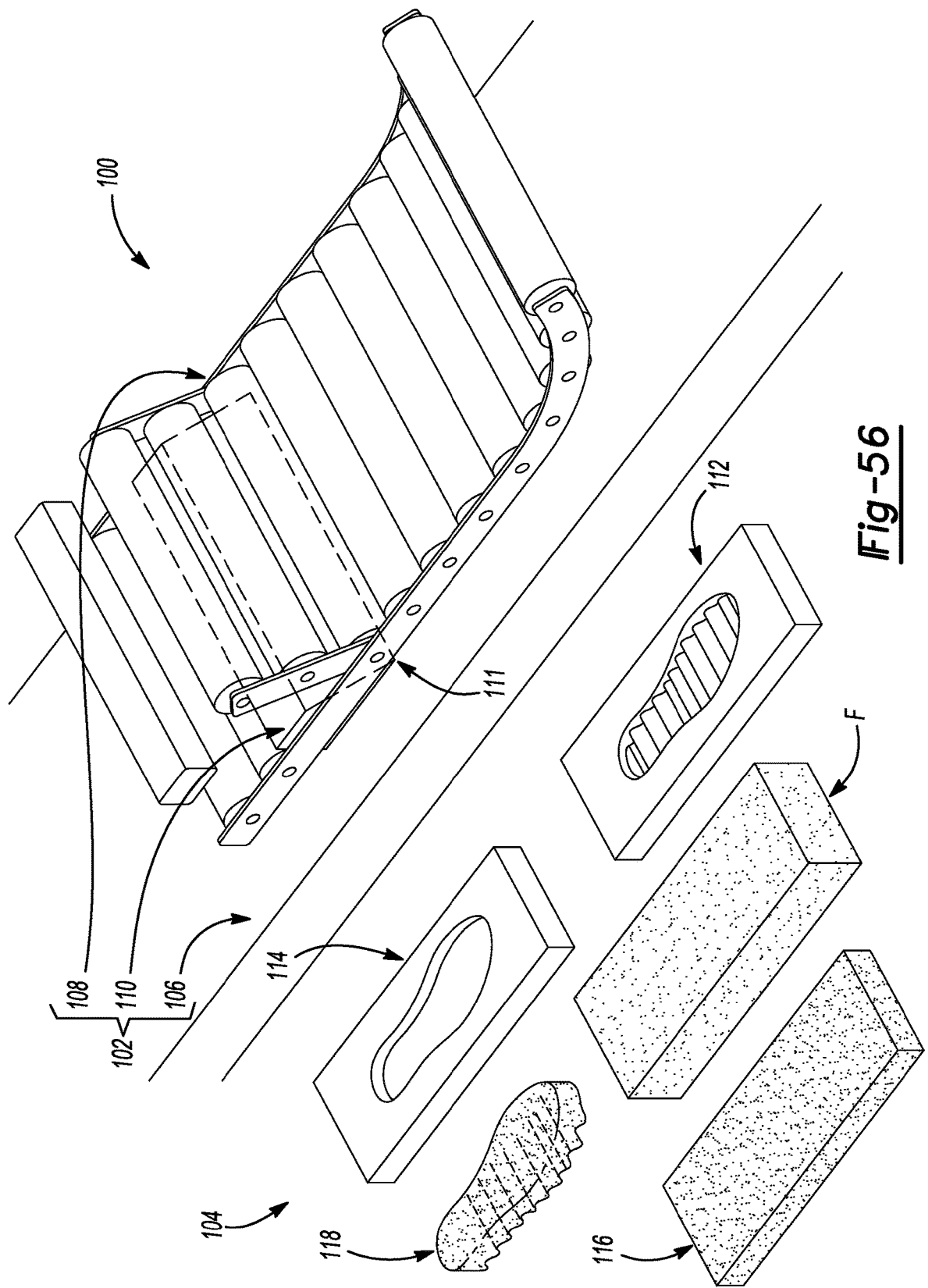
FIG. 56 is a perspective view of a foam cutting system including a receiver portion, an insertion portion and a foam workpiece portion.

Referring to FIGS. 56-63, a foam cutting system for manufacturing any of the first midsole portions 36, 36a, 36b, 36c, 36d and the second midsole portions 44, 44a, 44b, 44c, 44d is shown generally at 100. As shown in FIG. 56, the system 100 generally includes a receiver portion 102 and an insertion portion 104. The receiver portion 102 includes a conveyor 106, a compression device 108 and a separating device 110 having a blade 111. The insertion portion 104 includes one or more compression dies including a first compression die 112 and a second compression die 114 and one or more compression blocks such as, for example, a first compression block 116 and a second compression block 118.

As shown in FIG. 56, a virgin unit of foamed material F may be secured by the insertion portion 104 prior to being interfaced with the receiver portion 102. Any of the first midsole portions 36, 36a, 36b, 36c, 36d and the second midsole portions 44, 44a, 44b, 44c, 44d is/are derived from the virgin unit of foamed material F. In the example shown at FIGS. 56-63, the first and second compression dies 112, 114 and the first and second compression blocks 116, 118 may be generally shaped for forming the first midsole portion 36a and the second midsole portion 44a; however, it is understood that the first and second compression dies 112, 114 and the first and second compression blocks 116, 118 may be formed to include any desirable shape, configuration or geometry to form any of the other first midsole portions 36, 36b, 36c, 36d and second midsole portions 44, 44b, 44c,

44*d* or any other first midsole portion or second midsole portion that is not shown or described in the present disclosure.

Referring to FIG. 57, in an example, prior to interfacing the insertion portion 104 with the receiver portion 102, a virgin unit of foamed material F is disposed upon the first compression die 112 such that a lower surface $F_L$ of the virgin unit of foamed material F opposes a patterned surface $112_P$ of the first compression die 112. In an example, the patterned surface $112_P$ of the first compression die 112 generally corresponds to a sinusoidal pattern having a generally constant amplitude and frequency. Furthermore, the first compression block 116 is disposed upon an upper surface Fu of the virgin unit of foamed material F. The first compression block 116 may be derived from a foamed material that is defined by a hardness or stiffness that is greater than that of the virgin unit of foamed material F.

As shown in FIGS. 57-58, the conveyor 106 advances the insertion portion 104 (defined by the first compression die 112 and the first compression block 116) and the virgin unit of foamed material F secured thereby toward the compression device 108, which may be defined by a plurality of roller members. The plurality of roller members of the compression device 108 may be spaced apart from an upper surface of the conveyor 106 at a distance D that is less than a combination of the collective thickness of the first compression die 112, the first compression block 116 and the virgin unit of foamed material F.

Figure 59:
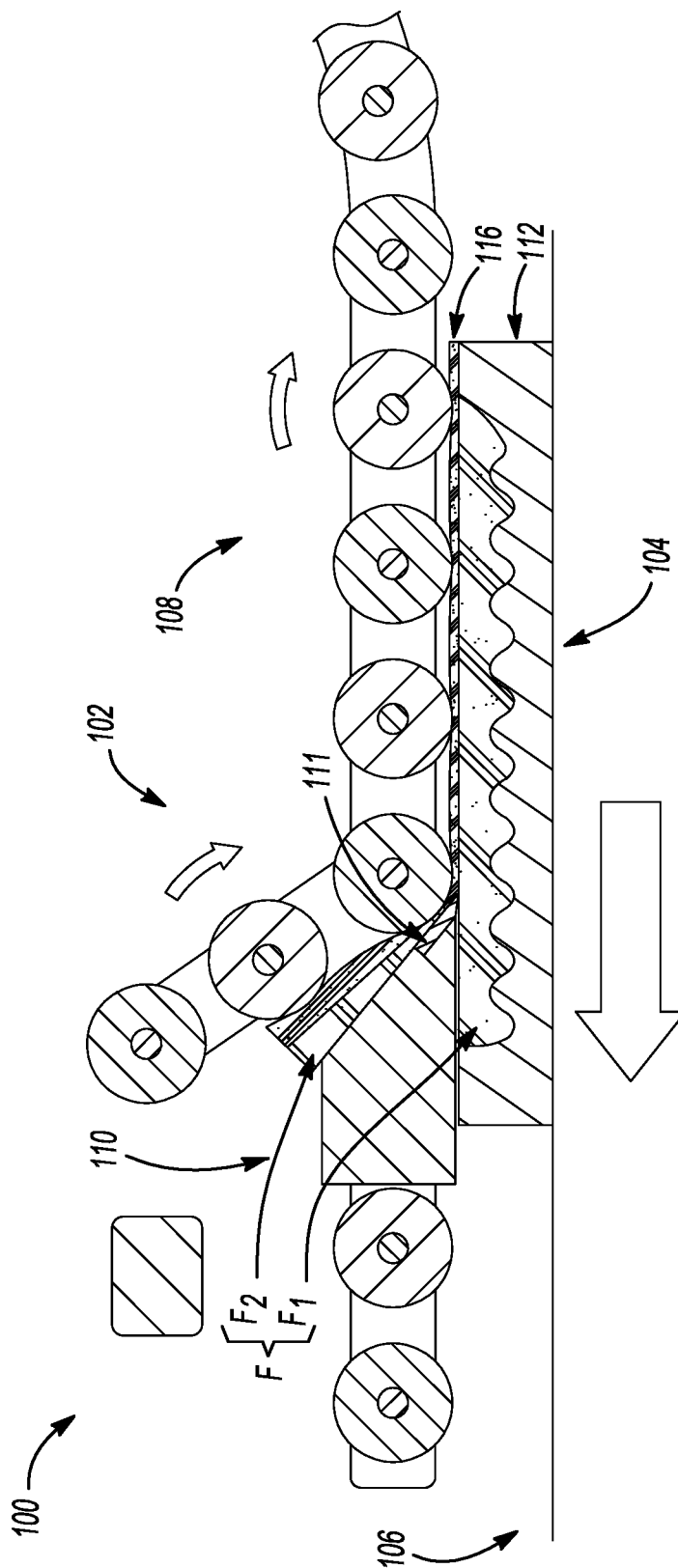
FIG. 59 is a further side view of the foam cutting system and the foam workpiece portion of FIG. 58 illustrating the foam workpiece portion being separated into a midsole component portion and a scrap piece portion.

As shown in FIG. 58, once the insertion portion 104 and the virgin unit of foamed material F are interfaced with the receiver portion 102, the plurality of roller members compress both of the first compression block 116 and the virgin unit of foamed material F such that the first compression block 116 urges at least a first portion F1 (see, e.g., FIGS. 59-60) of the virgin unit of foamed material F into a cavity 113 (see, e.g., FIG. 57) defined by the patterned surface $112_P$ of the first compression die 112. Referring to FIGS. 58-59, with the first portion F1 of the virgin unit of foamed material F urged into the cavity 113 of the first compression die 112, the blade 111 of the separating device 110 separates a second portion F2 (see, e.g., FIGS. 59-60) of the virgin unit of foamed material F from the first portion F1 of the virgin unit of foamed material F.

Figure 60:
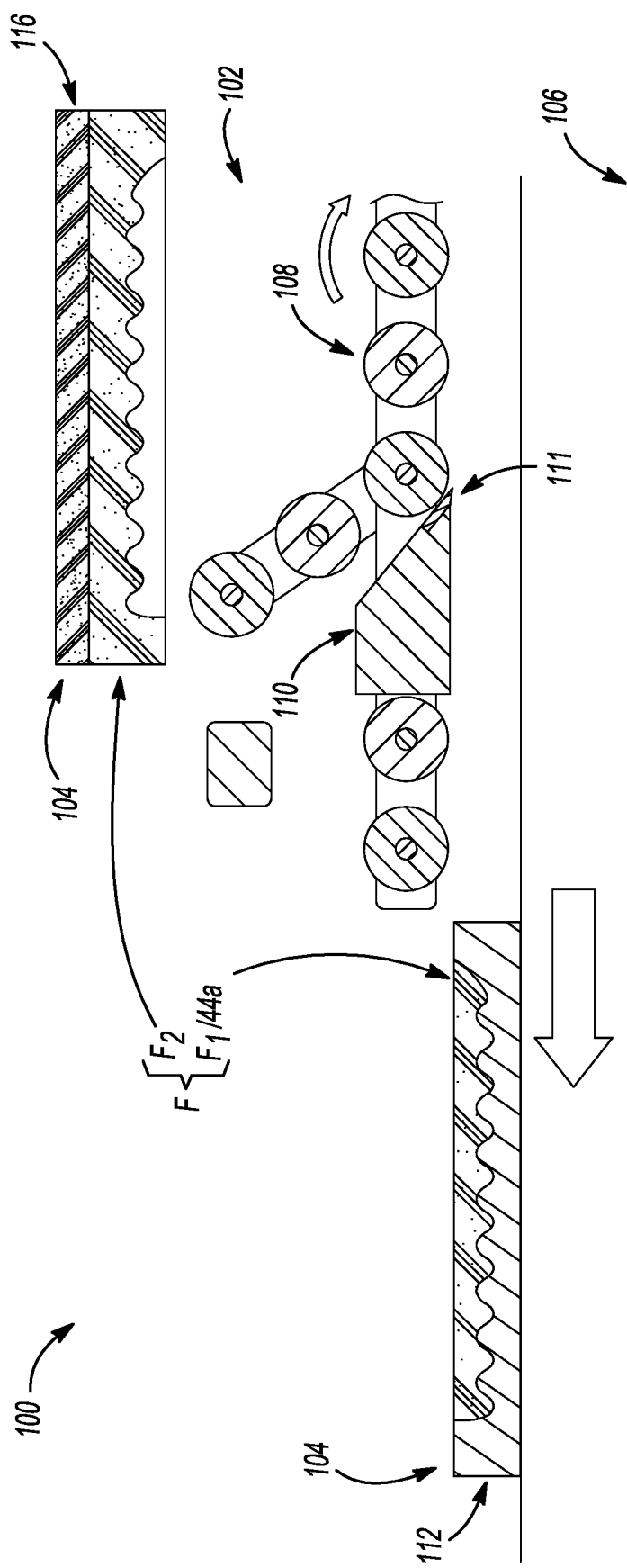
FIG. 60 is a further side view of the foam cutting system and the foam workpiece portion of FIG. 59 illustrating the foam workpiece portion separated for defining the midsole component portion and the scrap piece portion.

Referring to FIG. 60, the first portion F1 of the virgin unit of foamed material F, which is defined by the patterned surface $112_P$ and cavity 113 of the first compression die 112 may generally define the size, shape and geometry of the second midsole portion 44*a* described above. Furthermore, as shown in FIG. 60, the second portion F2 of the virgin unit of foamed material F may be scrap piece of material defined by a negative impression corresponding to the first portion F1 of the virgin unit of foamed material F/the second midsole portion 44*a* described above.

Figure 61:
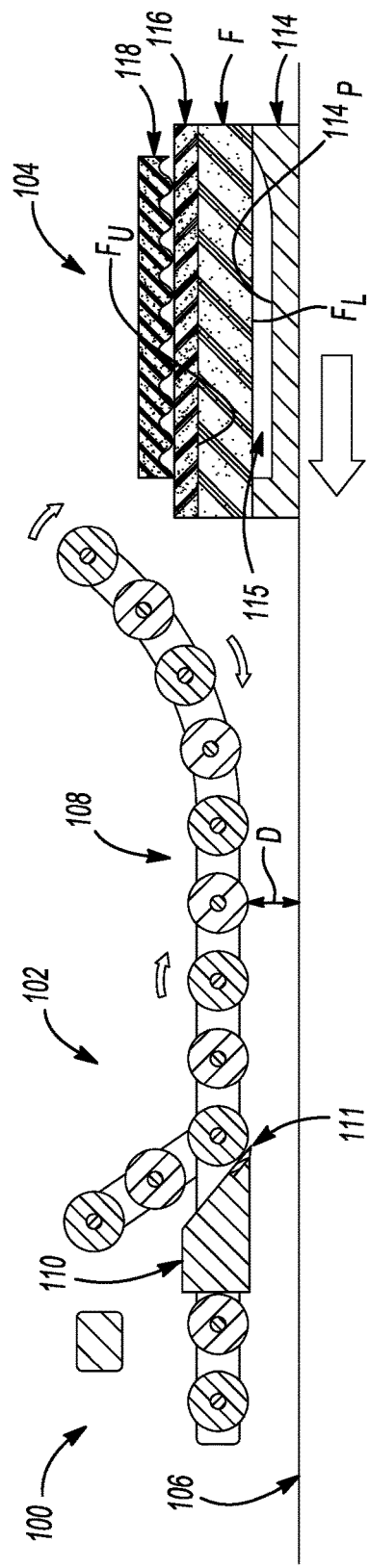
FIG. 61 is another side view of the foam cutting system and another foam workpiece portion of FIG. 56.

Referring to FIG. 61, in another example, prior to interfacing the insertion portion 104 with the receiver portion 102, a virgin unit of foamed material F is disposed upon the second compression die 114 such that a lower surface $F_L$ of the virgin unit of foamed material F opposes a patterned surface $114_P$ of the first compression die 112. In an example, the patterned surface $114_P$ of the second compression die 114 generally corresponds to a flat, non-sinusoidal pattern. Furthermore, the first compression block 116 is disposed upon an upper surface Fu of the virgin unit of foamed material F. The first compression block 116 may be derived from a foamed material that is defined by a hardness or stiffness that is greater than that of the virgin unit of foamed material F. Yet even further, a lower surface $118_L$ of the second compression block 118 is disposed upon an upper surface $116_U$ of the first compression block 116 whereby the lower surface $118_L$ of the second compression block 118 is defined by a sinusoidal pattern having a generally constant amplitude and frequency. Like the first compression block 116, the second compression block 118 may be defined by hardness or stiffness that is greater than that of the virgin unit of foamed material F.

Figure 62:
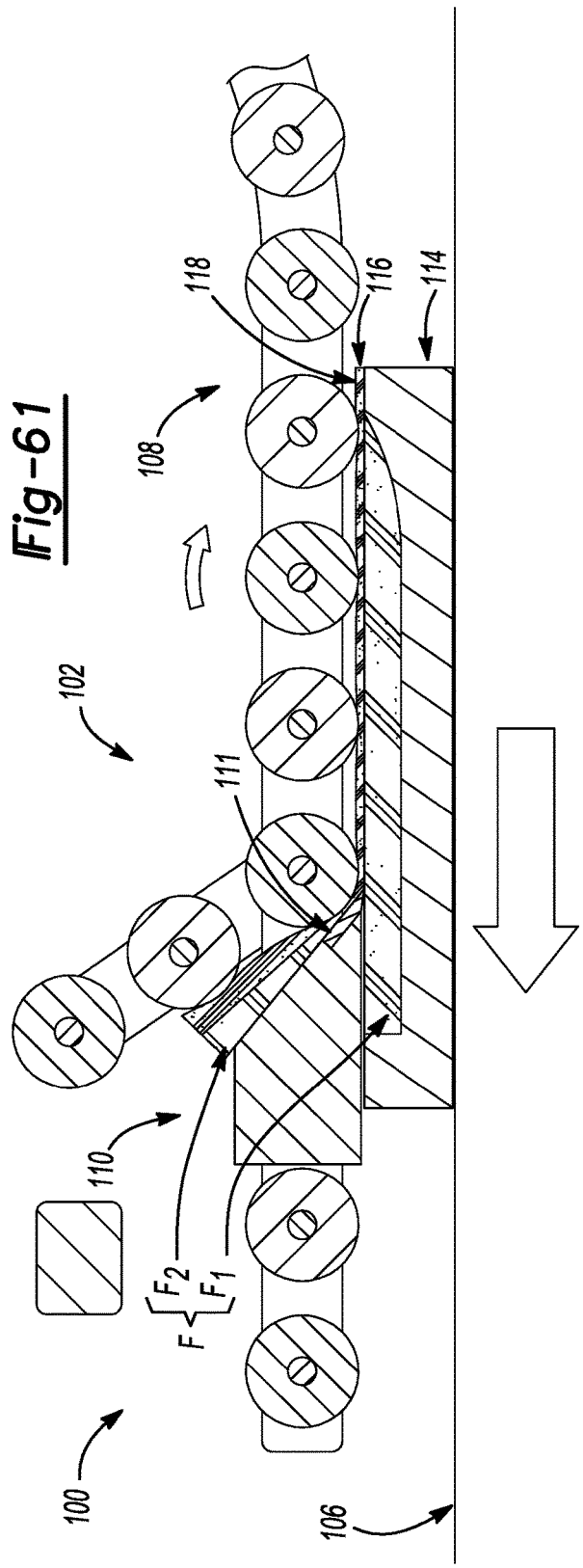
FIG. 62 is a further side view of the foam cutting system and the foam workpiece portion of FIG. 61 illustrating the foam workpiece portion being separated into a midsole component portion and a scrap piece portion.

As shown in FIGS. 61-62, the conveyor 106 advances the insertion portion 104 (defined by the second compression die 114, the first compression block 116 and the second compression block 118) and the virgin unit of foamed material F secured thereby toward the compression device 108, which may be defined by a plurality of roller members. The plurality of roller members of the compression device 108 may be spaced apart from an upper surface of the conveyor 106 at a distance D that is less than a combination of the collective thickness of the first compression die 112, the first compression block 116, the second compression device 118 and the virgin unit of foamed material F.

As shown in FIG. 62, once the insertion portion 104 and the virgin unit of foamed material F are interfaced with the receiver portion 102, the plurality of roller members compress all of the first compression block 116, the second compression block 118 and the virgin unit of foamed material F such that the first compression block 116 and the second compression block 118 urge at least a first portion F1 (see, e.g., FIGS. 62-63) of the virgin unit of foamed material F into a cavity 115 (see, e.g., FIG. 61) defined by the patterned surface 114*p* of the second compression die 114. Referring to FIGS. 62-63, with the first portion F1 of the virgin unit of foamed material F urged into the cavity 115 of the second compression die 114, the blade 111 of the separating device 110 separates a second portion F2 (see, e.g., FIGS. 62-63) of the virgin unit of foamed material F from the first portion F1 of the virgin unit of foamed material F.

Referring to FIG. 63, the first portion F1 of the virgin unit of foamed material F, which is defined by a combination of the lower surface $118_L$ of the second compression block 118 and the cavity 115 of the second compression die 114 may generally define the size, shape and geometry of the first midsole portion 36*a* described above. Furthermore, as shown in FIG. 63, the second portion F2 of the virgin unit of foamed material F may be scrap piece of material defined by a negative impression corresponding to the first portion F1 of the virgin unit of foamed material F/the first midsole portion 36*a* described above.

Although a foam cutting system 100 has been described above at FIGS. 56-63 for cutting a pattern (e.g., a sinusoidal pattern, a saw tooth pattern or the like) provided by any of the first midsole portions 36, 36*a*, 36*b*, 36*c*, 36*d* and the second midsole portions 44, 44*a*, 44*b*, 44*c*, 44*d*, other methodologies may be employed for cutting a pattern to either of the first midsole portions 36, 36*a*, 36*b*, 36*c*, 36*d* and the second midsole portions 44, 44*a*, 44*b*, 44*c*, 44*d*. In an example, a wire cutting device where, for example, a wire under tension, such as a heated wire is used as a "cutting blade."

Furthermore, although one or both of the first midsole portions 36, 36*a*, 36*b*, 36*c*, 36*d* and the second midsole portions 44, 44*a*, 44*b*, 44*c*, 44*d* may be cut for forming a pattern (e.g., a sinusoidal pattern, a saw tooth pattern or the like), the pattern of one or both of the first midsole portions 36, 36*a*, 36*b*, 36*c*, 36*d* and the second midsole portions 44, 44*a*, 44*b*, 44*c*, 44*d* may be formed directly into a desired shape without being cut from a slab of material. For example, one or both of the first midsole portions 36, 36a, 36b, 36c, 36d and the second midsole portions 44, 44a, 44b, 44c, 44d may be injection molded around or through the sheet of material 52, 52a, 52b, 52c, 52d. In such an implementation, at least one of the first midsole portions 36, 36a, 36b, 36c, 36d, the second midsole portions 44, 44a, 44b, 44c, 44d, and the sheet of material 52, 52a, 52b, 52c, 52d may be preformed to define a pattern (e.g., a sinusoidal pattern, a saw tooth pattern or the like). If, for example, the sheet of material 52, 52a, 52b, 52c, 52d is preformed to define a pattern (e.g., a sinusoidal pattern, a saw tooth pattern or the like), injection molding of one or both of the first midsole portions 36, 36a, 36b, 36c, 36d and the second midsole portions 44, 44a, 44b, 44c, 44d around, through, or around-and-through the sheet of material 52, 52a, 52b, 52c, 52d will result in one or both of the first midsole portions 36, 36a, 36b, 36c, 36d and the second midsole portions 44, 44a, 44b, 44c, 44d forming a pattern (e.g., a sinusoidal pattern, a saw tooth pattern or the like) corresponding to the preformed pattern of the sheet of material 52, 52a, 52b, 52c, 52d.

The pattern (e.g., a sinusoidal pattern, a saw tooth pattern or the like) provided by any of the first midsole portions 36, 36a, 36b, 36c, 36d and the second midsole portions 44, 44a, 44b, 44c, 44d contributes to improved performance of the article of footwear 10, 10a, 10b, 10c, 10d when worn by a user. Furthermore, as a result of at least the central region 60, 60a, 60b, 60c, 60d of the sheet of material 52, 52a, 52b, 52c, 52d being captured between the first midsole portions 36, 36a, 36b, 36c, 36d and the second midsole portions 44, 44a, 44b, 44c, 44d, the sheet of material 52, 52a, 52b, 52c, 52d may also contribute to improved performance of the article of footwear 10, 10a, 10b, 10c, 10d.

In an example, the improved performance of the article of footwear may arise from one or more characteristics (e.g. stiffness) of the selected material of at least one of the first midsole portion 36, 36a, 36b, 36c, 36d, the second midsole portion 44, 44a, 44b, 44c, 44d and the sheet of material 52, 52a, 52b, 52c, 52d as well as the shape (e.g., the pattern, amplitude A and/or frequency) of at least one of the first midsole portion 36, 36a, 36b, 36c, 36d, the second midsole portion 44, 44a, 44b, 44c, 44d and the sheet of material 52, 52a, 52b, 52c, 52d. In an example, at least one of the pattern, amplitude A and frequency may contribute to a desired amount of shear strength in one or more regions (e.g., the forefoot region 16, 16a, 16b, 16c, 16d the midfoot region 18, 18a, 18b, 18c, 18d and the heel region 20, 20a, 20b, 20c, 20d) of the sole structure 14, 14a, 14b, 14c, 14d of the article of footwear 10, 10a, 10b, 10c, 10d.

In some instances, a shorter wavelength defined by, for example, sinusoidal pattern or saw tooth pattern may lead to an improved shear strength of the sole structure 14, 14a, 14b, 14c, 14d in one or more regions (e.g., the forefoot region 16, 16a, 16b, 16c, 16d the midfoot region 18, 18a, 18b, 18c, 18d and the heel region 20, 20a, 20b, 20c, 20d) of the article of footwear 10, 10a, 10b, 10c, 10d. Even further, if, for example, the sheet of material 52, 52a, 52b, 52c, 52d is a stretchable fabric, the sole structure 14, 14a, 14b, 14c, 14d may yield an improved shear stability as a result of the central region 60, 60a, 60b, 60c, 60d of the sheet of material 52, 52a, 52b, 52c, 52d (that also may also define at least a portion the upper 12, 12a, 12b, 12c, 12d) being captured between the first midsole portion 36, 36a, 36b, 36c, 36d and the second midsole portion 44, 44a, 44b, 44c, 44d. Therefore, in an example, the central region 60, 60a, 60b, 60c, 60d of the sheet of material 52, 52a, 52b, 52c, 52d may be placed in tension (arising from the selected pattern of the first midsole portion 36, 36a, 36b, 36c, 36d and the second midsole portion 44, 44a, 44b, 44c, 44d) in response to shear loading imparted by a user's foot so as to provide improved stability in one or a combination of a parallel loading direction and a perpendicular loading direction.

The following Clauses provide exemplary configurations of a sole structure and methods of making a sole structure, as described above.

Clause 1: A sole structure for an article of footwear, the sole structure comprising: a first midsole portion including a first sidewall; a second midsole portion including a second sidewall; and a sheet disposed between the first midsole portion and the second midsole portion and extending from the first sidewall and the second sidewall, the sheet extending at least partially over the second sidewall.

Clause 2: The sole structure of Clause 1, wherein the sheet extends from the first sidewall and the second sidewall at one of a medial side and a lateral side of the sole structure.

Clause 3: The sole structure of Clause 1, wherein the sheet extends from the first sidewall and the second sidewall at both a medial side and a lateral side of the sole structure.

Clause 4: The sole structure of Clause 1, wherein the sheet extends from the first sidewall and the second sidewall around an entire perimeter of the sole structure.

Clause 5: The sole structure of Clause 1, wherein the sheet extends from the first sidewall and the second sidewall and at least partially covers an outer surface of an upper of the article of footwear.

Clause 6: The sole structure of Clause 1, wherein the sheet extends from the first sidewall and the second sidewall and forms at least a portion of an upper of the article of footwear.

Clause 7: The sole structure of Clause 1, wherein the sheet extends from the first sidewall and the second sidewall and forms an ankle collar that defines an opening of the upper.

Clause 8: The sole structure of any of the preceding clauses, wherein the sheet includes a top surface, a bottom surface, and a sidewall surface extending between the top surface and the bottom surface, the sidewall surface defining a thickness of the sheet and forming a sinusoidal pattern extending between a forefoot region and a heel region of the sole structure.

Clause 9: The sole structure of any of the preceding clauses, wherein the sheet includes a series of peaks and valleys extending between a forefoot region and a heel region of the sole structure.

Clause 10: The sole structure of Clause 9, wherein a height of the peaks, a depth of the valleys, or both progressively decreases in a direction extending from the heel region to the forefoot region.

Clause 11: The sole structure of any of the preceding clauses, wherein the sheet extends from the first midsole portion and from the second midsole portion at both a medial side and a lateral side of the sole structure.

Clause 12: The sole structure of any of the preceding clauses, wherein the sheet includes at least one aperture.

Clause 13: The sole structure of Clause 12, wherein each aperture of the at least one aperture is at least 3.0 mm in length in a largest dimension.

Clause 14: The sole structure of Clause 12, wherein each aperture of the at least one aperture is at least 1 mm in length in a smallest dimension.

Clause 15: The sole structure of Clause 12, wherein each aperture of the at least one aperture is a post-processed aperture defined by material removed from the sheet.

Clause 16: The sole structure of Clause 12, wherein the sheet is woven, knit, or braided for integrally defining each aperture of the at least one aperture.

Clause 17: The sole structure of Clause 1, further comprising an outsole including a ground-contacting surface.

Clause 18: The sole structure of Clause 17, wherein the first midsole portion is disposed between the outsole and the sheet.

Clause 19: The sole structure of Clause 12, wherein the at least one aperture is formed through the sheet in an area of the sheet located between the first midsole portion and the second midsole portion.

Clause 20: The sole structure of Clause 19, wherein the first midsole portion defines at least one first contact region and the second midsole portion defines at least one second contact region, the at least one first contact region in contact with the at least one second contact region at the at least one aperture.

Clause 21: The sole structure of Clause 20, wherein the first midsole portion and the second midsole portion are bonded to one another at the at least one aperture.

Clause 22: The sole structure of Clause 21, wherein a material of the first midsole portion and a material of the second midsole portion are melded at the at least one aperture.

Clause 23: The sole structure of any of Clauses 20-22, further comprising an adhesive disposed between the at least one first contact region and the at least one second contact region at the at least one aperture.

Clause 24: The sole structure of any of the previous clauses, wherein the first midsole portion includes a first surface in contact with the sheet and the second midsole portion includes a second surface in contact with the sheet, the first surface and the second surface each including a plurality of surface features.

Clause 25: The sole structure of Clause 24, wherein each of the plurality of surface features has a minimum height or depth of at least 2 mm.

Clause 26: The sole structure of Clause 24, wherein each of the plurality of surface features has a minimum height or depth of at least 5 mm.

Clause 27: The sole structure of Clause 24, wherein each of the plurality of surface features has a maximum height or depth of less than 22 mm.

Clause 28: The sole structure of Clause 24, wherein each of the plurality of surface features has a maximum height or depth of less than 17 mm.

Clause 29: The sole structure of Clause 24, wherein the height or depth of each of the plurality of surface features ranges from about 2 mm to about 15 mm.

Clause 30: The sole structure of any of the previous clauses, wherein the first midsole portion includes a first series of peaks and a first series of valleys and the second midsole portion includes a second series of peaks and a second series of valleys.

Clause 31: The sole structure of Clause 30, wherein the first series of peaks oppose the second series of valleys and the second series of peaks oppose the first series of valleys.

Clause 32: The sole structure of Clause 31, wherein the sheet conforms to the shape of the first series of peaks and the first series of valleys and conforms to the shape of the second series of peaks and the second series of valleys.

Clause 33: The sole structure of any of Clauses 30-32, wherein the first series of peaks, the first series of valleys, the second series of peaks, and the second series of valleys cooperate to provide the sheet with a side surface having a sinusoidal or saw-tooth configuration.

Clause 34: The sole structure of any of the preceding clauses, wherein the sole structure comprises a plurality of sheets disposed between the first midsole portion and the second midsole portion.

Clause 35: The sole structure of Clause 34, wherein the plurality of sheets includes two or more sheets positioned between a medial side of the sole structure and a lateral side of the sole structure.

Clause 36: The sole structure of any of the preceding clauses, wherein a width of each of the two or more sheets is at least 0.5 cm.

Clause 37: The sole structure of any of the preceding clauses, wherein at least a portion of the plurality of sheets disposed between the first midsole portion and the second midsole portion overlap each other in a region between the first midsole portion and the second midsole portion.

Clause 38: The sole structure of any of the preceding clauses, wherein none of the plurality of sheets disposed between the first midsole portion and the second midsole portion overlap each other in a region between the first midsole portion and the second midsole portion.

Clause 39: The sole structure of any of the preceding clauses, further comprising an adhesive disposed between the first midsole portion and the second midsole portion, the adhesive being applied to at least one of the first midsole portion, the second midsole portion, an upper surface of the sheet, and a lower surface of the sheet.

Clause 40: The sole structure of any of the preceding clauses, wherein the sheet comprises a mesh textile including at least one aperture in a structure of the mesh.

Clause 41: The sole structure of any of the preceding clauses, wherein the sheet comprises a mesh textile including a plurality of apertures in a structure of the mesh.

Clause 42: The sole structure of Clause 41, wherein a region of the mesh textile disposed between the first midsole portion and the second midsole portion includes at least 50 apertures in the structure of the mesh.

Clause 43: The sole structure of any of the preceding clauses, wherein the sheet comprises a mesh textile including a plurality of apertures each being at least 0.5 mm in length in a largest dimension.

Clause 44: The sole structure of any of the preceding clauses, wherein the sheet comprises a mesh textile including a plurality of apertures each being at least 1.0 mm in length in a largest dimension.

Clause 45: The sole structure of any of the preceding clauses, wherein the sheet comprises a mesh textile including a plurality of apertures each being less than 10 mm in length in a largest dimension.

Clause 46: The sole structure of any of the preceding clauses, wherein the sheet comprises a mesh textile including a plurality of apertures each being less than 5.0 mm in length in a largest dimension.

Clause 47: The sole structure of any of the preceding clauses, wherein the sheet comprises a mesh textile including a plurality of apertures each being less than 3.0 mm in length in a largest dimension.

Clause 48: The sole structure of any of the preceding clauses, wherein the sheet comprises a mesh textile including a plurality of apertures each having a length in a largest dimension from about 0.5 mm to about 3.0 mm.

Clause 49: The sole structure of any of the preceding clauses, wherein the sheet is a textile configured to stretch in in only one dimension.

Clause 50: The sole structure of any of the preceding clauses, wherein the sheet is a textile configured to stretch in two dimensions.

Clause 51: The sole structure of any of the preceding clauses, wherein the sheet is an embroidered textile.

Clause 52: The sole structure of Clause 51, wherein the embroidered textile includes a first embroidered region and a second embroidered region, the first embroidered region having a different concentration of fibers than the second embroidered region.

Clause 53: The sole structure of Clause 1, wherein the sheet includes embroidered regions disposed at discrete locations of the sheet.

Clause 54: The sole structure of Clause 1, wherein the sheet includes first embroidered regions and second embroidered regions, the first embroidered regions having a different concentration of fibers than the second embroidered regions.

Clause 55: The sole structure of any of the preceding clauses, wherein at least one of the first midsole portion and the second midsole portion is formed from a polymeric material having a foam structure.

Clause 56: The sole structure of Clause 55, wherein the polymeric material having a foam structure is an injection-molded foam.

Clause 57: The sole structure of Clause 55, wherein the polymeric material having a foam structure is a compression-molded foam.

Clause 58: An article of footwear incorporating the sole structure of any of the preceding clauses.

Clause 59: A method of manufacturing an article of footwear, comprising: providing the sole structure of any of Clauses 1-58; providing an upper for an article of footwear; affixing the sole structure and the upper to each other to form the article of footwear.

Clause 60: A method of making a sole structure for an article of footwear, the method comprising: providing a first midsole portion including a first sidewall; providing a second midsole portion including a second sidewall; positioning a sheet between the first midsole portion and the second midsole portion, the sheet extending from the first sidewall and the second sidewall; connecting the first midsole portion to the second midsole portion while securing the sheet between the first midsole portion and the second midsole portion; and extending the sheet at least partially over the second sidewall.

Clause 61: The method of Clause 60, further comprising extending the sheet from the first sidewall and the second sidewall at one of a medial side and a lateral side of the sole structure.

Clause 62: The method of Clause 60, further comprising extending the sheet from the first sidewall and the second sidewall at both a medial side and a lateral side of the sole structure.

Clause 63: The method of Clause 60, further comprising extending the sheet from the first sidewall and the second sidewall around an entire perimeter of the sole structure.

Clause 64: The method of Clause 60, further comprising extending the sheet from the first sidewall and the second sidewall and at least partially covering an outer surface of an upper of the article of footwear with the sheet.

Clause 65: The method of Clause 60, further comprising extending the sheet from the first sidewall and the second sidewall to form an upper of the article of footwear with the sheet.

Clause 66: The method of Clause 60, further comprising extending the sheet from the first sidewall and the second sidewall to form an ankle collar that defines an opening of an upper of the article of footwear.

Clause 67: The method of any of the preceding clauses, further comprising positioning the sheet into a sinusoidal pattern that extends between a forefoot region and a heel region of the sole structure.

Clause 68: The method of any of the preceding clauses, further comprising providing the sheet with a series of peaks and valleys that extend between a forefoot region and a heel region of the sole structure.

Clause 69: The method of Clause 68, wherein providing the sheet with a series of peaks includes providing a series of peaks having a height that progressively decreases in a direction extending from the heel region to the forefoot region and wherein providing the sheet with a series of valleys includes providing a series of valleys having a depth that progressively decreases in a direction extending from the heel region to the forefoot region.

Clause 70: The method of any of the preceding clauses, further comprising extending the sheet from the first midsole portion and from the second midsole portion at both a medial side and a lateral side of the sole structure.

Clause 71: The method of any of the preceding clauses, further comprising providing the sheet with at least one aperture that extends through the sheet.

Clause 72: The method of Clause 71, wherein providing the at least one aperture includes forming the at least one aperture through the sheet in an area between the first midsole portion and the second midsole portion.

Clause 73: The method of Clause 72, further comprising contacting the first midsole portion with the second midsole portion at the at least one aperture.

Clause 74: The method of Clause 73, further comprising bonding the first midsole portion to the second midsole portion at the at least one aperture.

Clause 75: The method of Clause 74, wherein bonding the first midsole portion to the second midsole portion includes melding a material of the first midsole portion and a material of the second midsole portion.

Clause 76: The method of Clause 74, wherein bonding the first midsole portion to the second midsole portion includes applying an adhesive to at least one of the first midsole portion and the second midsole portion.

Clause 77: The method of Clause 60, further comprising providing the first midsole portion with a first series of peaks and a first series of valleys and providing the second midsole portion with a second series of peaks and a second series of valleys.

Clause 78: The method of Clause 77, wherein providing the first series of peaks and providing the second series of valleys includes opposing the first series of peaks with the second series of valleys and opposing the second series of peaks with the first series of valleys.

Clause 79: The method of Clause 78, further comprising conforming the sheet with the shape of the first series of peaks and the first series of valleys and conforming the sheet with the shape of the second series of peaks and the second series of valleys.

Clause 80: The method of Clause 79, further comprising forming the sheet from a material that conforms to the shape of the first series of peaks and the first series of valleys and conforms to the shape of the second series of peaks and the second series of valleys.

Clause 81: The method of Clause 79, further comprising preforming the sheet into a shape that matingly receives the first series of peaks and the second series of peaks.

Clause 82: The method of any of the preceding clauses, further comprising forming the sheet from a fabric material.

Clause 83: The method of any of the preceding clauses, further comprising forming the sheet from at least one of a woven and a knitted textile.

Clause 84: The method of any of the preceding clauses, further comprising providing an adhesive between the first midsole portion and the second midsole portion.

Clause 85: The method of Clause 84, further comprising bonding the first midsole portion, the second midsole portion, and the sheet together via the adhesive.

Clause 86: The method of any of the preceding clauses, further comprising forming at least one of the first midsole portion and the second midsole portion from a foamed material.

Clause 87: The method of any of the preceding clauses, further comprising injection molding a polymeric material to form at least one of the first midsole portion and the second midsole portion.

Clause 88: The method of Clause 87, wherein injection molding the polymeric material includes injection molding the polymeric material to form an injection-molded, foamed polymeric material.

Clause 89: The method of Clause 87 or 88, wherein the step of injection molding includes injecting the molten polymeric material around or through apertures in the sheet to form an injection molded part comprising the sheet affixed to both the first midsole portion and the second midsole portion.

Clause 90: The method of any of Clauses 87-89, wherein the step of injection molding includes providing an injection mold, inserting the sheet into the injection mold, injecting molten polymeric material into the mold containing the sheet, cooling the mold to at least partially solidify the molten polymeric material to form an injection molded part including the sheet affixed to the at least one of the first midsole portion and the second midsole portion, and removing the injection molded part from the mold.

Clause 91: The method of any of the preceding clauses, further comprising forming the first midsole portion and the second midsole portion from the same material.

Clause 92: The method of any of the preceding clauses, further comprising forming the first midsole portion and the second midsole portion from different materials.

Clause 93: The method of any of the preceding clauses, further comprising forming the first midsole portion from a first material and forming the second midsole portion from a second material.

Clause 94: The method of Clause 93, further comprising forming the first material from a different material than the second material.

Clause 95: Making an article of footwear incorporating the sole structure of any of the preceding clauses.

Clause 96: A sole structure made according to the method of any of Clauses 60-95.

Clause 97: An article of footwear comprising a sole structure made according to the method of any of Clauses 60-95.

Clause 98: A method of manufacturing an article of footwear, comprising: providing the sole structure made according to the method of any of Clauses 60-95; providing an upper for an article of footwear; affixing the sole structure and the upper to each other to form the article of footwear.

The foregoing description of the embodiments has been provided for purposes of illustration and description. It is not intended to be exhaustive or to limit the disclosure. Individual elements or feature of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sole structure for an article of footwear, the sole structure comprising:
    a first midsole portion including a first sidewall;
    a second midsole portion including a second sidewall; and
    a sheet including a mesh textile having overlapping members defining a woven or knit structure and forming a plurality of passages at least 0.5 mm in length in a largest dimension, the sheet having (i) a first sheet portion disposed between the first midsole portion and the second midsole portion and including post-processed apertures defined by removing a portion of the mesh textile from the first sheet portion, the post-processed apertures having a width ranging from 0.5 mm to 3.0 mm and including a first post-processed aperture disposed in a forefoot region of the sole structure, a second post-processed aperture disposed in a mid-foot region of the sole structure, and a third post-processed aperture disposed in a heel region of the sole structure and (ii) a second sheet portion extending from the first sidewall and the second sidewall and at least partially over the second sidewall, the first midsole portion bonded to the second midsole portion through the post-processed apertures.

2. The sole structure of claim 1, wherein the sheet extends from the first sidewall and the second sidewall at one of a medial side and a lateral side of the sole structure.

3. The sole structure of claim 1, wherein the sheet extends from the first sidewall and the second sidewall and is configured to at least partially cover an outer surface of an upper for the article of footwear.

4. The sole structure of claim 1, wherein the sheet extends from the first sidewall and the second sidewall and is configured to form at least a portion of an upper of the article of footwear.

5. The sole structure of claim 1, wherein the sheet includes a top surface, a bottom surface, and a sidewall surface extending between the top surface and the bottom surface, the sidewall surface defining a thickness of the sheet and forming a sinusoidal pattern extending between a forefoot region and a heel region of the sole structure.

6. The sole structure of claim 1, wherein the sheet includes a series of peaks and valleys extending between a forefoot region and a heel region of the sole structure.

7. The sole structure of claim 1, wherein the first midsole portion defines at least one first contact region and the second midsole portion defines at least one second contact region, the at least one first contact region in contact with the at least one second contact region at the post-processed apertures.

8. The sole structure of claim 1, wherein the first midsole portion includes a first series of peaks and a first series of valleys and the second midsole portion includes a second series of peaks and a second series of valleys, the first series of peaks opposing the second series of valleys and the second series of peaks opposing the first series of valleys.

9. The sole structure of claim 8, wherein the sheet conforms to the shape of the first series of peaks and the first series of valleys and conforms to the shape of the second series of peaks and the second series of valleys.

10. A method of making a sole structure for an article of footwear, the method comprising:

providing a first midsole portion including a first sidewall;

providing a second midsole portion including a second sidewall;

providing a mesh textile having overlapping members defining a woven or knit structure and forming a plurality of passages at least 0.5 mm in length in a largest dimension;

removing a portion of a sheet formed of the mesh textile to define post-processed apertures through the sheet, the post-processed apertures having a width ranging from 0.5 mm to 3.0 mm and including a first post-processed aperture disposed in a forefoot region of the sole structure, a second post-processed aperture disposed in a mid-foot region of the sole structure, and a third post-processed aperture disposed in a heel region of the sole structure;

positioning the sheet between the first midsole portion and the second midsole portion;

connecting the first midsole portion to the second midsole portion through the post-processed apertures while securing the sheet between the first midsole portion and the second midsole portion; and extending the sheet at least partially over the second sidewall.

11. The method of claim 10, further comprising extending the sheet from the first sidewall and the second sidewall at one of a medial side and a lateral side of the sole structure.

12. The method of claim 10, further comprising extending the sheet from the first sidewall and the second sidewall and at least partially covering an outer surface of an upper of the article of footwear with the sheet.

13. The method of claim 10, further comprising extending the sheet from the first sidewall and the second sidewall to form an upper of the article of footwear with the sheet.

14. The method of claim 10, further comprising positioning the sheet into a sinusoidal pattern that extends between a forefoot region and a heel region of the sole structure.

15. The method of claim 10, further comprising providing the sheet with a series of peaks and valleys that extend between a forefoot region and a heel region of the sole structure.

16. The method of claim 10, further comprising contacting the first midsole portion with the second midsole portion at the post-processed apertures.

17. The method of claim 10, further comprising providing the first midsole portion with a first series of peaks and a first series of valleys and providing the second midsole portion with a second series of peaks and a second series of valleys, the first series of peaks opposing the second series of valleys and the second series of peaks opposing the first series of valleys.

18. The method of claim 17, further comprising conforming the sheet with the shape of the first series of peaks and the first series of valleys and conforming the sheet with the shape of the second series of peaks and the second series of valleys.

* * * * *